United States Patent [19]

Shero et al.

[11] Patent Number: 4,673,859
[45] Date of Patent: Jun. 16, 1987

[54] INDUCTION MOTOR SYNTHESIS CONTROL APPARATUS AND METHOD

[75] Inventors: David J. Shero, South Park Township, Allegheny County, Pa.; Habib Dadpey, Atlanta, Ga.; C. Scott Magee, Houston, Tex.

[73] Assignee: Westinghouse Electric Corp., Pittsburgh, Pa.

[21] Appl. No.: 696,814

[22] Filed: Jan. 31, 1985

[51] Int. Cl.$^4$ ............................................. H02P 5/40
[52] U.S. Cl. .................................... 318/810; 318/811
[58] Field of Search ................ 318/811, 803, 807–810; 363/42, 43, 41

[56] References Cited

U.S. PATENT DOCUMENTS 3,899,725 8/1975 Plunkett .............................. 318/802
4,028,599 6/1977 Zankl et al. ......................... 318/803
4,466,052 8/1984 Thrap .................................... 363/41

OTHER PUBLICATIONS

Varnovitsky, M., "A Microcomputer-Based Control Signal Generator For A Three-Phase Switching Power Inverter", IEEE Transactions on Industry Applications, vol. IA-19, No. 2, Mar.-Apr. 1983, pp. 228-234.
LE-Huy et al, "Microprocessor Control of a Current-Fed Synchronous Drive" Conference Industry Applications Society IEEE-IAS Annual Meeting, Cleveland OH. USA, (Sep. 30-OCt. 4, 1979), pp. 873-880.

Primary Examiner—David Smith, Jr
Attorney, Agent, or Firm—J. L. Brzuszek

[57] ABSTRACT

An arrangement of interconnected timers is provided for operation with a microprocessor programmed to determine time delay counts that are fed out to these timers such that the timers can take care of the actual task of firing GTO inverter switches or not firing GTO inverter switches coupled with an AC traction motor for a vehicle. It is necessary to have correct transitions between the minus GTO switch and the plus GTO switch being ON for providing the desired motor voltage conditions with minimum electromagnetic interference in relation to the power supply. In addition the use of timer queues in complicated synthesis modes like the PWM and the quasi six-step operates to give the microprocessor adequate operating time for reasonable control signal time duration calculations. The timers are synchronized in hardware by a single crystal frequency, and they are synchronized in software such that the three phase independent waveforms stay 120° apart.

17 Claims, 77 Drawing Figures

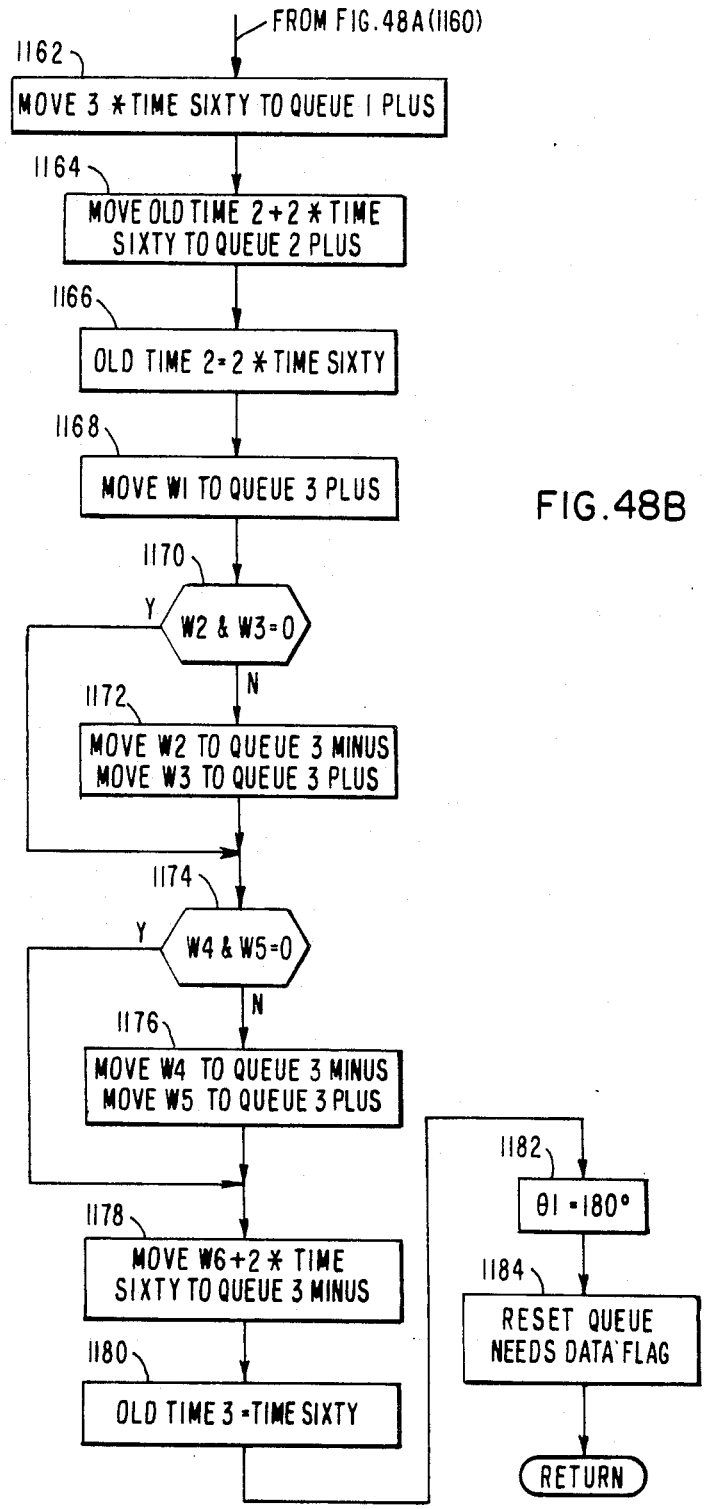

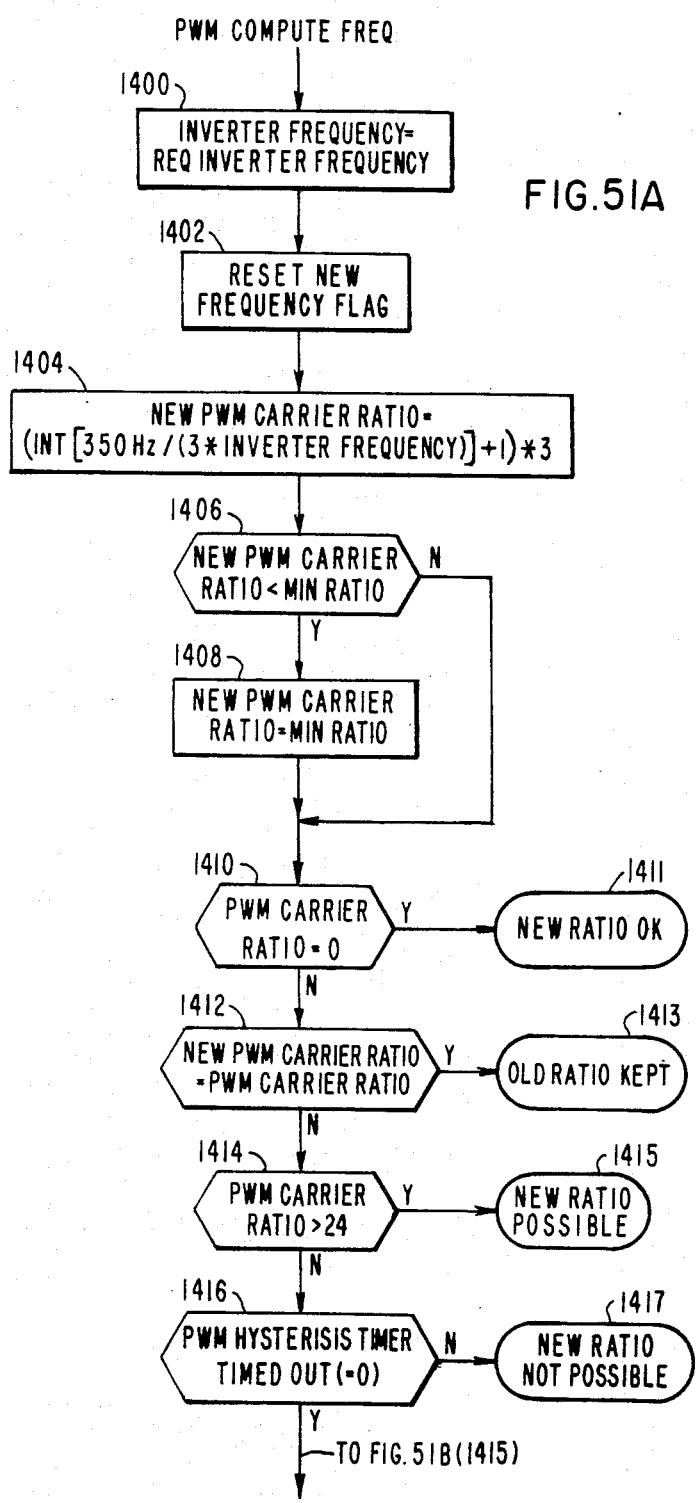

INDUCTION MOTOR SYNTHESIS CONTROL APPARATUS AND METHOD

CROSS REFERENCE TO RELATED APPLICATIONS

The present application is related to the following concurrently filed patent applications Ser. No. 696,833, by D. J. Shero et al. and entitled "Induction Motor Control Apparatus And Method", Ser. No. 696,832, by H. Dadpey et al. and entitled "Torque Determination For Control of An Induction Motor Apparatus", Ser. No. 696,938, by H. Dadpey et al and entitled "Induction Motor Regenerative Brake Control Apparatus And Method", which are assigned to the same assignee and the disclosures of which are incorporated herein by reference.

BACKGROUND OF THE INVENTION

1. Field of the Invention

This invention relates in general to the control of an induction motor apparatus driven from a DC power source through an inverter.

2. Description of the Prior Art

It is known to provide a closed loop control of an AC motor drive apparatus, including a three phase AC motor which is powered using a GTO based voltage fed inverter that is powered directly from a DC power source. The GTO switches in the inverter are to have a predetermined connection time between each phase of the motor and either one of the two power rails, i.e. high and low voltage. The relationship of each phase with respect to the other phases generates the needed AC waveforms in order to properly excite the motor.

For a transit vehicle, it is known that the torque output from the one or more propulsion motors is to be maintained at a particular level to accelerate or decelerate the vehicle at a predetermined rate. Due to various disturbances and unknown variables, it is known to provide a closed loop control apparatus that determines the torque output of the motor and controls the AC waveforms to that motor so as to maintain the desired torque output from that motor.

The torque output from an AC motor can be controlled by varying the slip frequency and/or the motor voltage. In a motor drive system where the input voltage source is DC, a variable voltage and variable frequency voltage source inverter can be used to vary these motor parameters.

It is known in the prior art to provide pulse width modulated inverter pulse switching control signals with a microprocessor-based modulator in response to input voltage and frequency commands to determine the conduction time periods for an inverter driving a three-phase induction motor, as described in an article entitled "A High Performance Pulse Width Modulator for an Inverter Fed Drive System Using a Microprocessor" that appeared at pages 847–853 of the above-reference conference record of the IEEE Industry Application Society Meeting for October 1982.

SUMMARY OF THE INVENTION

A variable voltage and variable frequency inverter drive motor control apparatus and method are provided for an AC induction motor system using a programmed microprocessor for operation with gate turn-off thyristor (GTO) switches to determine the required switching of the motor currents ON and OFF. A pulse width modulated operation, a quasi six-step operation and a six-step operation of the pole circuits for the respective three phases of the motor are provided, with the microprocessor operative through intercoupled timers respectively firing each GTO switch for a predetermined time period count stored in each timer as required to provide a desired voltage and desired frequency motor operation. The timer operations are synchronized in hardware and in the software control program.

BRIEF DESCRIPTION OF THE DRAWINGS

FIGS. 48A and 48B show a flow chart for the Quasi six-step to six-step transition routine;

FIGS. 49A and 48B show a flow chart for the six-step to Quasi six-step transition routine;

FIGS. 51A and 51B show a flow chart for the PWM compute frequency routine;

FIGS. 55, 55A, 55B, 55C and 55D shows a flow chart for the compute w times routine;

DESCRIPTION OF THE PREFERRED EMBODIMENTS

Figure 1:
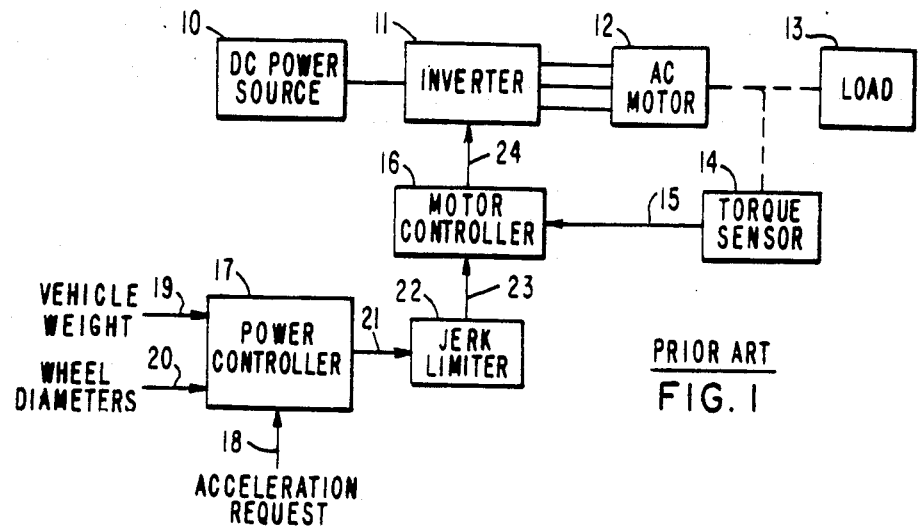
FIG. 1 shows a prior art AC induction motor control apparatus.

In FIG. 1 there is shown a prior art AC induction motor control apparatus including a DC power source 10 coupled with an inverter 11 for determining the operation of a three-phase AC induction motor 12 connected with a load 13. A torque sensor 14 is coupled with the motor 12 to provide a torque feedback 15 to a motor controller 16. A power controller 17 receives as inputs an acceleration request 18 from the transit vehicle operator, the transit vehicle weight 19, and the transit vehicle wheel diameters 20. The power controller 17 produces a torque effort request 21, which represents the torque to be achieved by the AC motor 12 in order to accelerate the transit vehicle, as represented by load 13, at the rate defined by acceleration request 18. A jerk limiter 22 takes the torque effort request 21 and jerk limits it to provide a jerk limited torque effort request 23 to the motor controller 16. The motor controller 16 produces GTO switch firing pulses 24 for the inverter 11, in order to match the torque feedback 15 to the torque effort request 23.

Figure 2:
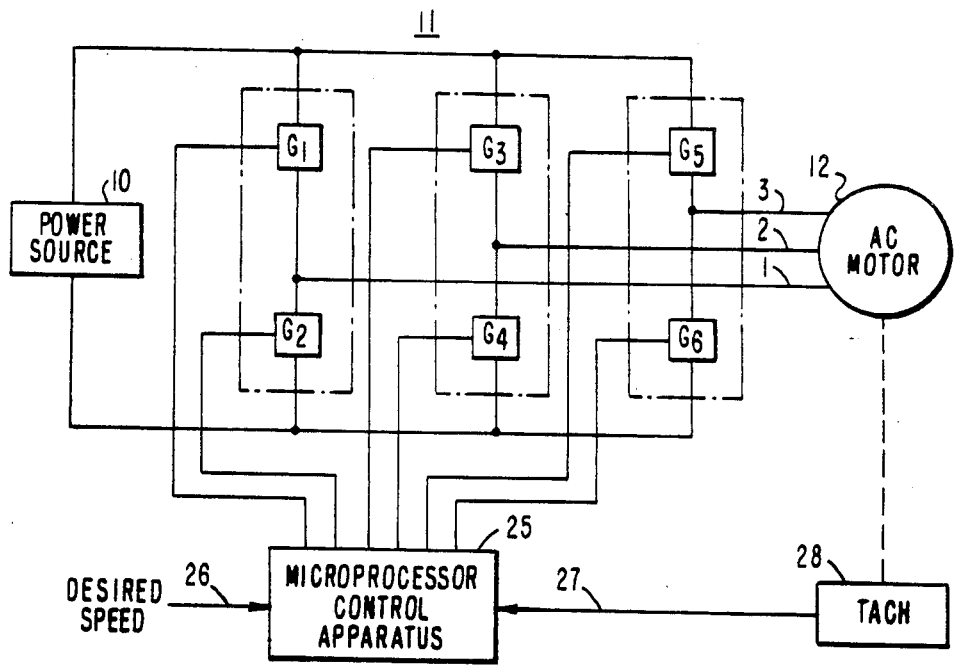
FIG. 2 shows a prior art AC induction motor control apparatus including an inverter coupled with a power source and controlled by a programmed microprocessor.

In FIG. 2, there is shown a prior art AC induction motor control apparatus including a programmed microprocessor operative with a DC power source 10 coupled with an inverter 11 for determining the operation of a three-phase AC induction motor 12. A programmed microprocessor control apparatus 25 receives a desired speed reference input 26 and active speed feedback 27 from a tachometer 28 coupled with the motor 12. The determined speed error establishes the control signals for the gate switches G1 and G2 provided to energize the output motor line for phase 1 of the motor, the gate switches G3 and G4 provided to energize the output motor line for phase 2 of the motor and the gate switches G5 and G6 provided to energize the output motor line for phase 3 of the motor 12.

The inverter 11 includes, as shown in FIG. 2 for each phase pole, an upper GTO switch and a lower GTO switch. For the example of the power source 10 being 600 volts, the upper GTO switch for each phase is connected to the 600 volt side of the input line from the power source 10 and the lower GTO switch for each phase is connected to the ground line of the power supply 10. Depending upon which GTO switch is turned on, the associated motor phase line is connected to the high voltage or is connected to ground. By modulating the turn ON and turn OFF operation of the respective GTO switches, the desired motor voltage is output to each phase of the motor 12. The inverter 11 in this way produces the desired voltage across each of the AC motor phases.

Figure 3:
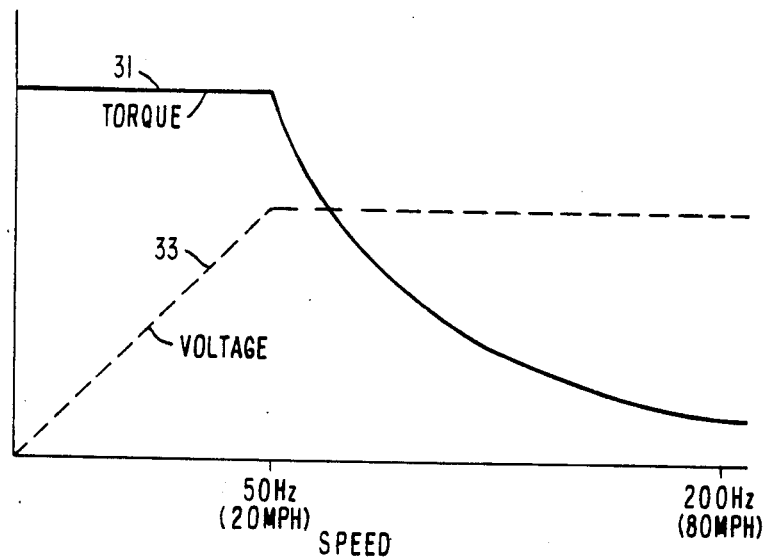
FIG. 3 shows the well known prior art torque and voltage versus speed relationship curves for a transit vehicle AC induction propulsion motor.

In FIG. 3, there is shown the well-known torque and voltage versus speed curves for an induction motor. The torque of the motor as shown by curve 31 is constant from zero speed up to base speed and then falls off for speeds above base speed, which is shown to be at about 50 Hz and approximately 20 miles per hour. The voltage increases linearly as shown by curve 33 up to base speed and then stays constant for speeds above that base speed of the motor.

Figure 4:
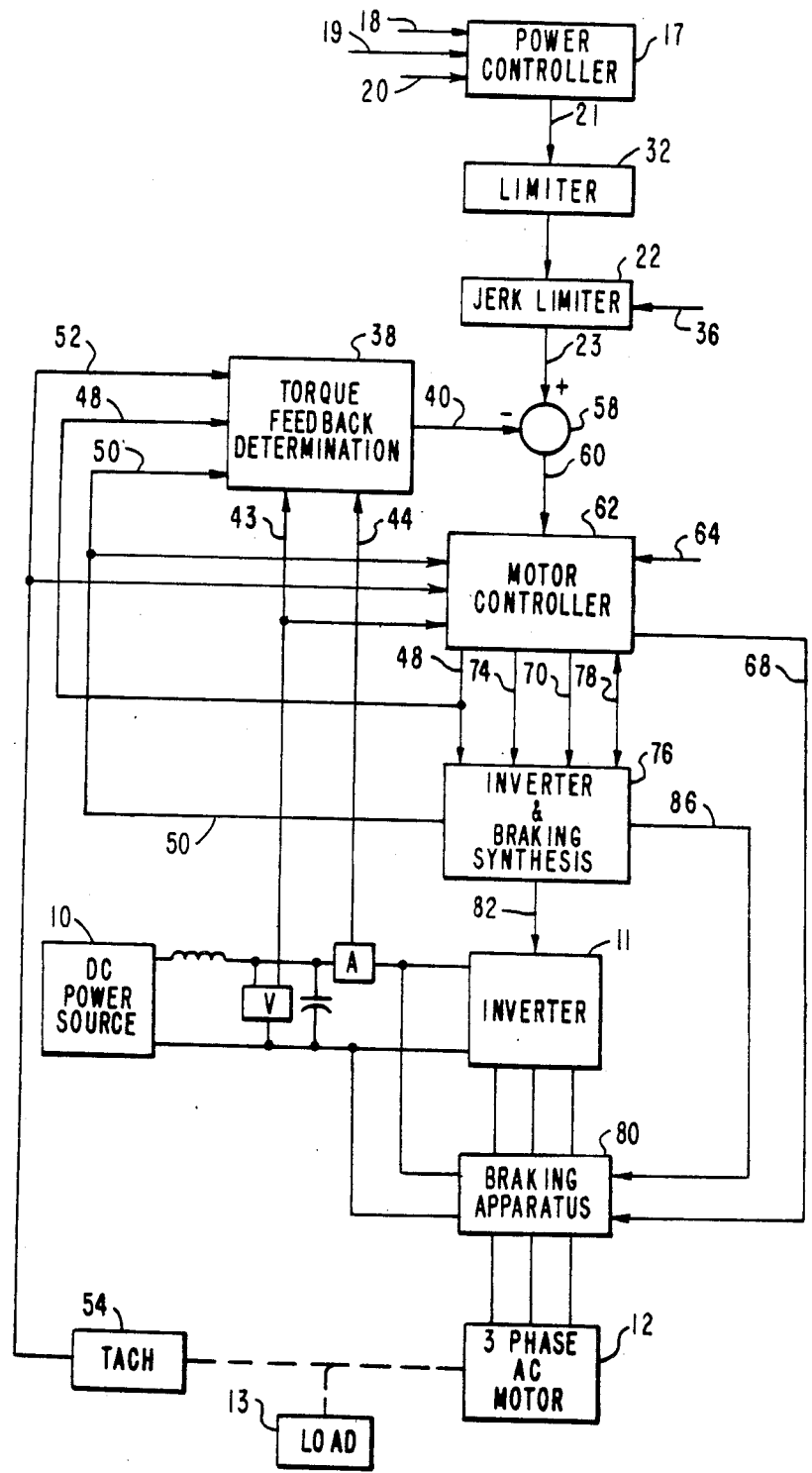
FIG. 4 shows a schematic block diagram of the present induction motor control apparatus.

In FIG. 4 there is shown a suitable motor control apparatus for operation in accordance with the present invention to control a three phase AC motor, such as the propulsion motor of a mass transit passenger vehicle. The vehicle operator can provide a power controller 17 with a vehicle acceleration request 18 which, the power controller 17 translates into a torque effort request signal 21 which is input to a signal limiter 32 for preventing unreasonable torque effort requests. A jerk limiter 22 is provided in relation to a desired jerk rate 36 for establishing a jerk limited torque request 22 for the comfort of the vehicle passengers. A torque feedback determination apparatus 38 determines the torque feedback 40 by measuring the system input power in relation to the DC voltage 43 and DC current 44 provided by a power supply 10 and in relation to the inverter frequency 48 and the synthesis mode 50 and the tachometer speed 52 provided by a tachometer 54 coupled with the propulsion motor 12 to estimate the output torque of the motor 12. The torque feedback signal 40 is supplied to the negative input of a summing junction 58 for comparison with the jerk limited torque request signal 23 supplied to the positive input of the summing junction 58. The resulting torque error signal 60 is supplied to a motor controller 62. A control enable signal 64 from the operator permits the propulsion motor 12 to run or not. Other needed inputs by the motor controller 62 consist of the DC line voltage 43 and the synthesis mode of the inverter 50. The motor controller 62 outputs the braking thyristors enable 68, the requested braking angle 70, the requested inverter frequency 48, and the requested inverter voltage percent 74 to the inverter and braking synthesis apparatus 76, which in addition has an input and output control state signal 78 and provides the synthesis mode signal 50 to the motor controller 62 and to the torque feedback determination apparatus 38. When the motor 12 is in brake operation, with additional voltage supplied by the parallel connected transformer braking apparatus circuit 80, the control state signal 78 operates to keep the synthesis mode in six-step and prevents a change to the quasi six-step or PWM modes. The inverter and braking synthesis apparatus 76 outputs the inverter GTO firing pulses 82 to the inverter 11 and the brake GTO firing pulses 68 to the braking apparatus circuit 80. The inverter 11 drives the motor 12 in power and in brake operation and the braking circuit 80 operates with the motor 12 when additional braking torque is desired above base speed operation.

Figure 5:
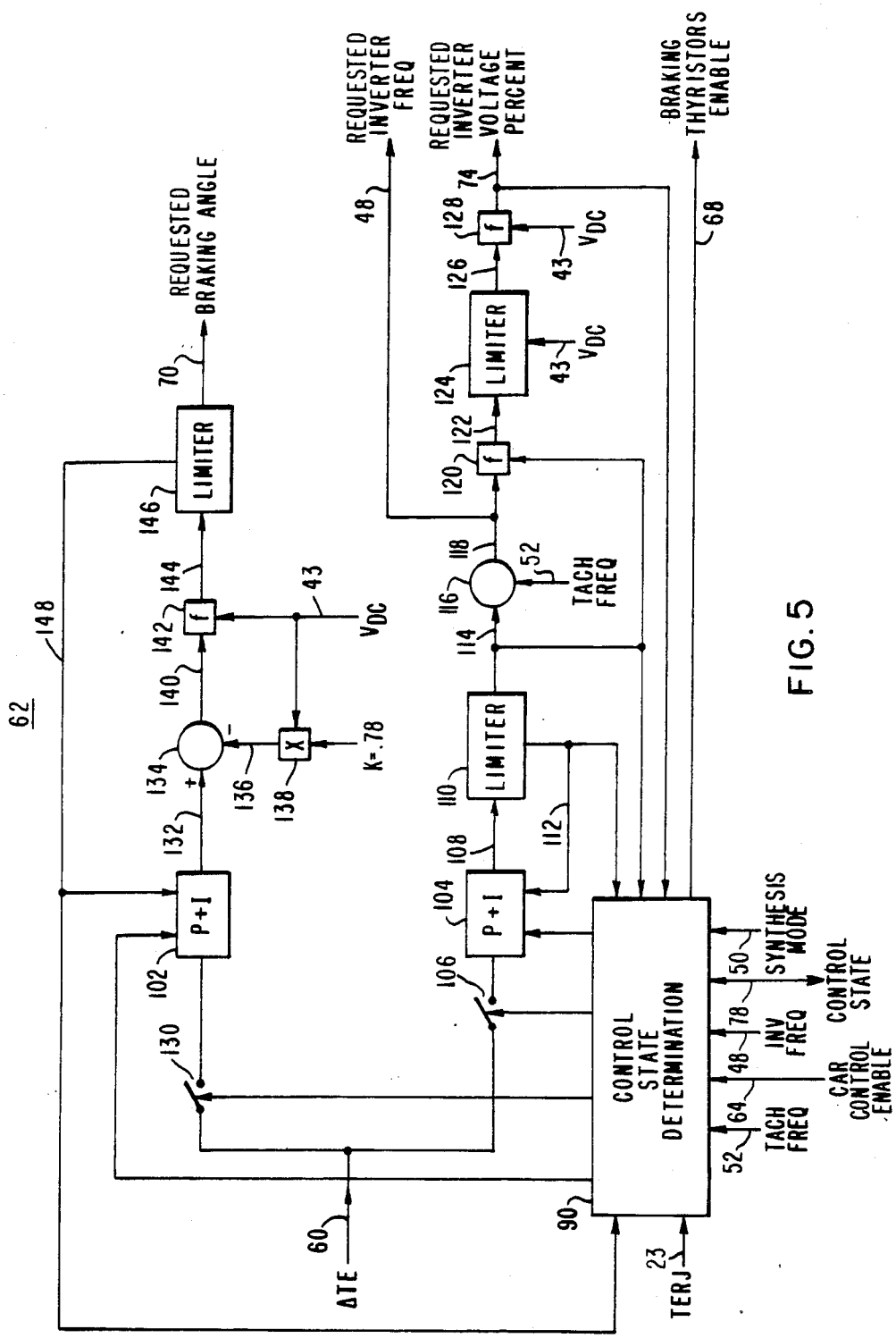
FIG. 5 shows functionally the motor controller of the present induction motor control apparatus.

In FIG. 5 there is functionally shown the motor controller 62, including the control state determination apparatus 90, which has an input and output the current control state 78 for determining the next control state. The inputs are the inverter frequency 48, the control enable 64 to indicate if the inverter 11 is enabled to run, the tach frequency 52 and the jerk limited torque request or TERJ 37 which determines whether in power or brake. If the TERJ is positive, then the control operation is going to be a power state, if the TERJ is negative, the control is going to be in brake. The synthesis mode 50 prevents a change to transformer brake apparatus operation if the control operation is not in six-step. The apparatus includes a brake PI controller 102 and a slip controller 104. The control state determination apparatus 90 control provides a slip enable to the switch 106 which routes the torque error signal 60 into the slip controller 104. If the operation excludes the transformer braking apparatus 80, for example, where it is desired to vary the motor slip in order to control the motor torque, the switch 106 will be closed permitting the torque error signal 60 to go into the slip P+I controller 104 and output a desired slip frequency 108 into the limiter 110 which prevents too much slip and avoids going over the knee of the torque versus slip curve. The limiter 110 provides a slip limit feedback 112 back into the slip P+I controller 104 to limit the slip to a desired maximum level and to preset the slip P+I controller 104 to clamp the controller 104 so the integral portion does not continue rising. The output 114 of the limiter 110 is the slip frequency 114, which is also fed back into the control state determination apparatus 90 to control a couple of different state determinations. The slip frequency 114 is added to the tach frequency 52 in an adder 116 and the output is the requested inverter frequency 48. The function generator 120 uses the requested inverter frequency 48 and the slip frequency 114 to generate a desired inverter voltage 122 that will result in the AC motor 12 being operated at constant rated air gap flux. This desired inverter voltage 122 is not obtainable above base speed from the inverter 11 due to limits imposed by the DC line voltage. Therefore, the voltage limiter 124 monitors the DC line voltage 43 to determine if the desired inverter voltage 122 can be obtained. If the voltage 122 cannot be obtained, the voltage limiter 124 will clamp to a voltage that can be obtained. If the voltage 122 can be obtained, the voltage limiter 124 will not modify the voltage 122. The output of the limiter 124 is the requested inverter voltage 126 and that goes into another function generator 128 which has as another input the DC voltage 43, and the output is the requested inverter voltage percent 74. The DC line voltage 43 multiplied by the constant 0.78 represents the maximum obtainable inverter output voltage. The requested inverter voltage 126 is divided by this maximum obtainable inverter output voltage resulting in a requested inverter voltage percent 74. The requested inverter frequency 48 is an output from the adder 116.

The brake voltage P+I controller 102 has an input switch 130. If the control state determination apparatus 90 wants to activate the brake controller 102, the braking enable 129 closes the switch 130 to enable the torque error signal 60 to be fed into the brake P+I controller 102 that is operative as an integral controller. The output of the brake P+I controller 102 is the desired motor voltage 132, which goes into adder 134, which has another input called six-step inverter voltage 136. The DC voltage 43 going through a multiplier 138 to be multiplied times a constant of 0.78 and the output of the multiplier 138 is six-step inverter voltage 136 which is the maximum amount of voltage that the inverter 11 can put out in six-step operation. The adder 134 takes the desired motor voltage 132 and subtracts the six-step inverter voltage 136 and the result is the desired transformer output voltage 140, which is then fed into function generator 142 in relation to the DC line voltage 43 to produce the desired braking angle 144. This is the angle that the GTO switches in the brake circuit 80 must be turned off during every 180° cycle in order to produce the desired transformer output voltage 140. The function generator 142 calculates the desired braking angle 144 using the following relationship $$\text{ANGLE} = \frac{360}{\pi} * \text{ARCSIN } \frac{\pi}{4} * \frac{V_{TX}}{V_{TDC}}$$

where $V_{TX}$ is the desired transformer output voltage 140 and $V_{TDC}$ is the instantaneous voltage appearing across the secondary of the braking transformer (550 V for a turns ratio of 0.9 and a power supply voltage of 600 V). This desired braking angle 144 must be between zero and 80° out of that 180° during which the GTO switches in the braking circuit 80 will be turned off and thus be providing the desired brake voltage across the motor for that angle. The desired braking angle 144 goes into the limiter 146 to limit the desired braking angle to no less than zero degrees and to no more than 80°. The zero degree limit is provided because a negative amount of time is not available out of the GTO switch and the 80° limit is provided because at that point the GTO switch is getting close to being off when the motor current has the wrong polarity such that this would induce a negative voltage to subtract from the provided inverter motor voltage. One output of the limiter 146 is the requested braking angle 70 and another output is the angle limit 148, which is fed back to preset the brake P+I controller 102 to clamp the integral portion of the P+I controller 102. The angle limit 148 also feeds back into the control state determination apparatus 90 to determine if a change to a different control state is needed. For example, once the transformer brake operation runs out of voltage, which happens when the braking angle reaches 80°, the control state determination apparatus 90 may want to go to the high slip next control state which results in holding the maximum braking angle and then increasing the motor slip to get a little bit of additional braking torque. For another example, once the GTO switch operation reaches a zero degree angle, the control state determination apparatus 90 can get out of transformer braking since there is no longer a need for it. The control state determination apparatus 90 outputs a braking thyristor enable 68 to either turn on the brake circuit thyristors or turn them off. Within a state of transformer braking, the braking thyristor enable 68 keeps the thyristors off, and when not in a state of transformer braking, the thyristors are kept on.

The inverter and braking synthesis apparatus 76 provides a synthesis mode determination 50. The requested inverter frequency 48, the requested inverter voltage percent 74 and the present control state 78 are input to the synthesis apparatus 76, and the synthesis mode output 50 will determine the type of synthesis operation that is wanted, such as one of PWM, quasi six-step or six-step.

Figure 6:
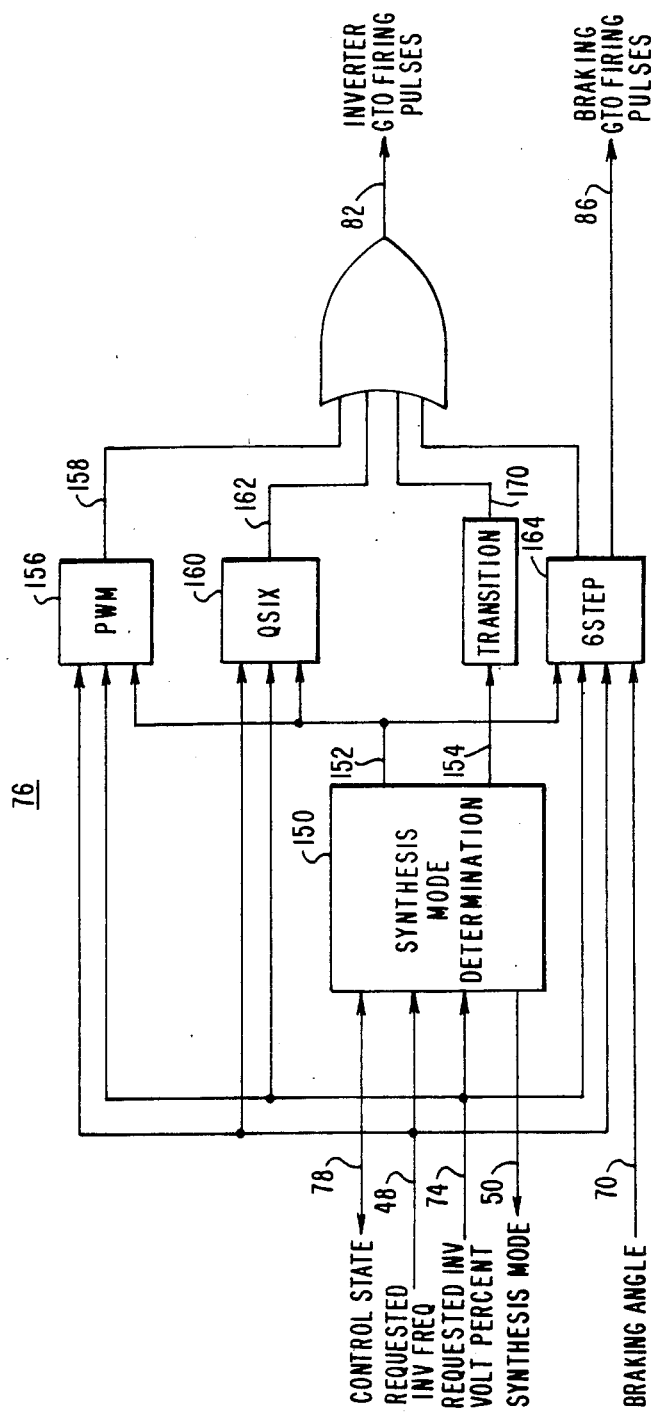
FIG. 6 shows functionally the inverter and braking synthesis apparatus of the present invention.

In FIG. 6 there is functionally shown the inverter and braking synthesis apparatus 76 shown in FIG. 4. The synthesis mode determination apparatus 150 receives from the motor controller 62 the control state 78, the requested inverter frequency 48, and the requested inverter voltage percent 74 for providing the synthesis mode 50, the synthesis mode select 152 based on the synthesis mode 50, the change synthesis mode 154, and the control state 78 if a control state change is performed. The PWM control 156 responds to the synthesis mode select 152, and when PWM operation is selected, the PWM control produces PWM timing waveforms 158 which serve as inverter GTO firing pulses 82 in response to the requested inverter frequency 48 and the requested inverter voltage percent 74. When Quasi six-step synthesis is selected by the synthesis select 152, the Quasi six-step control 160 responds to the requested inverter frequency 48 and the requested inverter voltage percent 74 to provide the Quasi six-step timing waveforms 162 which serve as inverter GTO firing pulses 82. When the six-step synthesis is selected by the synthesis select 152, the six-step control 164 responds to the requested inverter frequency 48 and the requested braking angle 70 to provide the six-step timing waveforms 166 which serve as inverter GTO firing pulses 82 and the braking apparatus GTO firing pulses 86. When a change in synthesis mode 154 is provided, the transition timing waveforms 170 which serve as inverter GTO firing pulses 82 are provided.

Figure 7:
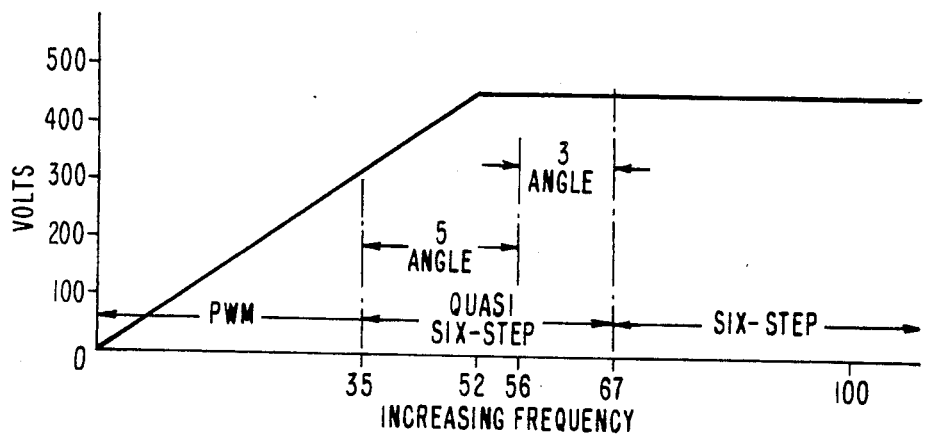
FIG. 7 shows the successive control signal synthesis modes for an increasing frequency operation of the present induction motor control apparatus.

In FIG. 7, there are shown the control signal synthesis mode transitions for an increasing frequency operation of the control signal synthesis apparatus 64. A first pulse width modulation or PWM mode operation in the lower frequency range is provided up to about 35 Hz, where the pulse width modulation is used to provide the conduction time control signals for the GTO switches of the inverter 12. A second quasi six-step mode operation is provided in the middle frequency range between about 35 Hz and about 67 Hz, where a quasi six-step modulation is used to provide these control signals, with a five angle operation provided from 35 Hz to about 56 Hz and a three angle operation provided from 56 Hz up to 67 Hz. A third six-step mode operation is provided in the upper frequency range above base speed of about 67 Hz, where a six-step modulation is used to provide these control signals. If desired, six-step operation could be performed at lower frequencies where the motor voltage first reaches its peak; however, quasi six-step is used instead because this results in slightly better waveforms to the AC motor 12.

Figure 8:
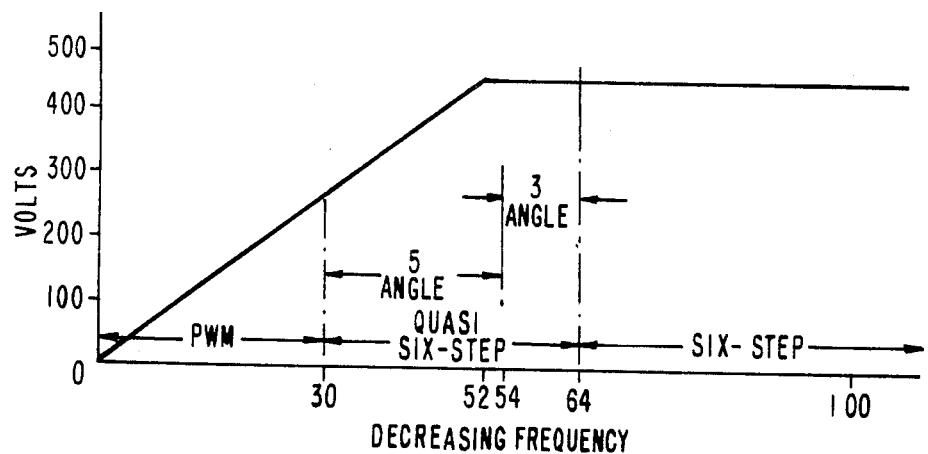
FIG. 8 shows the successive control signal synthesis modes for a decreasing frequency operation of the present induction motor control apparatus shown in FIG. 6.

In FIG. 8 there are shown the control signal synthesis mode ranges for a decreasing frequency operation of the control signal synthesis apparatus 76. The six-step mode extends down to about 64 Hz to provide some hysteresis as compared to the increasing frequency operation and to avoid changing back and forth between synthesis modes. The three angle operation of the quasi six-step mode extends from 64 Hz down to about 54 Hz and the five angle operation extends down to about 30 Hz. The lower frequency range PWM mode operation extends from 30 Hz down to zero. The synthesis ranges shown in FIGS. 7 and 8 may change with various operational changes such as line voltage deviations from the nominal 600 volt value and the use of the auxiliary braking circuit 80.

Figure 9:
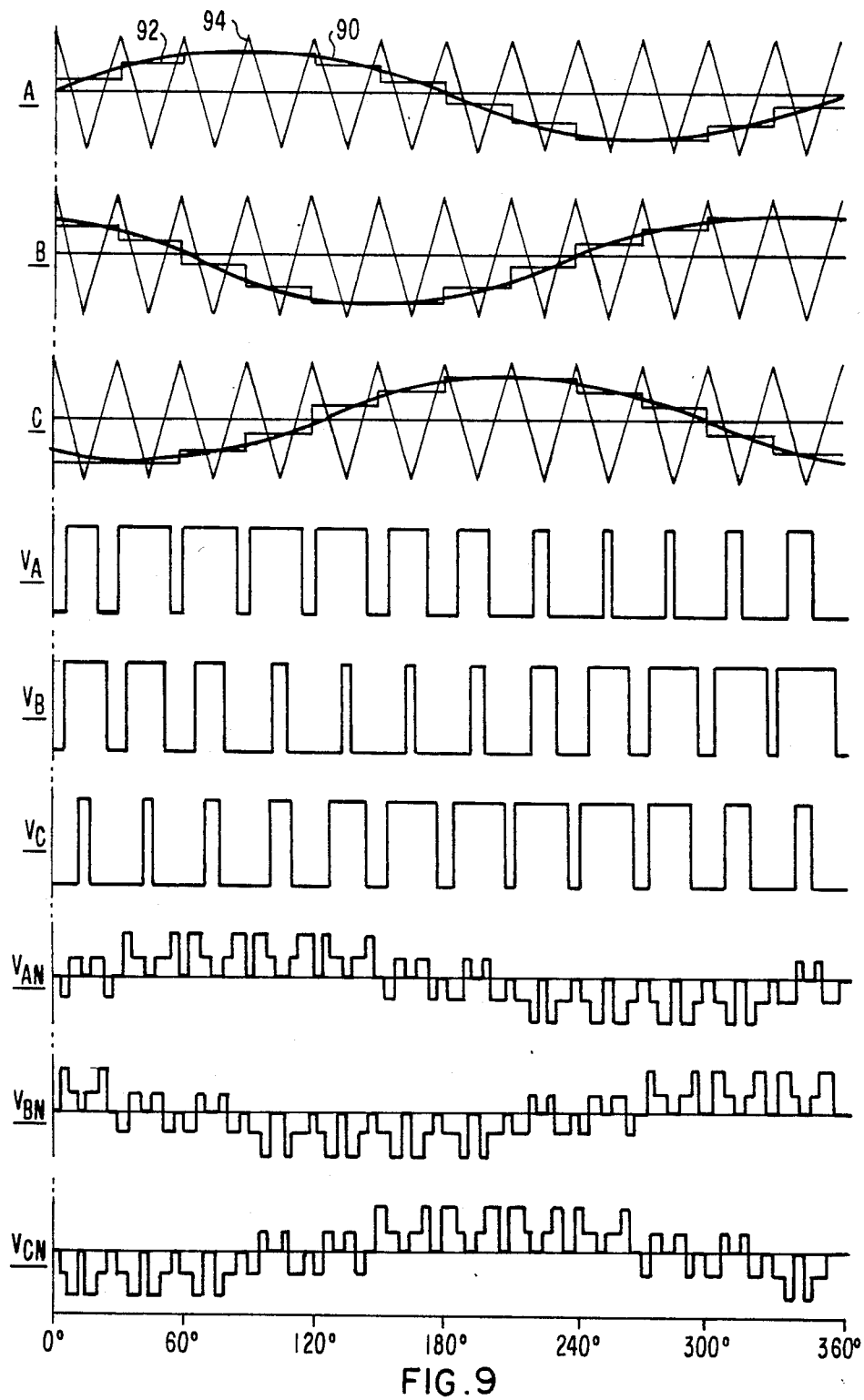
FIG. 9 illustrates the lower frequency control signal synthesis operation to provide PWM modulation of the inverter control signals using a uniform sampling triangulation technique of the present invention.

In FIG. 9 there is shown a waveform synthesis known as uniform sampled PWM that is employed at the low inverter frequencies to provide variable frequency, variable voltage waveforms to the AC motor. The upper waveforms labeled A, B, and C include the desired fundamental sine waveform 90, the approximated sine waveform 92, and the triangular waveform 94 having a frequency equal to the desired GTO switching frequency. The illustrated A, B, and C waveforms correspond to the respective three motor phases #1, #2, and #3. The waveforms labeled VA, VB, and VC determine the actual GTO switching patterns for the GTO switches for the three poles. Whenever a waveform is positive, the plus GTO in that pole is to be ON, and whenever a waveform is negative, the minus GTO in that pole is to be ON. The transition points from plus GTO to minus GTO and from minus GTO to plus GTO are determined from where the approximated sine waveform 92 intersects with the triangular waveform 94. The waveforms VAN, VBN, and VCN illustrate the resulting line to neutral voltages seen by each of the three motor winding phases. The PWM synthesis is used up until about 35 Hz, as shown in FIG. 7.

Figure 10:
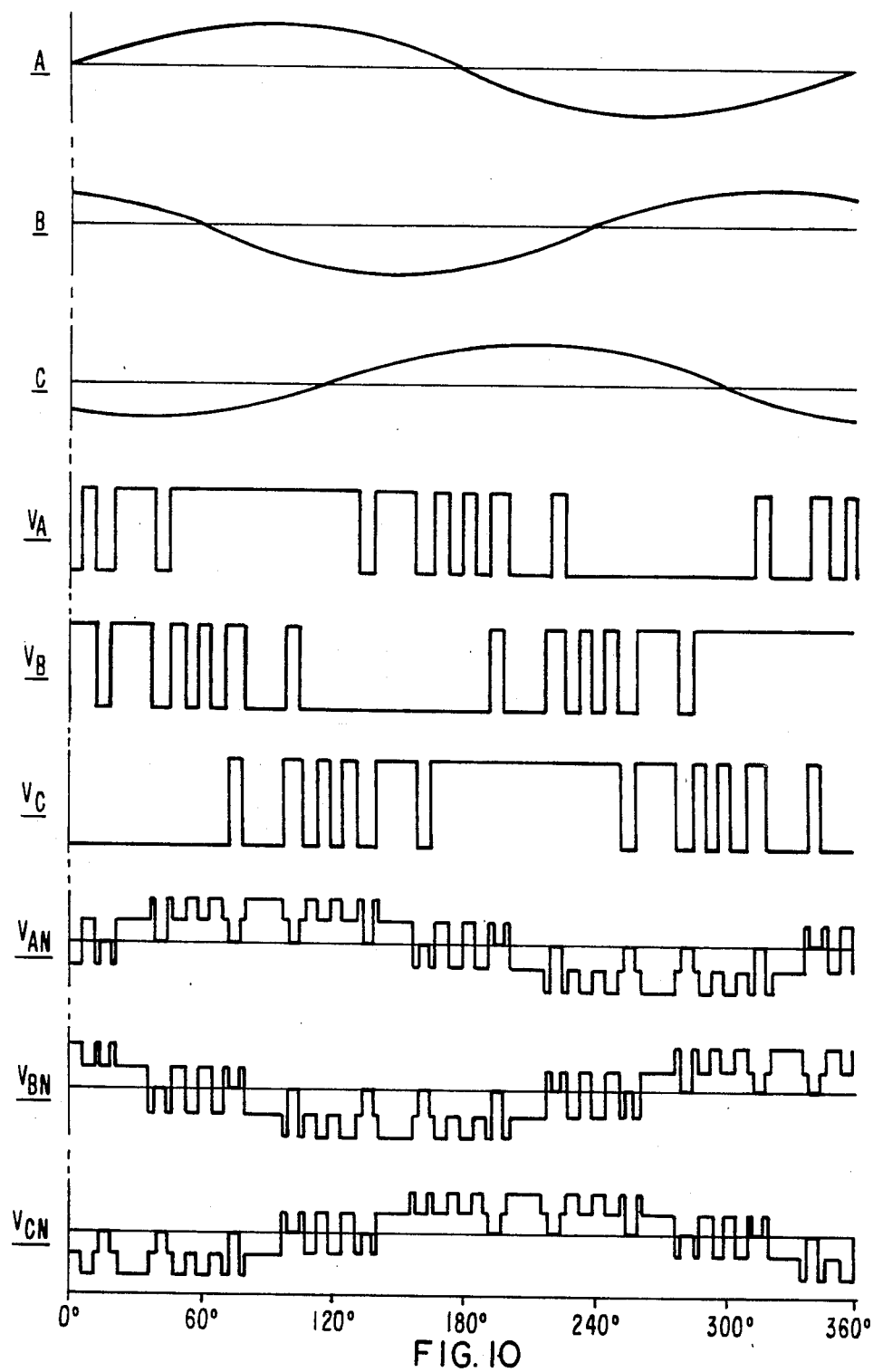
FIG. 10 shows the middle frequency quasi six-step control signal modulation of the present invention.

As shown in FIG. 10, above this 35 Hz frequency another waveform synthesis method known as quasi six-step synthesis is used to provide the desired variable frequency and variable voltage waveforms. The upper wavforms labeled A, B, and C indicate the desired fundamental waveforms to be produced by the inverter. Waveforms VA, VB, and VC indicate the actual GTO switching patterns for the GTO switches of the three poles. The angular duration of each GTO ON time depends upon the desired output voltage. The patterns shown would produce fundamental outputs of approximately 75% of the maximum obtainable inverter output when using six-step synthesis. The angular durations for each percentage from 1 to 99 percent are stored in lookup tables. Waveforms labeled VAN, VBN, and VCN are the resulting line to neutral voltages seen by each of the three motor winding phases. Quasi six-step synthesis is used up until about 67 Hz, as shown in FIG. 7.

Figure 11:
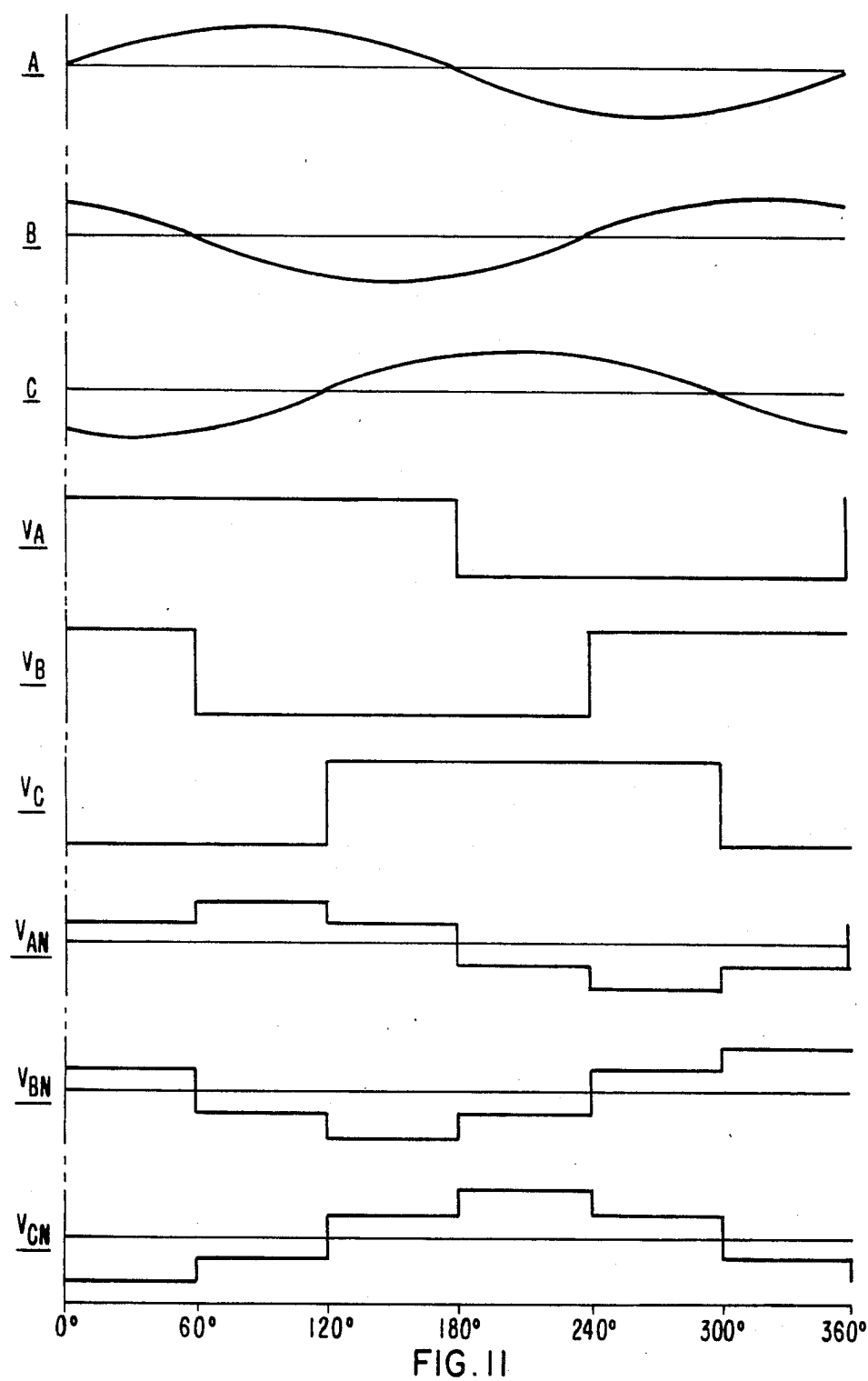
FIG. 11 shows the higher frequency six-step control signal modulation of the present invention.

As shown in FIG. 11, above 67 Hz, the six-step synthesis is used. Six-step synthesis can only produce fixed voltage and variable frequency waveforms to the motor, so it is used at higher frequencies where it is desirable to produce the maximum voltage waveforms to the motor. The upper waveforms labeled A, B, and C indicate the desired fundamental waveforms to be produced by the inverter. Waveforms VA, VB, and VC indicate the actual GTO switching patterns for the respective GTO switches in the three poles. Waveforms labeled VAN, VBN, and VCN are the resulting line to neutral voltages seen by each of the three motor winding phases.

In each of the three synthetic modes, the firing times for each of the six GTO swtiches in the inverter are calculated by a microprocessor and output to programmable timers, which then control the length of time that each corresponding GTO switch is fired. In all three modes, the microprocessor calculates the times ahead of when the GTO switches are actually to be fired, which results in a small delay between when the times are calculated and when they are implemented. These delays are necessary to insure that the microprocessor has the firing times calculated by the time they are needed by the timers, and an effort is made to keep these delay times down to a minimum amount of time. For PWM, the delay is equal to approximately three times the period of the switching frequency, for quasi six-step it is approximately equal to 2/3 to 5/6 of the period of the desired fundamental frequency, and for six-step it is approximately equal to 2/3 of the period of the desired fundamental frequency.

In PWM and quasi six-step the microprocessor calculates the GTO switch firing times and places each time in one of six different storage queues provided for the respective GTO switches. Each queue functions as a first in and first out buffer. If any queue has fewer than one or two firing times in it, the microprocessor calculates new times until all queues meet the minimum requirement storage of one of two firing times. The inverter is started by moving one firing time from each queue to the corresponding programmable timer for the associated GTO switch. The three timers associated with the three motor phase GTO switches to be fired ON first are enabled, and then three new counts are sent to the three started timers to replenish those timers. After a timer for a given pole is enabled it sends a signal to the gate driver of the associated GTO switch to be fired ON, and when the firing time sent to that timer has expired, the timer then sends a signal to turn OFF the GTO switch. At the same time, the timer enables a second timer, which controls the other GTO switch in the same pole of the inverter, which second timer sends a signal to its corresponding GTO to turn ON, and after the second timer times out it will enable the first timer to fire its GTO switch ON. This process is repeated for as long as the inverter is running. If the microprocessor desires to turn the inverter OFF, it can do so by disabling all timers, for stopping the motor control operation. In addition to each timer enabling its counterpart timer upon timing out, it also sends an interrupt back to the microprocessor to indicate that the other timer is started. Upon responding to this interrupt, the microprocessor goes to the queue corresponding to the other timer and retrieves the next time to be placed into the buffer of the other timer.

Figure 12:
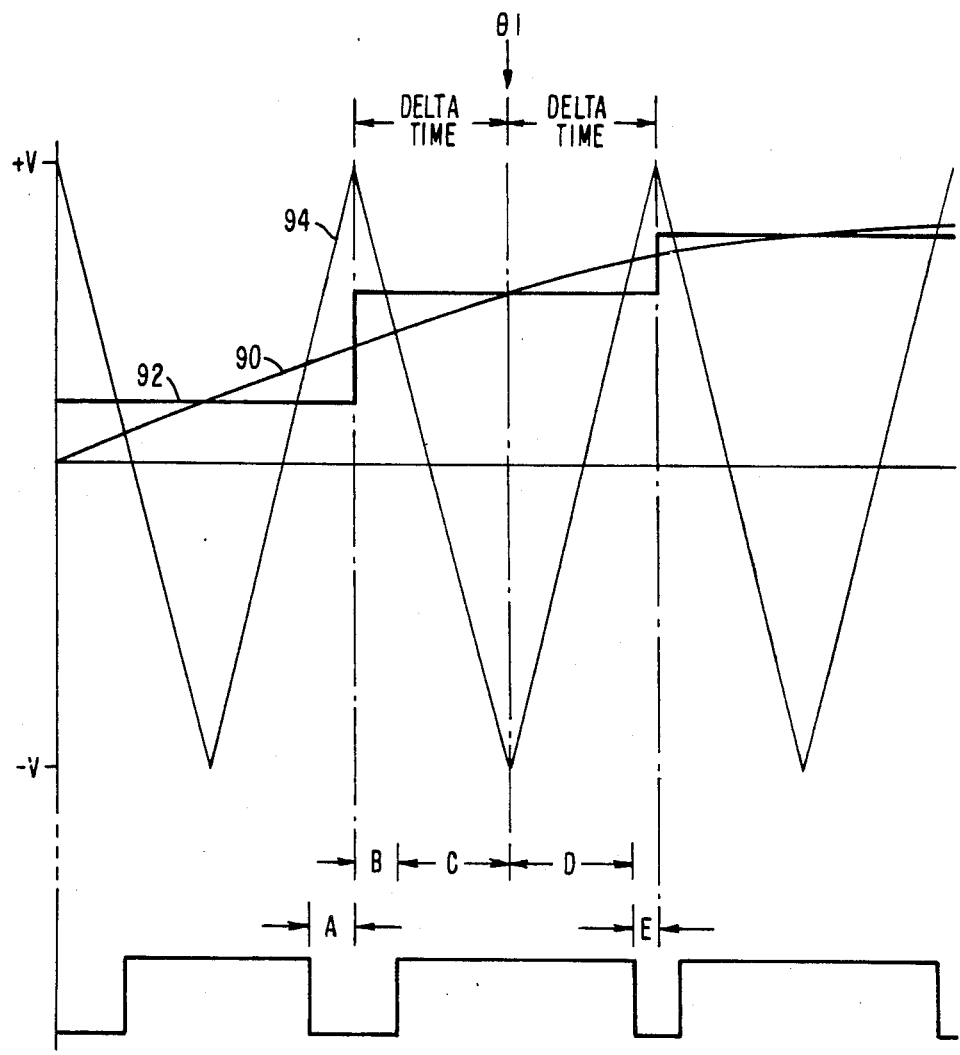
FIG. 12 shows the synthesis of inverter switch firing times for the PWM mode.

The six-step synthesis mode uses the same timer hardware as does the PWM and quasi six-step synthesis modes, but does not use the queues to hold calculated ON firing times in order to cut down on the delay from calculation to implementation of a new firing time The calculation of firing times for the PWM synthesis involves comparing a sine waveform with a triangular waveform for each pole of the inverter as shown in FIGS. 9 and 12. As shown in FIG. 9, phase #2 shown by curve B leads phase #1 shown by curve A by 120 degrees and phase #3 shown by curve C leads phase #2 by 120 degrees. The frequency of the approximated sine waveform 92 is equal to the desired fundamental inverter frequency and the frequency of the triangular waveform 94 is equal to the desired switching frequency of the GTO switches. To determine the voltage amplitude output from the inverter, the following equation is used:

$$V[RMS \text{ peak-to-peak}] = (\text{Sine amplitude}/TRI \text{ amplitude}) * DC \text{ voltage source} * 0.61 \quad (1)$$

A requested line-to-line RMS voltage is derived and then the percentage that voltage is of the maximum obtainable line-to-line RMS voltage is established. From this percentage, the required sine amplitude needed to obtain this voltage is calculated. The triangle waveform is assumed to have an amplitude of 600 volts. The equations used to calculate the sine amplitude are as follows:

$$VMAX = 0.78 * VDC \quad (2)$$

$$V\% = (VREQ/VMAX) * 100 \quad (3)$$

$$A = (V\%/100) * 770 \quad (4)$$

where:
VMAX = Maximum obtainable line-to-line RMS voltage from the present DC source
VDC = Present DC source voltage
V% = Percent of maximum voltage needed out of the inverter (Requested inverter voltage percent).
VREQ = Requested line-to-line RMS voltage out of the inverter
A = Amplitude of the sine waveform to be used.

The frequency of the sine waveform is equal to the desired fundamental inverter frequency and the frequency of the triangular waveform is equal to the desired switching frequency for the GTO switches. This present invention uses synchronous PWM, where the frequency of the triangular waveform is a triplicate multiple of the desired fundamental frequency, as compared with non-synchronous PWM that results in undesirable subharmonics in the frequency spectrum. Using synchronous PWM requires that a new triangle frequency be calculated every time the fundamental frequency is changed. It has also been determined that the switching frequency should normally be greater than 350 Hz to insure that satisfactory harmonics are produced by the inverter, while realizing that increasing the switching frequency too much increases the switching losses in the GTO switches to unacceptably high levels. Therefore, for the PWM mode, using the first switching frequency greater than 350 Hz satisfies the triplicate harmonic multiple criteria. To calculate the switching frequency the following equations are used:

$$\text{Ratio} = (INT(350/(3*FI)) + 1)*3 \qquad (5)$$

$$FS = \text{Ratio}*FI \qquad (6)$$

Where:
Ratio = Ratio of switching frequency to inverter frequency
FI = Requested inverter frequency (IN HZ)
FS = Required switching frequency (IN HZ)
INT () = Function that produces the integer portion of the calculated number within the "()".

This switching frequency is then used as the frequency of the triangular waveform. The equation (5) shows that an increase in the inverter frequency will decrease the ratio. Changing the ratio at other than zero degrees of any of the three sine waveforms will introduce instantaneous phase changes in the three phase AC waveforms being produced by the inverter. At low inverter frequencies where the ratios are high, such a phase change introduces only minor current transients in the motor, but at higher frequencies where the ratio is low, these phase changes are much greater and can introduce considerable current transients in the motor. Therefore, at higher frequencies the ratios are changed at zero degrees of phase #1 since it is more simple to look at phase #1 only.

Having calculated the sine and triangular waveforms, it is now necessary to determine the calculations to determine the GTO firing times in accordance with uniform sampled PWM, with the sine waveform approximated as a square waveform 92 (as shown in FIG. 9) At each low peak of the triangular waveform 94, the value of the sine wave 92 is calculated and used to approximate the sine waveform as a square type waveform. It is easier to now find the intersections between the square wave 92 and the triangular waveform 94 to determine the GTO switch firing times.

FIG. 12 demonstrates the calculations performed for uniform sampled PWM. When it is time to calculate new GTO firing times because the queues are sufficiently depleted, there is calculated for one triangle period the firing times for each of the three phases. FIG. 12 shows three triangle periods for one phase, the time calculations will now be made for the middle triangle period shown in FIG. 12. Before actually finding the intersections between the sine wave 92 and triangle waveform 94, certain preliminary calculations must be performed. If the requested inverter frequency has changed from the last PWM firing time calculations, a new corresponding triangle waveform frequency is determined using previous equations (5) and (6). Once this is done, the following values are calculated:

$$\text{Delta Time} = 0.5*(1/\textit{Tri Frequency}) \qquad (7)$$

$$\text{Last New Delta Theta} = \text{New Delta Theta} \qquad (8)$$

$$\text{New Delta Theta} = \text{Delta Time}*\text{Inv Frequency} \qquad (9)$$

$$\text{Delta Theta} = (\text{New Delta Theta} + \text{Last New Delta Theta})/2 \qquad (10)$$

$$\text{Tri Slope} = \text{Tri Voltage}*\text{Tri Frequency}*4 \qquad (11)$$

Where:
Delta Time = ½ of the triangular waveform period
Tri Frequency = Triangular waveform frequency (Switching Frequency)
Inv Frequency = Requested inverter frequency (Sine Waveform Frequency)
New Delta Theta = Angular offset of the sine waveform realized in the present period of the triangular waveform
Last New Delta Theta = New Delta Theta from the last triangular waveform period
Delta Theta = Angular offset of the sine waveform realized from the center of the last triangular waveform period to the center of the present period
Tri Voltage = Peak amplitude of the triangular waveform
Tri Slope = Slope of the triangular waveform If the requested inverter frequency has not changed since the last PWM calculations, the old calculations will still be valid.

If the requested inverter voltage percent has changed since the last PWM calculations, then some preliminary voltage calculations must be performed in accordance with equation (4). These calculations need not be performed if the voltage percent has not changed since the last PWM firing time calculations.

Once the preliminary frequency and voltage related variables have been calculated, the following equation determines the present sine waveform angular offset (theta) corresponding to the low peak of the triangular waveform:

$$\text{Theta} = \text{Theta} + \text{Delta Theta} \qquad (12)$$

If this calculation results in theta exceeding 360 degrees, a special case arises. Exceeding 360 degrees means that the last triangular period used for calculating PWM firing times ended at exactly 360 degrees (or 0 degrees). Since a transition to quasi six-step can only be made from PWM when phase #1 is at 0 degrees, a check must be made to see if such a transition is desirable. Assuming that no transition is desired, theta is reset to equal new delta theta/2. If theta did not exceed 360 degrees, theta is saved intact. Once the new theta value is calculated and the decision is made to stay in the PWM synthesis mode, the actual sine wave and triangle wave intersection calculations are made.

Having calculated theta 1 for the reference sine wave, the thetas for the other two sine waves are calculated as follows:

$$\text{Theta 2} = \text{Theta 1} + 120 \text{ degrees} \qquad (13)$$

$$\text{Theta 3} = \text{Theta 1} + 240 \text{ degrees} \qquad (14)$$

Each of these theta values correspond to the angular value of the sine waveforms at the low peak of the triangular waveform. It is now possible, with the use of a sine lookup table, to determine the value of each sine waveform at these theta angles:

$$PWM \text{ SIN Voltage } 1 = A*SIN (\text{Theta } 1) \quad (15)$$

$$PWM \text{ SIN Voltage } 2 = A*SIN (\text{Theta } 2) \quad (16)$$

$$PWM \text{ SIN Voltage } 3 = A*SIN (\text{Theta } 3) \quad (17)$$

Where: A = Amplitude of the sine waveforms. Using the equation that follows, it is possible to calculate the time at which the negative sloped portion of the triangular waveform intersects with the value of the sine waveform for phase #1 as shown in FIG. 12:

$$\text{New Time } 1 = (\text{Tri Voltage} - PWM \text{ SIN Voltage } 1)/\text{Tri Slope} \quad (18)$$

Where:
Tri Slope = Absolute value of the slope of the triangular waveform
Tri Voltage = Peak voltage of triangular waveform (600 volts in our case)
New Time 1 = Time period from the beginning of the triangle period to the intersection of the negative slope and sine wave value (Time B in FIG. 12). This is also equal to the time period from the intersection of the positive slope and the sine wave value to the end of the triangle period (Time E in FIG. 12).

Having calculated this time period, the time period is calculated for the minus GTO ON time:

$$\text{Minus Time } 1 = \text{New Time } 1 + \text{Old Time } 1 \quad (19)$$

where:
Minus Time 1 = Time period that the inverter pole #1 GTO whose cathode is connected to the low voltage rail should be turned ON. This is time A+B in FIG. 12.
Old Time 1 = The New Time 1 from the last triangle period calculations. This is the leftover time from the last period's calculations, which is time A in FIG. 12.

Having calculated the time minus GTO "ON time", the following equation is used to calculate the plus GTO "ON time":

$$\text{Plus Time } 1 = (\text{Delta Time} - \text{New Time } 1)*2 \quad (20)$$

where:
Plus Time 1 = Time period that the inverter pole #1 GTO whose anode is connected to the high voltage rail should be turned ON, which is time C+D in FIG. 12.
Delta Time = ½ of the period of the triangular waveform.

These newly calculated plus and minus GTO firing times are placed in their respective queues. The last calculation to be performed concerning phase A is as follows:

$$\text{Old Time } 1 = \text{New Time } 1 \quad (21)$$

where: Old Time 1 = The leftover time period which will become part of the minus GTO firing time that will be calculated the next time firing times are to be calculated, which is time E in FIG. 12. Having calculated a minus GTO firing time, a plus GTO firing time, and a leftover time, the PWM calculations for phase #1 are now complete. The same calculations are performed for phase #2 and phase #3 to yield the firing times and leftover times for these phases.

Figure 13:
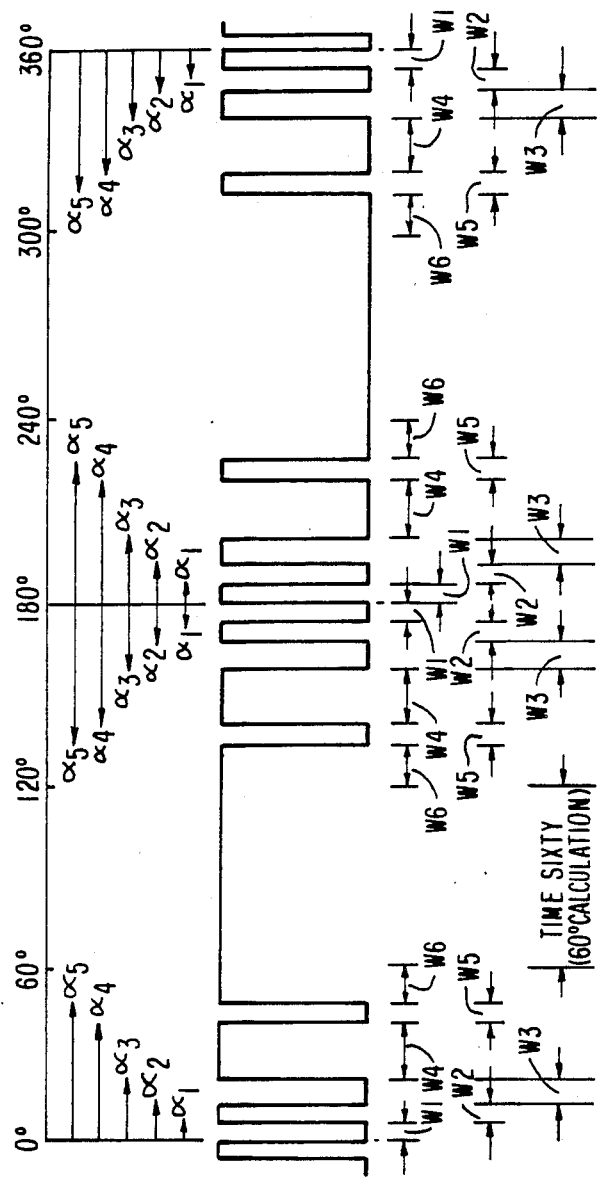
FIG. 13 shows the synthesis of inverter switch firing times for the quasi six-step mode.

The quasi six-step synthesis mode shown in FIG. 13 is similar to six-step except notches are removed from various portions of the six-step three phase waveforms. Therefore, instead of firing the plus GTO for the entire first 180 degrees of each phase as is done in six-step, minus GTO pulses are intermixed into the first 180 degrees of the firing pattern in quasi six-step. And instead of firing the minus GTO for the entire last 180 degrees of each phase as is done in six-step, plus GTO pulses are intermixed into the last 180 degrees of firing pattern in quasi six-step. These notches are placed to produce a voltage out of the inverter having a fundamental component whose magnitude is equal to the requested voltage and whose harmonics are minimized. FIG. 13 shows a five angle quasi six-step firing pattern, to show in detail one of the three phases. The particular firing pattern displayed would result in a fundamental voltage equal to about 75% of that produced by the six-step firing pattern shown in FIG. 14. The notches in the quasi six-step waveform are defined by five alpha angles $\alpha_1$ to $\alpha_5$, which alpha angles are precalculated off-line for each voltage output percentage from 1 to 99 percent. The angles are calculated to produce the correct voltage percentage while providing voltage harmonics which will result in the least possible power losses in the motor. No matter what angles are selected, there are some undesirable harmonics present, which harmonics mainly result in resistive heating in the motor, so an effort is made to minimize the amount of harmonic power losses in the motor. For each voltage percentage, the off-line determined alphas operate with the following relation to result in the correct voltage percentage:

$$\text{Voltage-Percent} = 100 * [1 - 2*\text{Cos(Alpha 1)} + \quad (22)$$
$$2*COS(\text{Alpha 2}) - 2*COS(\text{Alpha 3}) +$$
$$2*COS(\text{Alpha 4}) - 2*COS(\text{Alpha 5})]$$

Since there are many solutions to this equation, the alphas can also be chosen to minimize harmonic power losses. One way to minimize is to define the losses as being proportional to $(VN)^2/N$ where N is the harmonic number and VN is the voltage magnitude of that harmonic, on the theory that power is equal to voltage times current and a very simplified model of the motor is to assume it looks like an inductor, so the harmonic current through a motor would be proportional to (VN/N).

To calculate the voltage magnitudes of the harmonics that a particular set of alpha angles will provide, Fourier analysis can be performed by an off-line computer. The equations used by the computer are defined by the generic equation:

$$VN = ((4 * VDC)/(N * PI)) * (1 - 2*COS(N*\text{Alpha 1}) + \quad (23)$$
$$2*COS(N*\text{Alpha 2}) - 2*COS(N*\text{Alpha 3}) +$$
$$2COS(N*\text{Alpha 4}) - 2*COS(N*\text{Alpha 5})$$

-continued

For N + 5, 7, 11, 13, 17, 19, etc.

Where:
N=Harmonic Number
VN=Line-to-line RMS voltage of the nth harmonic
VDC=DC link voltage=600 volts nominally
PI=3.14

The computer can then search through all possible angle solutions for the one that results in the least amount of harmonic losses and then arranges these angles into a lookup table which can be used to produce the quasi six-step firing patterns.

In practice two different quasi six-step lookup tables are provided, with a five angle table being used up to around 55 Hz, and a three angle table, with alpha 4 and alpha 5 eliminated, is used from around 55 Hz to about 67 Hz as shown in FIGS. 7 and 8. At 55 Hz, the five angle inverter switching frequency is 11 times 55 or 550 Hz, and such a frequency is about the limit that the inverter should be subjected to. By dropping two alphas, the switching frequency at 55 Hz becomes 7 times 55 or 385 Hz. Since the quasi six-step synthesis ability is desired up to almost 70 Hz, the three angle table allows reaching 70 Hz, whereas the five angle table would require too high of a switching frequency.

Having the alpha angle information, it is quite easy to calculate the plus and minus GTO firing times, which calculations are performed in 60 degrees increments. When it is time to calculate additional times for the firing time queues during quasi six-step operation, firing times for 60 degrees of the fundamental frequency are calculated for all three phases. In the quasi six-step synthesis used, alphas must always be less than 60 degrees; therefore, a 60 degree calculation for a particular phase will either result in calculating several plus and minus times or no times at all. FIG. 13 illustrates the calculations for phase #1.

If the current 60 degrees to be calculated is the 60 degrees bounded by 0 degrees and 60 degrees, this 60 degree section will be referred to as the 0 degree section. Before placing any firing times into queues, there must first be calculated the W times, as shown in FIG. 13 there are six w times (W1 through W6). These W times are the actual time durations for firing times. In addition, there must be calculated time sixty, which is the time duration that 60 degrees of the fundamental represents. The set of alpha angles are retrieved from the lookup table that correspond with the requested output voltage percent. The following equations are then used to calculate the necessary time sixty and W times.

Time Sixty=60/(Inverter Frequency*360)  (24)

$W1$=Alpha 1/(Inverter Frequency*360)  (25)

$X2$=Alpha 2/(Inverter Frequency*360)  (26)

$X3$=Alpha 3/(Inverter Frequency+360)  (27)

$X4$=Alpha 4/(Inverter Frequency*360)  (28)

$X5$=Alpha 5/(Inverter Frequency*360)  (29)

$W6$=Time Sixty−$X5$  (30)

$W5 = X5 - X4$  (31)

$W4 = X4 - X3$  (32)

$W3 = X3 - X2$  (33)

$W2 = X2 - X1$  (34)

where:
W1 through W6 are the W times
X2 through X5 are temporary intermediate values Having calculated these needed values, the firing times are placed in the timer queues. When calculating the 0 degree section of a phase, W1 is placed into the minus queue, W2 into the plus queue, W3 into the minus queue, W4 into the plus queue, and W5 into the minus queue of that phase, and W6 would be saved as a leftover old time for that phase. If the 60 degree section of a phase is calculated, Time Sixty is added to the Old Time value. No actual firing times would be calculated during the 60 degree section. During calculations for the 120 degree section W6 is added to the Old time and the total is placed in the plus queue, with W5 placed into the minus queue, W4 into the plus queue, W3 into the minus queue, W2 into the plus queue, and W1 into the minus queue. For the 180 degree section, W1 is placed into the plus queue, W2 into the minus queue, W3 into the plus queue, W4 into the minus queue, and W5 into the plus queue, and W6 would be saved as a leftover Old Time. Calculations of the 240 degree section would not result in times being placed into queues but would result in the Time Sixty being added to the Old Time. In the 300 degree section calculations, W6 would be added to Old Time and the result would be placed into the minus queue, W5 is placed into the plus queue, W4 into the minus queue, W3 into the plus queue, W2 into the minus queue, and W1 into the plus queue.

Since the three phases are always 120 degrees apart, it is only necessary to keep track of the next phase #1 section to be calculated, while the section to be calculated for phase #2 is two sections later and the section to be calculated for phase #3 is four sections later. Therefore, if the 0 degree section is being calculated for phase #1, the 120 degree section will be calculated for phase #2 and the 240 degree section will be calculated for phase #3.

Six-step synthesis is treated differently than PWM or quasi six-step synthesis in that the queues are not used. If the same method of pre-loading queues and later outputting the queue counts to the timers was employed in six-step, the time lag experienced from calculating queue counts and actually timing those counts would be approximately three fundamental periods. Such a time lag could cause serious control problems and, therefore, is not desirable. To cut down on the six-step time lag, the six-step firing times are calculated just before they need to be output to the timers. VA, VB, and VC shown in FIG. 11 represent the GTO firing times for phases #1, #2, and #3, respectively, for six-step synthesis. As in the PWM and quasi six-step operations, when these waveforms are positive, the plug GTO switch in that pole is desired to be ON and when these waveforms are negative, the minus GTO switch in that pole is desired to be ON. In reference to the VA waveform, at 180 degrees the plus GTO is turned OFF and the minus GTO is turned ON. The duration of the ON time for the minus GTO must be in the timer queue prior to this transition point at 180 degrees, and the amount of time prior to this transition that the minus time is loaded is desired to be as small as possible. The microprocessor receives interrupts from the timers at every transition of every phase; therefore, it receives an interrupt every 60 degrees. The last interrupt from the timers prior to the 180 degree transition of phase #1 (VA) would occur at 120 degrees, which is the phase #3 waveform VC transition point. At this 120 degree interrupt, the microprocessor can load the minus GTO timer for phase #1 with its count. At the 180 degree interrupt from phase #1, the plus GTO timer is loaded for phase #2, and at the 240 degree interrupt from phase #2, the minus GTO timer is loaded for phase #3 with its count, and so forth.

Figure 14:
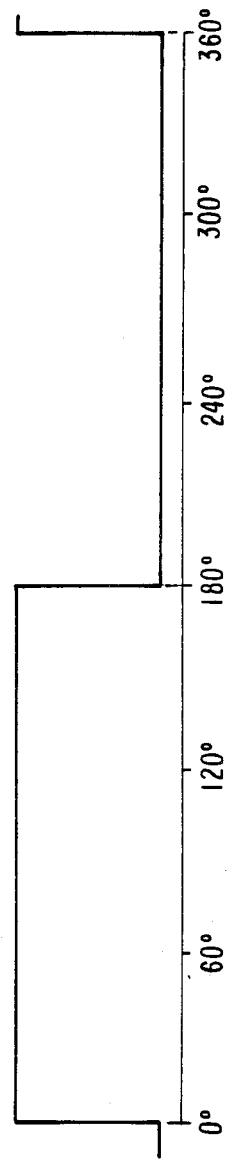
FIG. 14 shows the synthesis of inverter switch firing times for the six-step mode.

At the 120 degree interrupt, the minus GTO timer is loaded for phase #1 with its count; however, before doing so, the minus GTO firing time must be calculated. In six-step, calculations are done in 60 degree increments similar to the quasi six-step calculations described earlier. FIG. 14 is a more detailed drawing of the phase #1. The only time value needed for six-step is the familiar Time Sixty variable, which is also calculated in the quasi six-step synthesis mode. The above equation (24) is used to calculate this value.

As shown in FIG. 14, a six-step firing pulse consists of adding three Time Sixty values together. Due to constantly changing inverter frequencies, each of the three Time Sixty values could be different. In reference to the 120 degree mark of FIG. 11, it is necessary to output the minus GTO firing for phase #1 that will last from 180 degrees to 360 degrees. Also note that at the 60 degree interrupt, the plus GTO firing time is calculated for phase #3 which lasts from 120 degrees to 300 degrees. At the 60 degree interrupt, the calculated times are required for all three phases up until the 300 degree mark, at the 120 degree interrupt, the calculated times are required for all three phases for the 300 to 360 degree portion and upon finishing such calculations, the entire minus GTO firing time is provided for phase #1. In addition ⅔ of the plus GTO firing time is provided for phase #2 and ⅓ of the negative GTO firing time is provided for phase #3.

Upon receiving the 120 degree interrupt, there is calculated Time Sixty. Then the following calculations pertaining to the 60 degrees bounded by the 300 and 360 (or 0) degree marks will be performed:

Six Step Time 1 Minus=Old Time 1+Time Sixty (35)

Old Time 2=Old Time 2+Time Sixty (36)

Old Time 3=Time Sixty (37)

where:
Six Step Time 1 Minus=GTO firing time to be output immediately to phase #1 minus GTO timer.
Old Time 1, 2, 3 are temporary storage variables for unfinished firing pulses.

Upon receiving the 180 degree interrupt, a new Time Sixty value is calculated. Then the following calculations pertaining to the 60 degrees bounded by the 0 and 60 degree marks will be performed:

Old Time 1=Time Sixty (38)

Six Step Time 2 Plus=Old Time 2+Time Sixty (39)

Old Time 3=Old Time 3+Time Sixty (40)

where: Six Step Time 2 Plus=GTO firing time to be output immediately to phase #2 plus GTO timer. Similar calculations are performed at every interrupt received from the GTO timers during six-step synthesis.

Special arrangements must be made in order to change from one synthesis mode to another. The transition from PWM to quasi six-step must only occur when one of the three phases is at 0 degrees, which are the only times that the end of a PWM triangle calculation period corresponds with the beginning of a quasi six-step 60 degree period. To further simplify the PWM to quasi six-step transition, the transition is selected to only occur when phase #1 is at 0 degrees.

Figure 15:
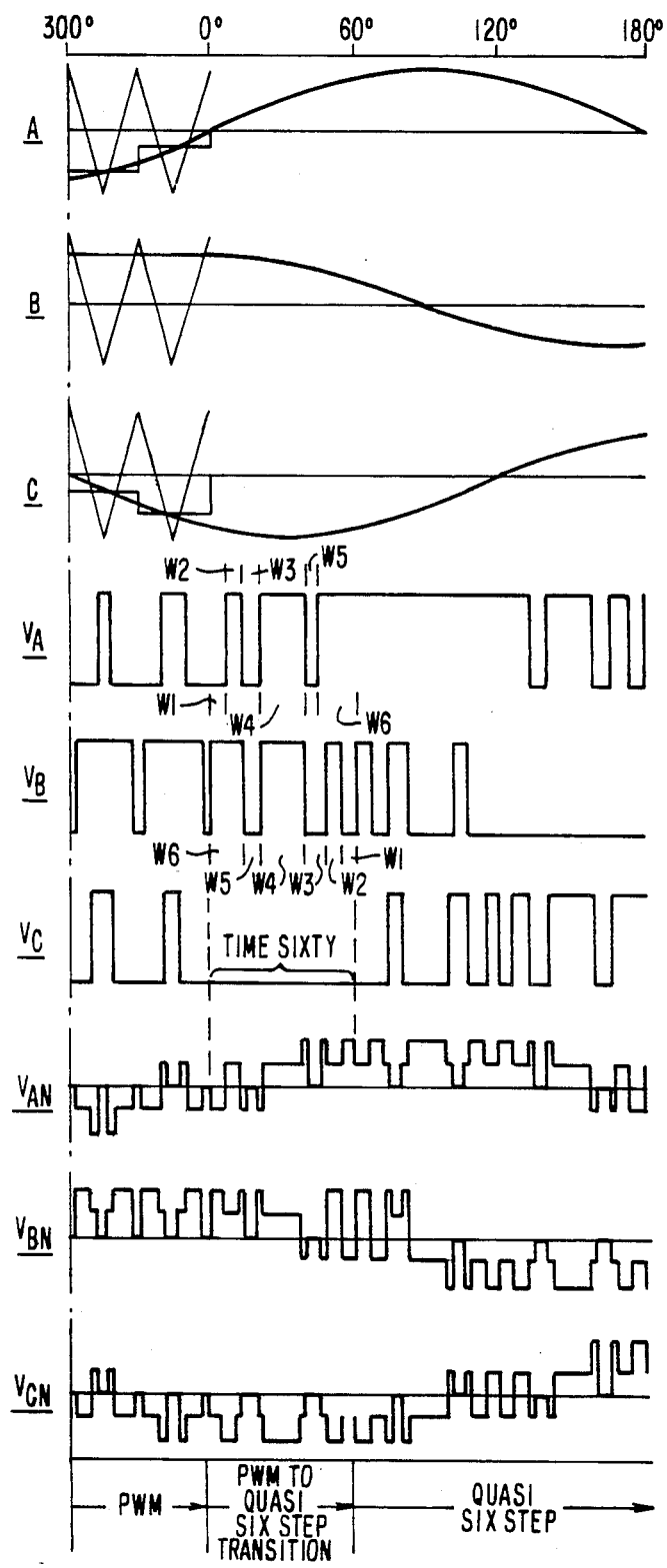
FIG. 15 shows the synthesis transition from the PWM mode to the quasi six-step mode.

FIG. 15 shows the GTO firing times for all three phases during a transition from PWM to quasi six-step. As can be seen in this figure, the transition is made at the 0 degree mark of phase #1. When it is time to calculate PWM firing times for the first triangle period past the 0 degree mark, the switch is made to quasi six-step synthesis, which aborts the PWM calculation and executes a PWM to quasi six-step transition routine shown in FIG. 46. This routine begins by first calculating the needed "W times" for quasi six-step, and then the quasi six-step firing times are placed into the appropriate queues. The following actions are performed to place quasi six-step firing times into queues during this transition routine:

(1) (Old Time 1+W1) Goes into Queue 1 Minus
(2) W2 goes into Queue 1 Plus
(3) W3 goes into Queue 1 Minus
(4) W4 goes into Queue 1 Plus
(5) W5 goes into Queue 1 Minus
(6) Old Time 1 set equal to W6
(7) Old Time 2 goes into Queue 2 Minus
(8) W6 goes into Queue 2 Plus
(9) W5 goes into Queue 2 Minus
(10) W4 goes into Queue 2 Plus
(11) W3 goes into Queue 2 Minus
(12) W2 goes into Queue 2 Plus
(13) W1 goes into Queue 2 Minus
(14) Old Time 3 set equal to (Old Time 3+Time Sixty)
(15) Theta 1 set equal to 60 degrees This provides a normal 60 degree quasi six-step calculation cycle with the exception of taking care of the PWM leftover Old Times. The next time calculations are to be performed, a normal 60 degree quasi six-step calculation cycle will be provided.

Figure 16:
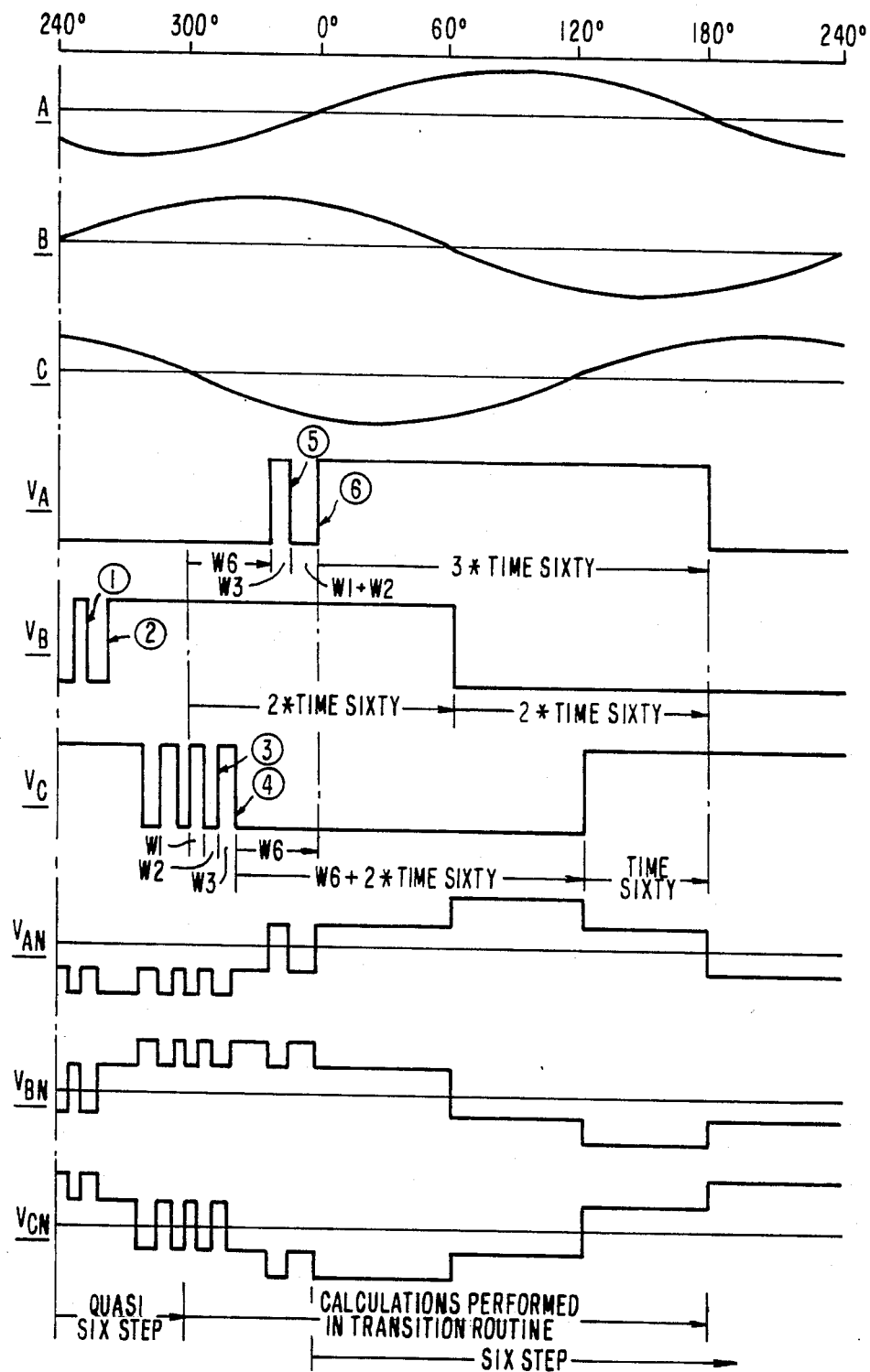
FIG. 16 shows the synthesis transition from the quasi six-step mode to the six-step mode.

The transition from quasi six-step to six-step synthesis shown in FIG. 16 is more complicated than the PWM to quasi six-step transition previously described. The reason for the extra complication is due to the fact that six-step does not use the queues to hold calculated firing times waiting to be loaded into timers as is done in PWM and quasi six-step. The queues must be depleted and the switch made to a no queue operation without upsetting the desired control of the motor. A quasi six-step to six-step transition is possible at any 60 degree mark; however, to simplify the operation the transition point is restricted to the 0 degree mark of phase #1. The GTO firing times are shown for all three phases during a transition from three angle quasi six-step to six-step synthesis. Most transitions will occur from three angle quasi six-step instead of five angle or one angle quasi six-step; however, the procedure will work with five angle or one angle quasi six-step. During the quasi six-step calculation of the 60 degree segment bounded by the 300 and 0 degree portion of phase #1 marks, the decision is made to switch to six-step synthesis, and a provided transition routine shown in FIG. 48 is executed to begin the switch. The 60 degrees bounded by 300 and 0 degrees is processed similarly to quasi six-step synthesis, except for the one minor difference that the phase #1 plus GTO time as defined by W1, which is located at the tail-end of this 60 degree section is not allowed in a quasi six-step to six-step transition so it is appended to the last minus time defined by W2 to form a larger minus time. As can be seen in FIG. 16, W1 is added to W2 to form the last minus GTO time for phase #1 before switching totally to six-step. Besides calculating this last 60 degree portion of quasi six-step, the first 180 degrees of six-step is calculated and the resulting times are placed in the firing queues, with the GTO firing times resulting from this 180 degree calculation being the last firing times to be loaded into the queues. After having calculated the previously mentioned firing times, the transition routine shown in FIG. 48 exits, but sets a flag indicating that it is in a quasi six-step to six-step transition, and as the timer interrupts are received by the microprocessor, it will continue to take counts from the queues and disperse them to the correct timers. However, since the transition flag is set, the microprocessor will not calculate new firing times when the queues are below their minimum number of counts, and eventually the queues will run out of counts. Once the microprocessor encounters an empty queue while attempting to move a count from a queue to a timer, it will not be able to send out a count to the appropriate timer and instead it will set a flag indicating that that particular queue has been depleted in this manner. Eventually, all six firing queues will be depleted. The last interrupt that will result in a queue count not being available is from the plus to minus transition of phase #1 at 0 degrees and marked as point (6) in FIG. 16. At this point, the transition to six-step is complete and normal six-step synthesis can commence with this interrupt. This means that during this interrupt at 0 degrees, the 180 to 240 degree period will be calculated and the resulting phase #2 minus time lasting from 60 to 240 degrees is now complete and can be output to the appropriate timer. In reference to FIG. 16, the following marked points are described as follows:

(1) Interrupt when Queue 2 minus is discovered as empty.
(2) Interrupt when Queue 2 plus is discovered as empty.
(3) Interrupt when Queue 3 plus is discovered as empty.
(4) Interrupt when Queue 3 minus is discovered as empty.
(5) Interrupt when Queue 1 plus is discovered as empty.
(6) Interrupt when Queue 1 minus is discovered as empty; this marks the beginning of six-step synthesis.

Figure 17:
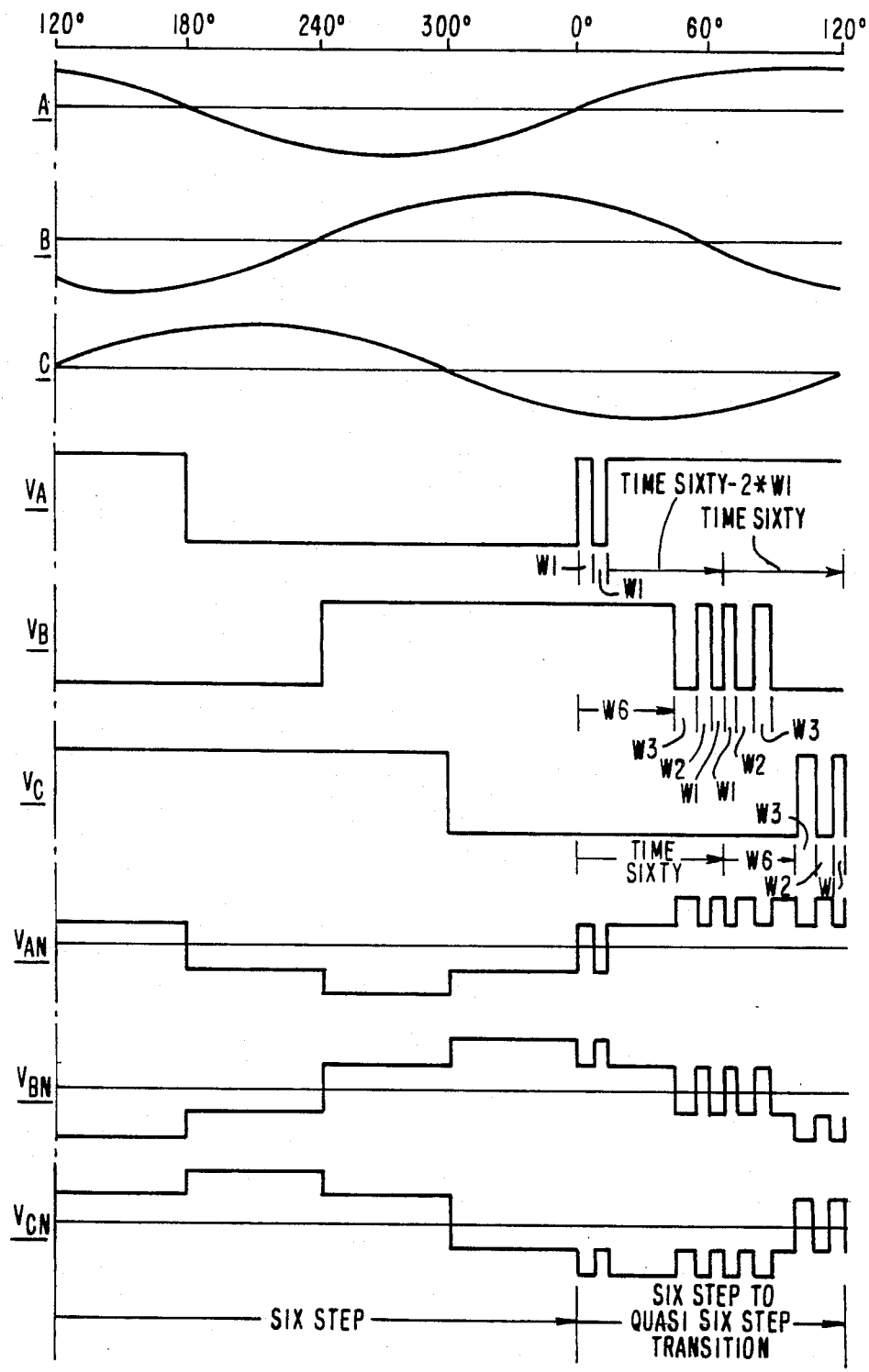
FIG. 17 shows the synthesis transition from the six-step mode to the quasi six-step mode.

The transition from six-step synthesis to quasi six-step synthesis, as shown in FIG. 17, involves going back to using the timing queues. The GTO firing times for the transition are shown from six-step to three angle quasi six-step synthesis. Although the figure shows a transition to three angle quasi six-step, the technique will also work with one angle and five angle quasi six-steps. Most of the time the transition will be to three angle quasi six-step. A transition from six-step to quasi six-step can occur at any sixty degree mark. Since the input voltage from power source 10 to the inverter 11 can rise rapidly in mass transit vehicle and similar load operations, it is sometimes necessary to go from six-step to quasi six-step operation quite rapidly in order to maintain a constant motor voltage if such an input voltage rise occurs. Therefore, it is necessary to allow six-step to quasi six-step transitions at any sixty degree mark. FIG. 17 shows a transition to quasi six-step at one of the six possible transition points. At the phase #3 minus to plus GTO firing transition interrupt which occurs at 120 degrees, the decision is made to switch to quasi six-step, and the normal 60 degree calculation (300 to 0 degrees) is completed, and a flag is set indicating a transition is to be made to quasi six-step. After moving the phase #1 minus GTO firing time to the appropriate timer as is normally done in six-step, the microprocessor responds to the transition flag being set and proceeds to the transition routine shown in FIG. 49. The transition routine first calculates the needed W times and then uses the W times to calculate GTO firing times for the next 120 degrees of synthesis including two 60 degree sections, and the firing times for these two sections are placed into their respective queues. Th calculations for both sections are similar to normal quasi six-step calculations except for phase 1 for the first section, which requires a plus GTO firing time at the start of this section because of the preceding six-step minus GTO time; however, normal quasi six-step would result in the first time being a minus GTO time. Therefore, the calculations are fudged to have a plus time come first, as shown in FIG. 17. These fudged times along with the other firing times are as follows:

(1) W1 goes into Queue 1 Plus
(2) W1 goes into Queue 1 Minus
(3) Old Time 1 set equal to (2*Time Sixty)−(2*W1))
(4) (Old Time 2+W6) goes into Queue 2 Plus
(5) W3 goes into Queue 2 Minus
(6) W2 goes into Queue 2 Plus
(7) W1 goes into Queue 2 Minus
(8) W1 goes into Queue 2 Plus
(9) W2 Goes into Queue 2 Minus
(10) W3 goes into Queue 2 Plus
(11) Old Time 2 set equal to W6
(12) (Old Time 3+Time Sixty+W6) goes into Queue 3 Minus
(13) W3 goesinto Queue 3 Plus
(14) W2 goes into Queue 3 Minus
(15) W1 goes into Queue 3 Plus Since six-step did not keep counts in the timer buffers and quasi six-step must keep counts in the timer buffers, the microprocessor must now replenish all of the timer buffers except for the phase #1 minus timer (that was just filled with the last six-step firing time). After resetting the transition to quasi six-step flag, the microprocessor is finished with the transition, and from this point on the synthesis is treated as quasi six-step.

Figure 18:
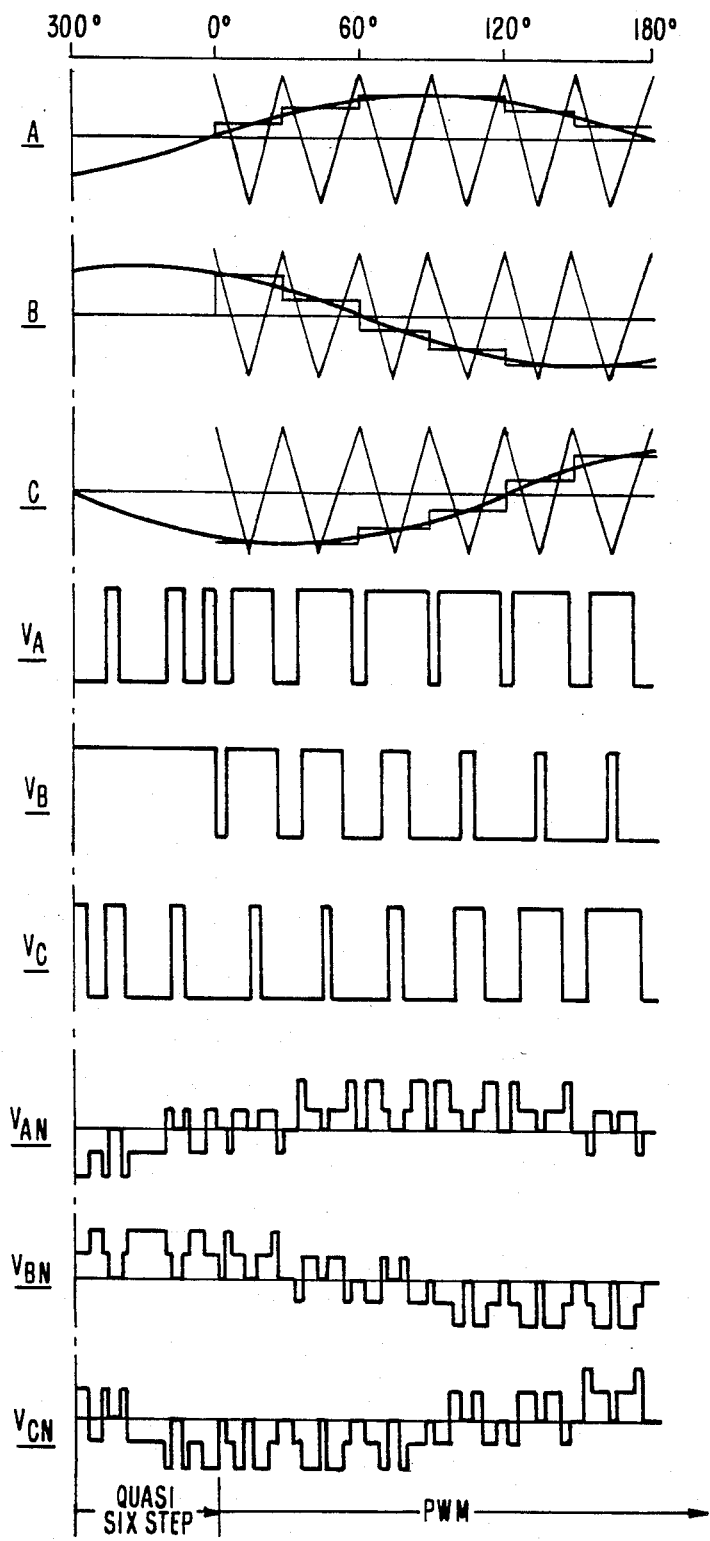
FIG. 18 shows the synthesis transition from the quasi six-step mode to the PWM mode.

The switch from quasi six-step synthesis to PWM shown in FIG. 18 can only occur at the 0 degree mark of any of the three phases for the same reasons given for the PWM to quasi six-step transition. To simplify the operation, such a transition will be allowed only when phase #1 is at its 0 degree mark. FIG. 18 shows the GTO firing times for all three phases during a transition from quasi six-step to PWM synthesis. During the quasi six-step 60 degree calculation routine for the 0 to 60 degree sement, the decision is made to switch to PWM synthesis. The transition routine called needs to do very little calculation for such a transition. The only basic actions taken are as follows:

(1) Old Time 2 goes into Queue 2 Plus
(2) Old Time 1 and Old Time 2 set equal to zero (3) Theta 1 and New Delta Theta set to zero Soon after this transition routine is executed, the PWM firing times are calculated for a triangle period. The operations done in the transition routine will insure that a normal PWM calculation cycle can be performed without any problems.

Transitions from one type of synthesis to another can result in a disturbance in the motor operation, which disturbances can result in undesirable momentary current spikes. To avoid flipping back and forth between synthesis techniques, hysteresis is built into the transition points, as shown in FIGS. 7 and 8. When going up in motor speed as shown in FIG. 7, the transition from PWM operation to quasi six-step operation is done at about 65% of the maximum obtainable voltage, which is 65% of 468 volts RMS line-to-line with a 600 volt source, or at a fundamental inverter frequency of about 35 Hz, whichever occurs first. The five angle quasi six-step operation is used from this point until about 56 Hz, where a switch is made to a three angle version of quasi six-step with a minimum angle of 4.5 degrees. The three angle quasi six-step is similar to the five angle quasi six-step except that the lookup table contains only three angles instead of five angles and the minimum angle is 4.5 degrees instead of 3.5 degrees. When he inverter frequency reaches about 67 Hz, a switch is made to six-step synthesis. When reducing motor speed as shown in FIG. 8, the transition from six-step to three angle quasi six-step occurs when the inverter frequency reaches about 64 Hz. The transition from 3 angle quasi six-step to 5 angle quasi six-step occurs at about 54 Hz. The transition from quasi six-step to PWM occurs at about 59% of the maximum obtainable voltage or when we reach an inverter frequency of about 30 Hz, whichever occurs last. Thusly, the PWM to quasi six-step transition has a voltage hysteresis of 6% and a frequency hysteresis of about 5 Hz, the 5 angle to 3 angle quasi six-step transition has a frequency hysteresis of about 2 Hz; and the quasi six-step to six-step transition has a frequency hysteresis of about 3 Hz.

Figure 19A:
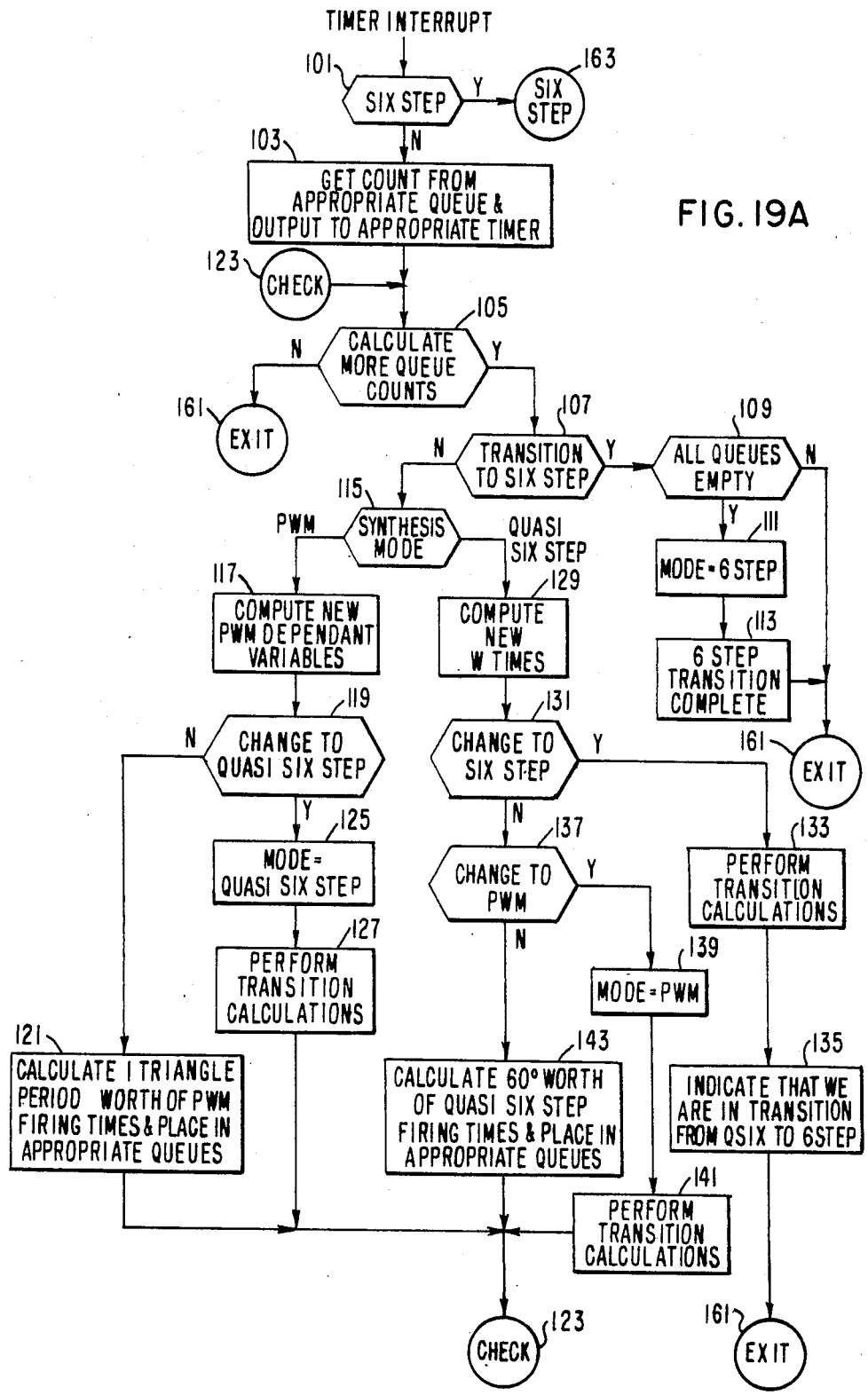
FIGS. 19A and 19B show a flow chart to illustrate the control signal synthesis operation in response to a timer interrupt indicating the need for a new time delay control signal and the execution of that timer interrupt.
Figure 19B:
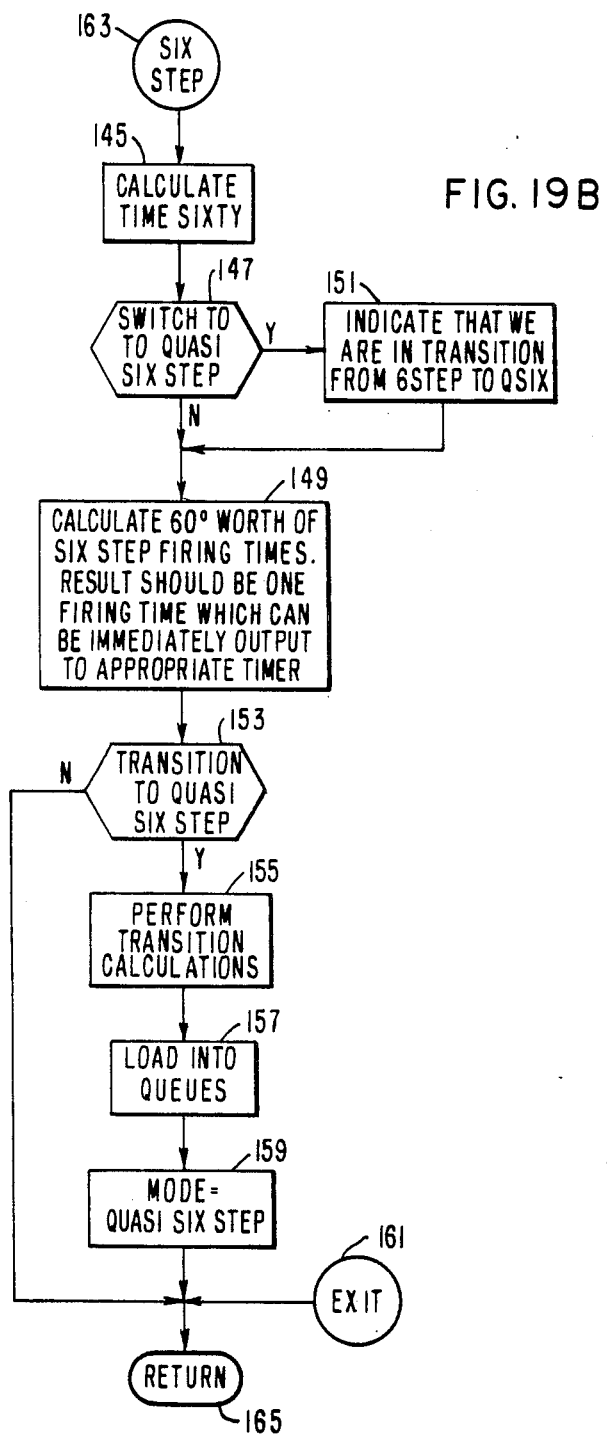

The timer interrupt flow chart shown in FIGS. 19A and 19B shows the general overall waveform synthesis operation in response to an interrupt from a hardware timer indicating that another timer is ready for a new timer count. The software keeps track of when its outputs are expired in this manner, since a timer interrupt is provided by any one of the six different timers. At block 101 a decision is made to check if the present mode is six-step or some other synthesis mode, and the reason is that six-step does not use the counter queues which are used for quasi six-step and PWM modes. If not in six-step mode, at block 103 a count is obtained from the appropriate queue and output to the appropriate timer as indicated by the timer interrupt. At block 105 a check is made to see if there is a need to calculate more queue counts, since a count was taken from a queue and this depleted that queue such that perhaps there may be a need to calculate more queue counts. If there is no need to calculate them, the program goes to the exit, which is the end of routine. If the answer is yes, then a check is made at block 107 to see if the operation is transitioning to six-step. If a transition is being made, since the six-step mode does not use the queues, when going from quasi six-step mode to six-step mode the queues are depleted to use up all of the remaining counts, so more counts are not now calculated. So if the answer to that is yes, a check is made at block 109 to see if all of the queues are empty. If not, the program goes to the exit and keeps getting timer interrupts until all of the timers are eventually empty. If the answer is yes, at block 111 the mode is set equal to six-step, and any additional timer interrupts will be treated in the six-step mode. At block 113 a flag is set to indicate the six-step transition is complete. If the answer is no at block 107, then a check of the synthesis mode is made at block 115 to see if the operating mode is PWM or quasi six-step. If the mode is PWM, at block 117 there are computed new PWM dependent variables, such as the height of the sine wave and the frequency of the sine and the triangle waveforms. At decision block 119 a check is made to see if there is a desire to change to quasi six-step, which is based on frequency and voltage requirements. If the answer is no, this indicates the mode will remain in PWM, and at block 121 there are calculated one triangle period of PWM firing times and those times are placed in the appropriate timer queues, which is done for all three motor phases. The program then goes to 123 labeled check, which feeds into block 105 again to check if there is a need to calculate more queue counts and this loop operates until there is no need to calculate more queue counts. If yet at block 119, there is a desire to change to quasi six-step mode, and at block 125 the mode is set equal to quasi six-step. At block 127 some transition calculations are performed, and the program goes back to block 105 to check the need to calculate more counts.

Going back to block 115, if the synthesis mode is quasi six-step, at block 129 new W times are calculated, which are the widths of the various control pulses W1 through W6. At block 131 a check is made to see if there is a desire to change to the six-step mode based on the desired inverter frequency and desired inverter voltage. If there is a desire to change to six-step at block 131, at block 133 some transition calculations are performed and at block 135 an indication is made of the transition from quasi six-step to six-step by setting a flag that is checked in block 107 to see if the operation is transitioning to six-step. After setting the flag in block 135 to indicate the operation is in transition from quasi six-step to six-step, the program goes to check and block 105. If the answer is no at decision block 131 then at decision block 137 the question is asked is there a desire to change to PWM. If the answer is yes, at block 139 the mode is set to PWM and at block 141 transition calculations are performed for that transition to PWM. The program then goes back to check and block 105. If the answer is no at block 137, then at block 143 the calculation is made for 60° worth of quasi six-step firing times and these are placed in the appropriate queues and the program goes to the exit. This completes the quasi six-step and PWM cases.

Going back to block 101, if the mode is six-step, then at block 145 the variable called time sixty is calculated. At decision block 147 a check is made to see if there is a desire to switch to quasi six-step, and if the answer is no, then at block 149 there is calculated 60° worth of six-step firing times to result in one full firing time being calculated and which can be output to the appropriate timer. The incomplete times for the other two phases are saved. Going back to block 147 if the answer was yes to indicate a switch to quasi six-step, at block 151 a flag is set to indicate that the control operation is in transition from six-step to quasi six-step. The program then goes to block 149 to finish up the six-step calculation because a time is needed right then to output to the appropriate timer. Then at block 153, a check is made for transitioning to quasi six-step, where the flag set in block 151 is checked. If the answer is no, the program returns until another timer interrupt occurs. If the answer is yes, at block 155 new transition calculations are performed as necessary to go to quasi six-step. At block 157 the calculated transition times are loaded into the timer queues to restart the queues and to replenish the timer buffer counts. At block 159 the mode is set equal to quasi six-step.

Figure 20:
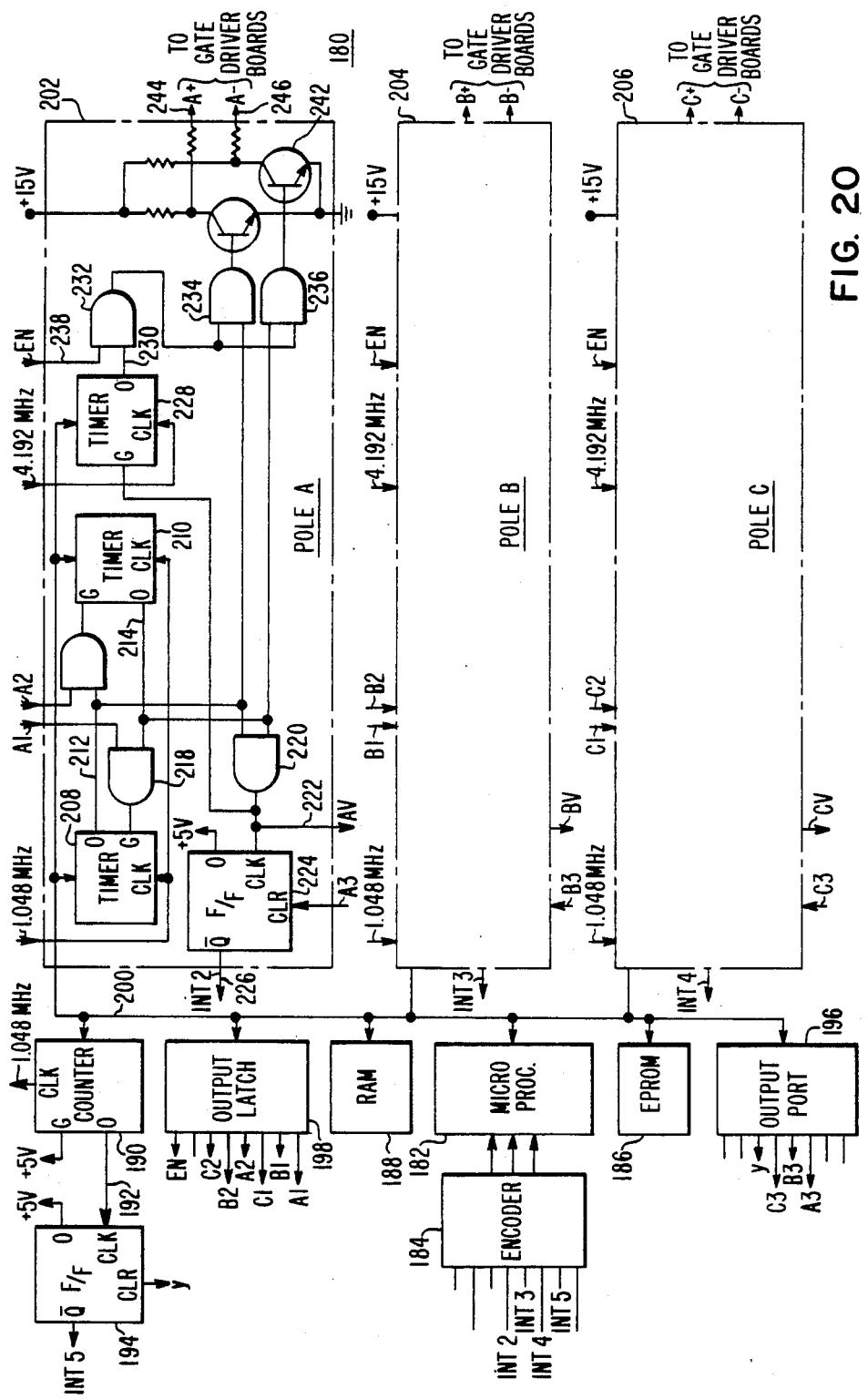
FIG. 20 schematically shows the hardware portion of the inverter synthesis control apparatus of FIG. 4.

In FIG. 20 there is shown the synthesis control hardware apparatus 180 including in the inverter and braking synthesis apparatus 76 shown in FIG. 4. The microprocessor 182 receives interrupts from the encoder chip 184. There are two 8-bit wide EPROMS 186 in which the control program is stored. There are two 8-bit RAM chips 188. There is an 8254 counter chip 190, including three counters, and each counter has an input gate, an output pin and a clock input. With a clock input of 1.048 MHz, a square wave output 192 is provided having a frequency of 720 Hz to function as the real time interrupt for controlling the motor controller 62 operation. The square wave output 192 goes into the flip-flop 194 which for each rising edge provides a $\overline{Q}$ output that will go low to cause an interrupt to the microprocessor 182. Once the microprocessor 182 services that interrupt, it toggles bit Y on the output port 196 to clear the interrupt INT5 so that the interrupt is taken away. Also on chip 196 there are three other interrupt clears A3, B3 and C3 which are provided to the respective poles A, B and C. The output latch chip 198 is also on the address, data, and control lines 200. The output latch 198 is involved in the synthesis operation as an output port with control lines for the synthesis. The synthesis control apparatus 180 includes three blocks 202, 204 and 206, with one for each of the motor phases A, B, and C, respectively. Each of the motor pole control blocks 202, 204 and 206 is similar in operation. Block 202 for pole A includes two timers 208 and 210. Each of timers 208 and 210 is a third of a timer chip, such that timer 208 in pole A plus the corresponding timer in pole B and the corresponding timer in pole C are all timers on one chip and the same arrangement is provided for timer 210. The timer 208 is the A plus timer, which controls the length of the firing pulse that will turn on the A plus GTO, which can be the upper GTO G1 in the inverter 11 shown in FIG. 2. The timer 208 includes the clock input, the gate input and an output. Whenever the output 212 goes low, the A plus GTO G1 will be turned on and whenever the output 212 is not low, the A plus GTO G1 would be turned off. The timer 210 controls the A minus GTO G2, such that when its output 214 goes low, the A minus GTO G2 will be turned on and whenever the output 214 is not low the A minus GTO G2 will be turned off. The outputs 212 and 214 are never low at the same time so G1 and G2 are not turned on at the same time. When the output 212 of the A plus timer 208 goes low, the timer 208 proceeds to start counting while its output 212 remains low and the output 212 goes high when its predetermined count is expired. The output 212 when it goes high gates the A minus counter 210 to provide a low output 214 until the predetermined count of the A minus timer 210 is expired, and the output 214 then goes high to gate the A plus timer 208. This operation continues as a ring around circuit so the timers 208 and 210 successively gate each other back and forth. The A1 and A2 control pins are provided for first start up to get the operation of the timers 208 and 210 started. The A1 and A2 control pins will both be low when the motor control apparatus is initially powered up. Both of the outputs 212 and 214 will be high and they are controlled by the output board chip 198 providing the A1 and A2 inputs to the AND gates 218 and 220. When the control apparatus 180 is first powered up, the inputs A1 and A2 are both low. As long as A1 is held low, the gate of timer 208 will remain low, irregardless of output 214. As long as A2 is held low, the gate of timer 210 will remain low, irregardless of output 212. Without gate inputs, the timers 208 and 210 will remain inactive, and outputs 212 and 214 will be high. The start up initializes the programmable timers 208 and 210 with the desired respective time periods that are input over the address, data, and control lines 200. If it is desired to start the A minus timer 210 first, which is done for the normal PWM operation, output pin A2 is set to a high while output pin A1 is kept at a low. The output high to A2 will cause the gate of A minus timer 210 to go high, and this will start the timer 210 counting the loaded predetermined time period which will cause the output 214 to go low after about a microsecond. After setting output pin A2 to a high, the microprocessor waits a few microseconds to allow signal 214 to go low, then it outputs a high to A1. The high that is output to A1 and the AND gate 218 will not change the output of the AND gate 218 which will be held low by the output of the A minus timer 210. Once A1 and A2 are both high, then the circuit operation begins and every time a count in one of the timers 208 or 210 is finished, an interrupt is provided to the microprocessor 182 so that when the A minus timer 210 is finished, its output 214 goes high. Output 214 also goes to one input of the AND gate 220, with the other input to the AND gate 220 being the output 212 of the A plus timer 208. When output 214 first goes high, there is about a one microsecond delay before output 212 goes low. This delay allows output 222 from AND gate 220 to go high for about one microsecond before returning to the normally low state. A similar one microsecond high pulse occurs whenever the plus timer 208 finishes timing a pulse resulting in output 212 changing from a low to a high state. This one microsecond control signal 222 is enough to clock the flip-flop 224 so that the INT2 output 226 will go low and that low on the INT2 output of flip-flop 224 will cause an interrupt to the microprocessor 182, which services that interrupt 226 to reset the flip-flop 224 by the output of a low on the A3 input, which is an output of the output port chip 196 so it will reset the interrupt. This AV output 222 for motor pole A goes to the braking apparatus 80 and the braking operation of pole A is timed off the output 222. This output 222 is a one microsecond output pulse that is provided each time that a pole GTO is turned off so it corresponds with a voltage crossover of the pole A. The respective motor pole control blocks 204 and 206 have BV and CV outputs which control the braking operation for the B and the C poles in relation to respective voltage crossovers.

After firing the A plus GTO and before firing the A minus GTO for a given inverter motor pole, the A plus GTO has to be off for 30 to 35 microseconds before the A minus GTO is turned on. The timer chip 228 is programmed with a count of about 30 to 35 microseconds. Whenever the AV output 222 transitions from low to high, it gates the timer 228 to have a low output pulse 230 lasting around 30 microseconds, which is input to the AND gates 232, 234 and 236 to shut off both of the inverter pole A GTOs while this output 230 is low. In this way, timer 228 acts to turn off both GTOs in pole A for 30 to 35 microseconds whenever a transition occurs where one GTO that was on is to be turned off and the other GTO is to be turned on. This 30 to 35 microsecond dead time insures that the GTO being turned off is indeed off before the other GTO is turned on, thus preventing a shoot through fault in the inverter 11. The EN enable signal 238 which also goes to the other poles B and C, operates such that if the signal 238 is a one, the synthesis can turn on the pole GTOs and if the signal 238 is a zero, all of the pole GTOs will be turned off. A low output 230 from chip 228 will also cause both GTOs of pole A to be turned off. If there are input lows to both of the transistors 240 and 242 they will be off, in which case both the A plus output 244 and the A minus output 246 will be high which will cause no current flow to the pole A GTOs. The gate driver board is operative to fire the pole A GTO switch G1 and switch G2 as shown in FIG. 2 and is looking for a drive current in the direction from A+ 244 to A− 246 to fire the A plus GTO switch G1 and a drive current in the direction from A− 246 to A+ 244 to fire the A minus GTO switch G2.

The gate drive board is well known for this purpose to provide the right voltages to the GTOs. The gate driver board includes opto-isolators so when the current is flowing in one direction, one opto-isolator will conduct and when the current is flowing in the other direction, the other opto-isolator will conduct, to assure that both gate driver boards will never be turned on at the same time and if current is flowing in neither direction then neither GTO will be turned on, which happens when the enable signal 238 is low or the dead time timer 228 provides a low output 230. When the A plus timer 208 provides a low on its output 212 a low is provided to the input of AND 234, and assuming that the output of AND 234 is high since there is not a dead time, the transistor 240 will be off and at the same time transistor 23 will be on because the output 214 of the A minus timer 210 will be high. This causes current flow, when the transistor 240 is off and transistor 242 is on, in the direction of A+ 244 to A− 246 and that fires the A plus GTO G1.

Figure 21:
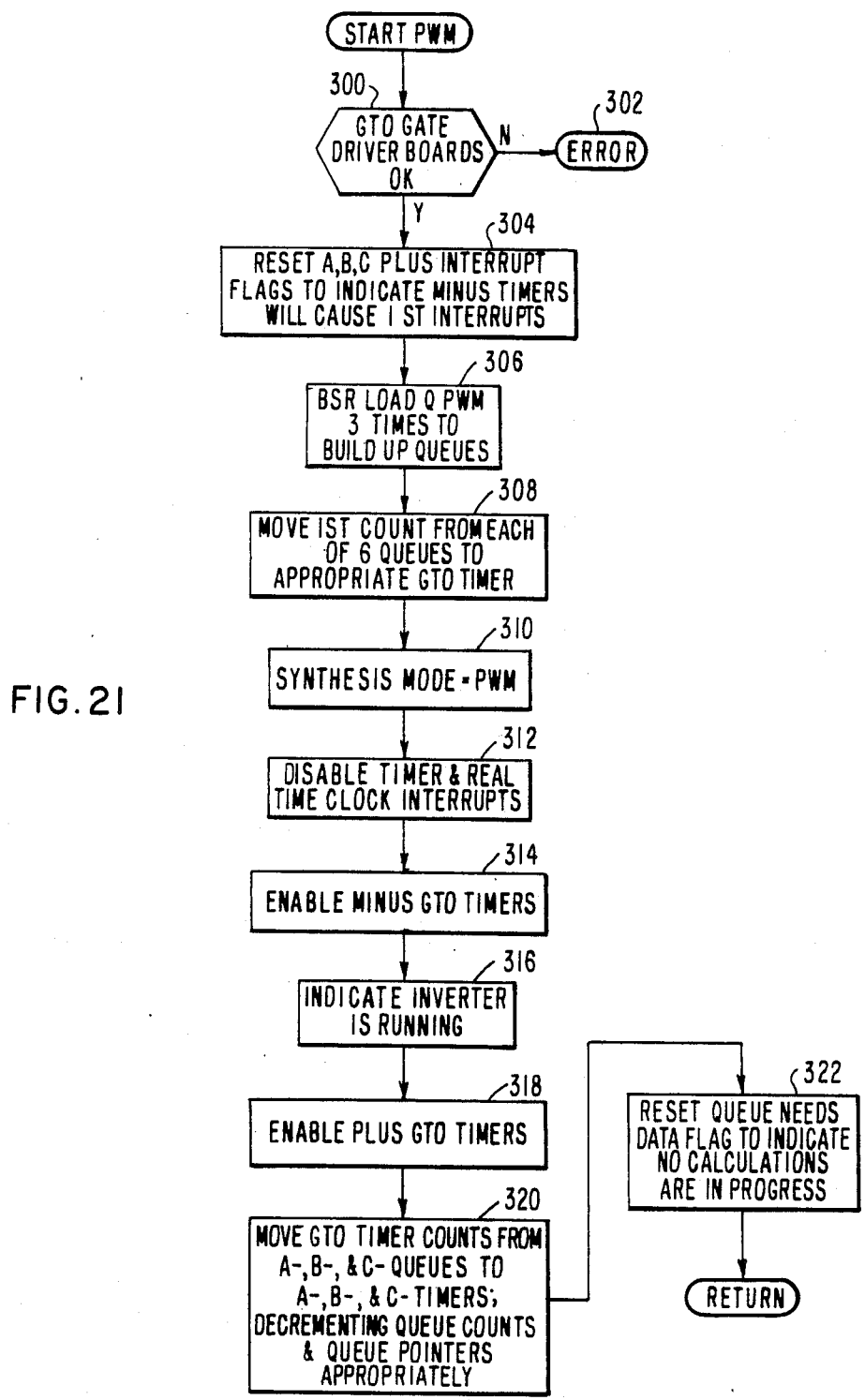
FIG. 21 shows a flow chart for the start PWM mode.

In FIG. 21 there is shown a flow chart to illustrate the start of the PWM operation in response to a start up request from the operator. In block 300 a check is made of the gate drive boards, which have a signal that indicates they are okay or not okay. If not okay, then the program goes to an error routine 302. If the boards are okay, at block 304 the A plus interrupt flag, the B plus interrupt flag, and the C plus interrupt flag are reset to indicate that the minus timers will cause the first interrupts. At block 306 three triangle periods worth of PWM pulses are calculated and loaded into queues. In block 306, the initials BSR are used as an abbreviation for Branch Subroutine and is used throughout the flow charts. In the case of block 306, three calls will be made to the subroutine Load Q PWM. In block 308 the first count from each of the six queues is moved to the appropriate GTO timer, for loading the timers with their first counts. In block 310 the synthesis mode is set equal to PWM. In block 312 the timer and realtime clock interrupts are disabled to finish the start-up of the PWM mode before enabling the interrupts. At block 314 the minus GTO timers are enabled, since the minus GTO timers are started first, as shown in FIG. 9. In block 316 a flag is set indicating that the inverter is running, and in block 318 the plus GTO timers are enabled, but they do not start counting until the minus pulses are up. In block 320 the GTO timer counts are moved from A-, B-, and C- queues to their respective timers, because one timing pulse is started in each of those timers and another time count can be loaded into the buffer. Also, the queue counts and pointers are decremented appropriately. At block 322 the queue needs data flag is reset to indicate that no calculations are in progress. A return is made, and the PWM synthesis is started.

Since there are three motor poles A, B and C, there are three timer interrupt handling routines called respectively interrupt procedure 2, interrupt procedure 3, and interrupt procedure 4. If it is desired for the motor to go forward, the phase relationship shown in FIG. 9 is used. If it is desired for the motors to go in reverse, then phases B and C are switched. In the software, when forward operation is desired, phase 1 is loaded into the A queues, phase 2 into the B queues, and phase 3 into the C queues, but for reverse operation phase 1 is loaded into the A, phase 2 is loaded into the C, and phase 3 is loaded into the B queues.

Figure 22:
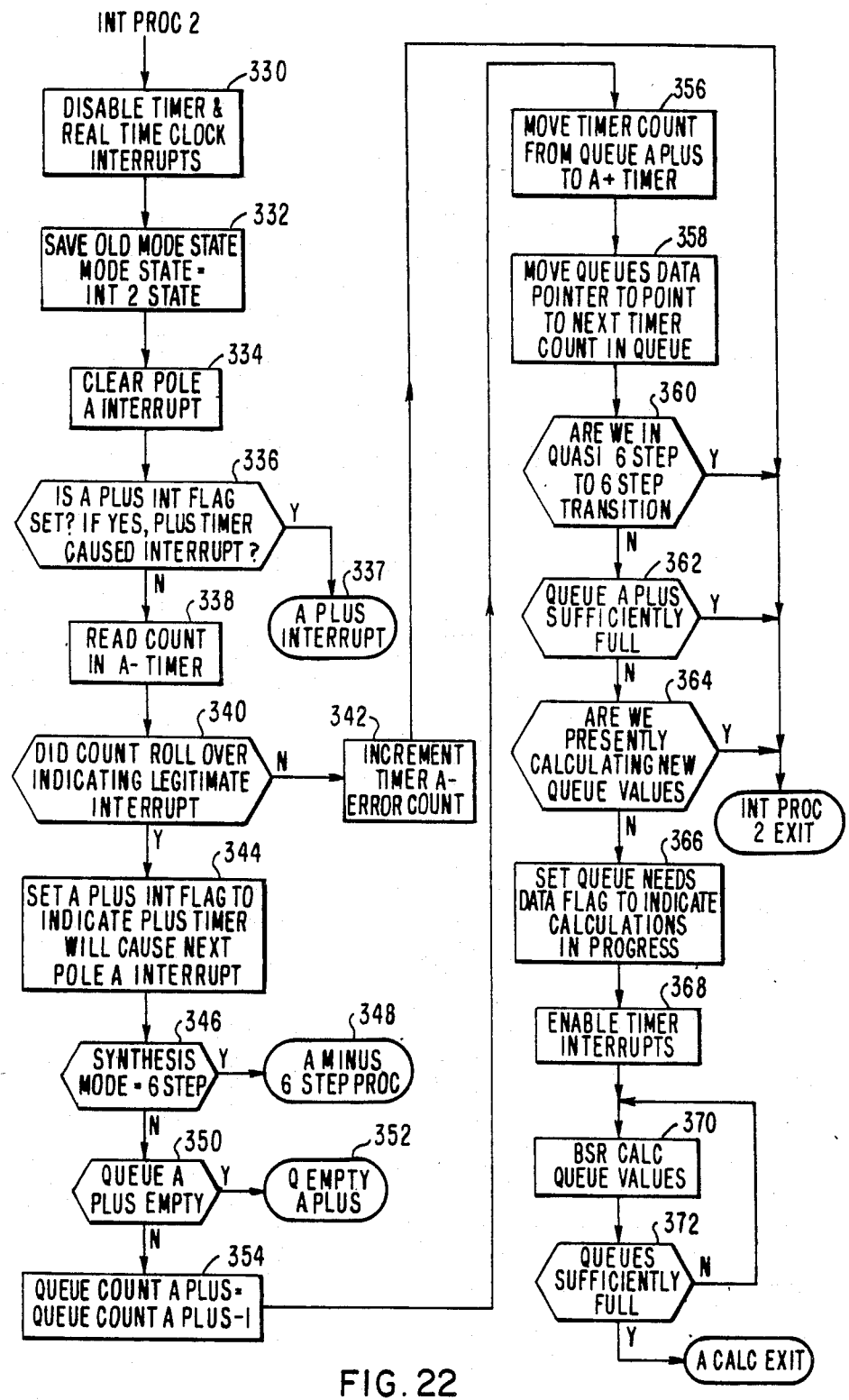
FIG. 22 shows a flow chart for the interrupt routine for phase A of the motor.
Figure 42:
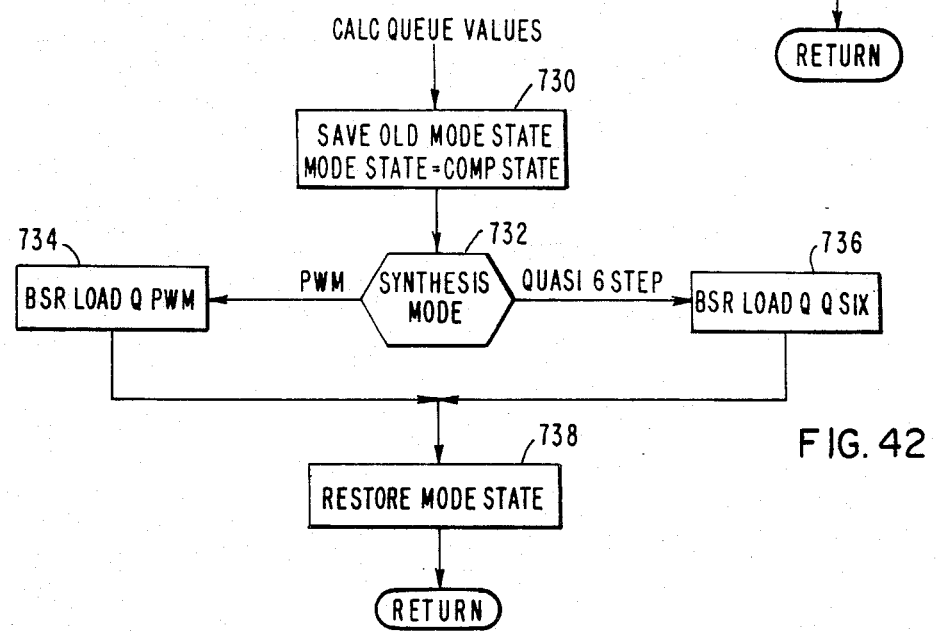
FIG. 42 shows a flow chart for the calculate queue values routine.

In FIG. 22, the interrupt procedure 2 routine starts at block 330 to disable the timer and realtime clock interrupts. Block 332 saves the old mode state and sets the mode state equal to interrupt 2 state for trouble-shooting purposes. Block 334 clears the pole A interrupt to clear the interrupt in the hardware. Block 336 checks to see if the interrupt A plus flag is set, which flag was initialized in the start PWM routine in FIG. 21, so the first interrupt was coming from the minus timer. For the first time through the minus timer will cause the interrupt. If this flag were set, then it would mean that the plus timer caused the interrupt, and at block 337 the routine shown in FIG. 25 is called. If the flag is not set the minus timer caused the interrupt and at block 338 the count in the A minus timer is read. The count should have rolled over, so at block 340 a check is made to see if the counter got down to zero and then rolled over to FFFF-hex to see if the reading is some high number, indicating a legitimate interrupt. If the count did not roll over, that means the interrupt is not legitimate and that there is a possible noise problem, so at block 342 timer A minus error count is incremented and an exit is made. If the answer is yes at block 340, at block 344 the A plus interrupt flag is set to indicate the plus timer will cause the next pole A interrupt, since the plus and minus timers alternate back and forth. At block 346 a check is made to see if the operation is in the six-step mode, and if so a jump is made at block 348 to another procedure called A minus six-step procedure shown in FIG. 23. If not six-step, at block 350 a check is made to see if queue A plus is empty to make sure there is a count there to output. If this queue is empty, at block 352 a jump is made to Q empty A plus routine shown in FIG. 24. This queue should have some value except when transitioning to the six-step synthesis. If not empty, block 354 decrements one count out of the A plus queue, and then at block 356 the count from the A plus queue is moved to the A plus timer since the plus timer has started its last received count, and it is ready to receive another count in its buffer to count the next time. At block 358 the A plus queue's data pointer is moved to point to the next timer count in the queue, since the queue operates on a first-in and first-out basis. At block 360 a check is made to see if a quasi six-step to six-step transition is underway. If so, an exit is made, and if not, at block 362 a check is made to see if there is a need to calculate more queue values, and if the A plus queue is sufficiently full, an exit is made. If not, at block 364 a check is made to see if new values are presently being calculated; and if so, an exit is made. If not, at block 366 the queue needs data flag is set to indicate calculations are in progress. While calculating, the timer interrupts are enabled at block 368, since it is not desired to disable the timer interrupts for too long because when an interrupt occurs the count will soon be needed by a timer. At block 370, the calculate queue values subroutine shown in FIG. 42 is called, where the values are calculated to put in the queues. At block 372 a check is made to see if the queues are sufficiently full with the new counts. If not, a return is made to block 370 to keep calculating more queue values. If they are, the program goes to a routine called A Calc Exit shown in FIG. 28.

Figure 23:
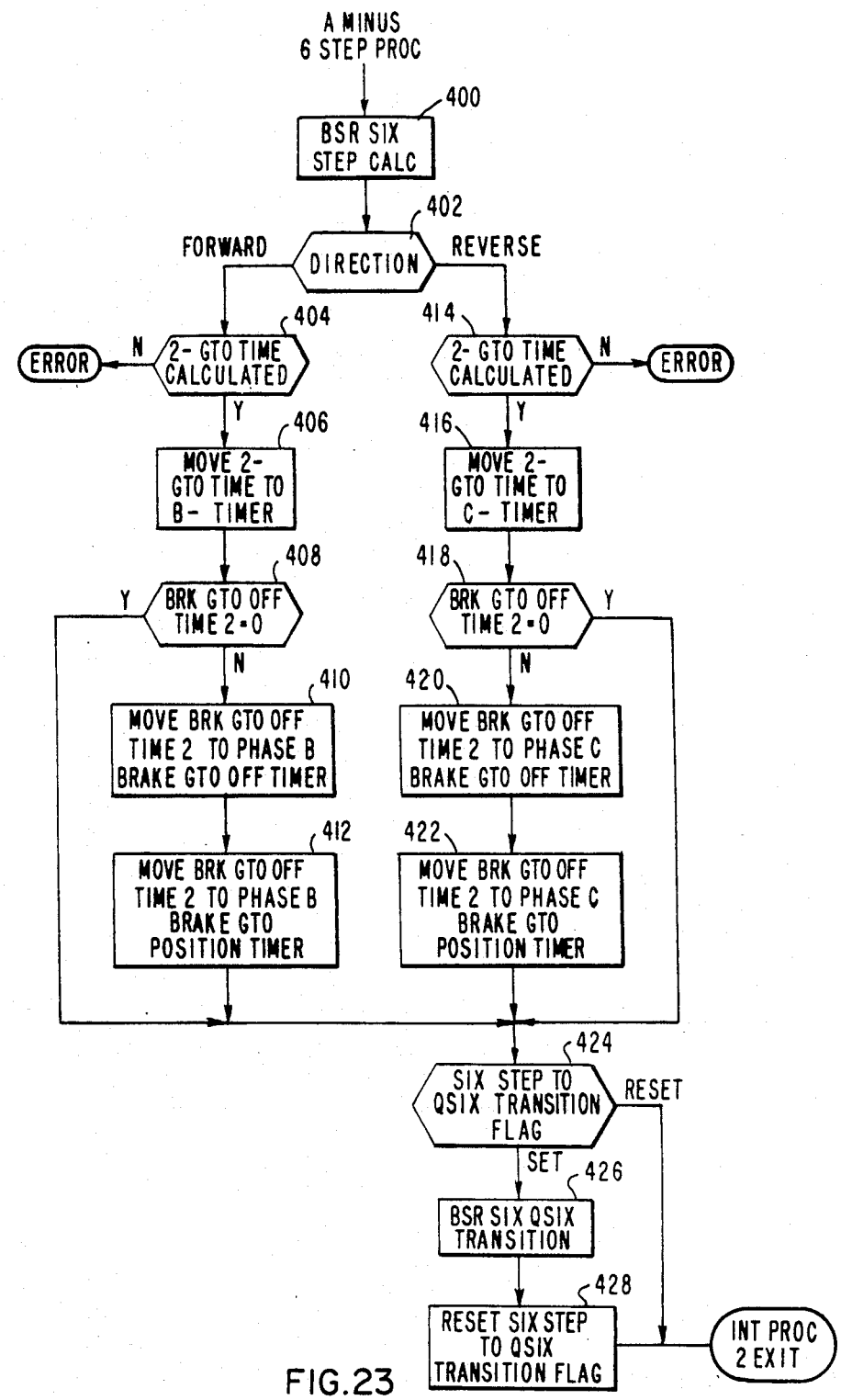
FIG. 23 shows a flow chart for the A minus six-step routine.

At block 348 of FIG. 22 the program branches to the A minus six-step procedure shown in FIG. 23. At block 400 a branch is made to the six-step calculation subroutine shown in FIG. 45 to calculate 60° worth of six-step pulses. At block 402 a check is made to see if the direction of the motor operation is forward or reverse. In forward, at block 404 a check is made to see if there is a 2 minus GTO time calculated; and if not, there is some error. In the forward direction the 2 minus timer will be the same as B minus timer, so the 2 minus GTO time pulse is moved to the B minus timer in block 406. In block 408 a check is made to see if the brake GTO off time 2 equals 0; in brake there are two times of interest wih one being the off time and the other being the position time. Refer to above referenced patent application Ser. No. 696,938, by H. Dadpey et al and entitled "Induction Motor Regenerative Brake Control Apparatus and Method" for details on these brake times. In block 410 the brake GTO off time is moved to the phase B brake GTO OFF timer, and in block 412 the brake GTO position time 2 is moved to the phase B brake GTO position timer. The brake GTO OFF time 2 should equal zero in quasi six-step and in PWM because there is no interest in braking, but it may or may not equal zero in six-step. In braking, in order to induce a voltage across the motor, one of the three GTOs in the brake circuit is turned off, and the amount of time that it is off is when voltage is induced, so if more voltage is desired, then this off time gets bigger, and if less voltage is desired, the off time gets smaller. The program flow then proceeds to block 424 which will be explained later. If the motor is in reverse at block 402, then at block 414 a check is made to see if a 2 minus GTO time was calculated. If the answer is no, an error is indicated; if yes, at block 416 the 2 minus GTO time is moved to the C minus timer, because this is actually reversing the motor phases. At block 418, a check is made to see if the brake GTO off time 2 equals 0, and blocks 420 and 422 similarly are loading the phase C brake timers. At block 424 a check is made to see if the program is in a six-step to quasi six-step transition. If the flag is set, then a six-step to quasi six-step transition is desired. At block 426 a branch is made to the subroutine for the six-step to quasi six-step transition shown in FIG. 49. In the transition routine, two sixty degree sections will be calculated, and the times will be placed in the queues since the queues will now be used again. Then at block 428 the six-step to Q six transition flag is reset, and the transition to quasi six-step is complete at this point. Then the program goes to the interrupt procedure 2 exit shown in FIG. 28. Then the program goes to the exit routine.

Figure 24:
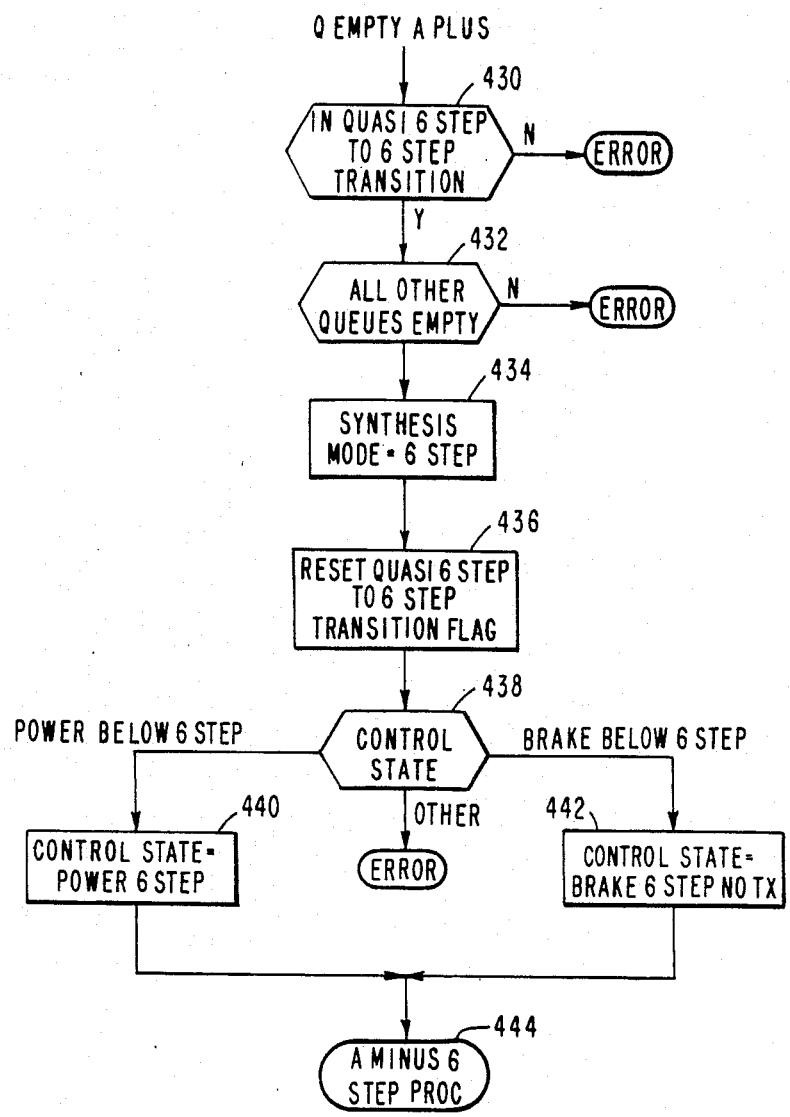
FIG. 24 shows a flow chart for the Q empty A plus routine.
Figure 25:
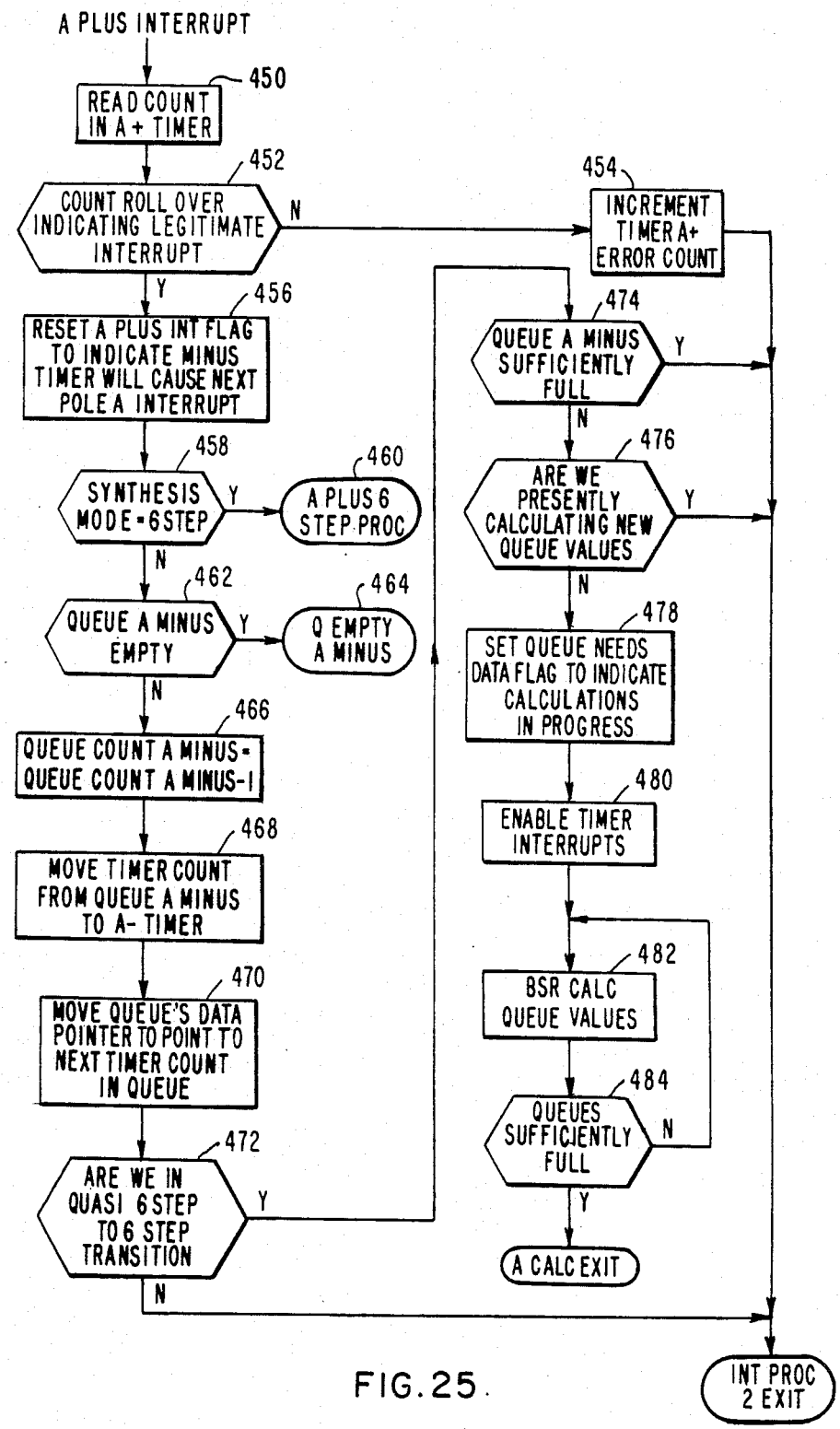
FIG. 25 shows a flow chart for the A plus interrupt routine.

At block 352 of FIG. 22, a branch is made to the Q empty A plus routine shown in FIG. 24. At block 430 a check is made to see if the operation is in quasi six-step to six-step transition. If not, there should be counts, and probably due to noise there are no counts, so an error is indicated to stop the synthesis. If the operation is in the transition, at block 432 a check is made to see if all other queues are empty. At this time all of the other queues should be empty; and it not, then an error is indicated. If so, the transition is complete, and at block 434 the synthesis of mode is set equal to six-step, and at block 436 the flag indicating the transition is reset. At block 438 a check is made to see control state the motor controller 62 is in. If in power below six-step, then at block 440 the control state is set equal to power six-step; and if in brake below six-step, in block 442 the control state is set equal to brake six-step. At block 444 a branch is made to the A minus six-step procedure shown in FIG. 23. It should not be possible for the control state to be in another state at block 438.

If there were an A plus interrupt at block 336 of FIG. 22, the program would have jumped to block 337 and to a routine called A plus interrupt shown in FIG. 25, which occurs from an A plus timer pulse ending, as shown in FIGS. 9, 10, or 11. In block 450, the count in the A plus timer is read, and then in block 452 a check is made to see if the timer rolled over to check for a legitimate interrupt. If it did not, at block 454 an A plus timer error count is incremented and an exit is made to ignore that interrupt. If the count did roll over, at block 456 the A plus interrupt flag is reset to indicate that the minus timer will cause the next pole A interrupt, which is because of the toggle back and forth between the interrupts. Then at block 458 a check is made to see if the synthesis mode equals six-step.

Figure 26:
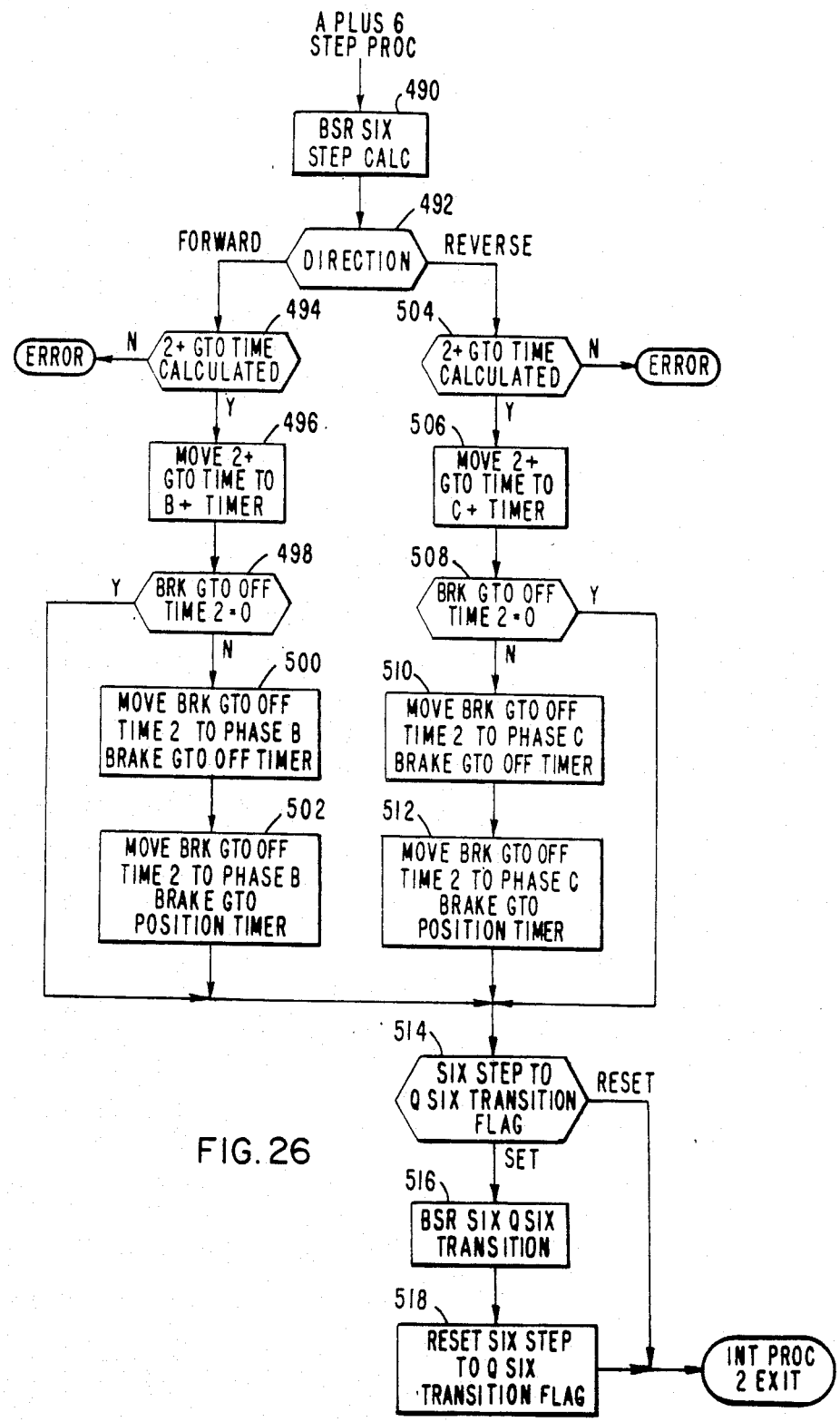
FIG. 26 shows a flow chart for the A plus six-step procedure.

If yes, at block 460 the A plus six-step procedure shown in FIG. 26 is executed. If not, the operation is in quasi six-step or PWM, and at block 462 a check is made to see if the A minus queue is empty.

Figure 27:
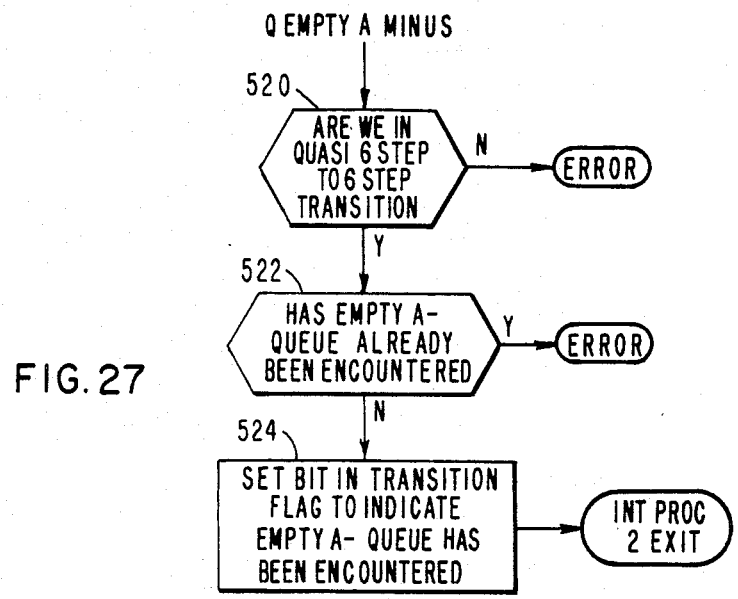
FIG. 27 shows a flow chart for the Q empty A minus routine.

If yes, at block 464 a jump is made to Q empty A minus routine shown in FIG. 27. If not at block 466 the A minus queue count is decremented to indicate that there is one less count in the queue. At block 468 the timer count is moved from the A minus queue to the A minus timer. At block 470 the A minus queues data pointer is moved to point to the next timer count in the queue. At block 472 a check is made to see if a quasi six-step to six-step transition is underway. If yes, the program goes to the exit in FIG. 28 because there is no need to calculate queue times if a transition is underway. At block 474 a check is made to see is the A minus queue is sufficiently full. If yes, the program exits to FIG. 28. If no, at block 476 a check is made to see if the program is presently calculating queue timer values. If yes, the program branches to the interrupt procedure 2 exit in FIG. 28. If no, at block 478 the queue needs data flag is set to indicate to the other interrupt routines that data calculations are in progress. The timer interrupts are enabled at block 480, and at block 482 a branch is made to the calculate queue values subroutine shown in FIG. 42. At block 484 a check is made to see if the Qs are sufficiently full. If not, the program continues calculating values at block 482. If yes, the program goes to the A Calc Exit routine shown in FIG. 28.

If the operation was in six-step at block 458 of FIG. 25, a jump is made to the A plus six-step subroutine shown in FIG. 26. At block 490 a branch is made to the six-step Calc subroutine shown in FIG. 45 to calculate 60° worth of times. Then at block 492 a direction check is made to determine either forward or reverse motor operation. In the forward direction at block 492, a check is made at block 494 to see if a 2 plus GTO time was calculated. The phase 2 in forward would be the phase B. The A plus interrupt in relation to FIG. 25 would be an A plus interrupt at the end of the A plus pulse at 180° as shown in FIG. 11. The plus GTO time pulse for the B phase, or the number 2 phase, would be the pulse from 240° to 60° that should have been calculated, because the portion from 0° to 60° should have been calculated. If no, there must be an error. If yes, at block 496 this 2 plus GTO time is moved to the B plus timer. At block 498 a check is made to see if the brake GTO off time for phase 2 equals zero. If there is a brake GTO off time pulse calculated, then at block 500 and block 502 the brake GTO off time and the brake GTO position time for phase 2 are moved to their respective timers. The program flow then proceeds to block 514 which will be explained later. If the direction is reverse at block 492, at block 504 a check is made to see if the 2 plus GTO time was calculated. If not, there is an error. If yes, at block 506 the 2 plus GTO time is moved to the C plus timer because phase 2 is phase C in reverse. Similar to the forward case, at block 508 a check is made to see if the brake GTO off time for phase 2 is zero, and if it is not, then in blocks 510 and 512 the GTO off and position times are moved to the phase C brake timers. At block 514 a check is made to see if the program is in a six-step to quasi six-step transition. If the flag is set, then a six-step to quasi six-step transition is desired. At block 516 a branch is made to the subroutine for the six-step to quasi six-step transition shown in FIG. 49. In the transition routine, two sixty degree sections will be calculated, and the times will be placed in the queues since the queues will now be used again. Then at block 518 the six-step to Q six transition flag is reset, and the transition to quasi six-step is complete at this point. Then the program goes to the interrupt procedure 2 exit shown in FIG. 28.

If there is a branch to Q empty A minus at block 464 in FIG. 25, this indicates a transition between quasi six-step and six-step, and is shown in FIG. 27. In the synthesis shown in FIG. 16, at the waveform transition marked by the number 5, there would be no counts in the A minus queue. At block 520 of FIG. 27 a check is made to see if this is a quasi six-step to six-step transition. If not, then there is an error. If yes, then a check is made at block 522 to see if the A minus queue has already been encountered as empty. If it already has been encountered, there is an error. If not, at block 524 a bit is set in the transition flag to indicate that the A minus queue has been encountered as empty and an exit is made to the interrupt procedure 2 exit shown in FIG. 28.

Figure 28:
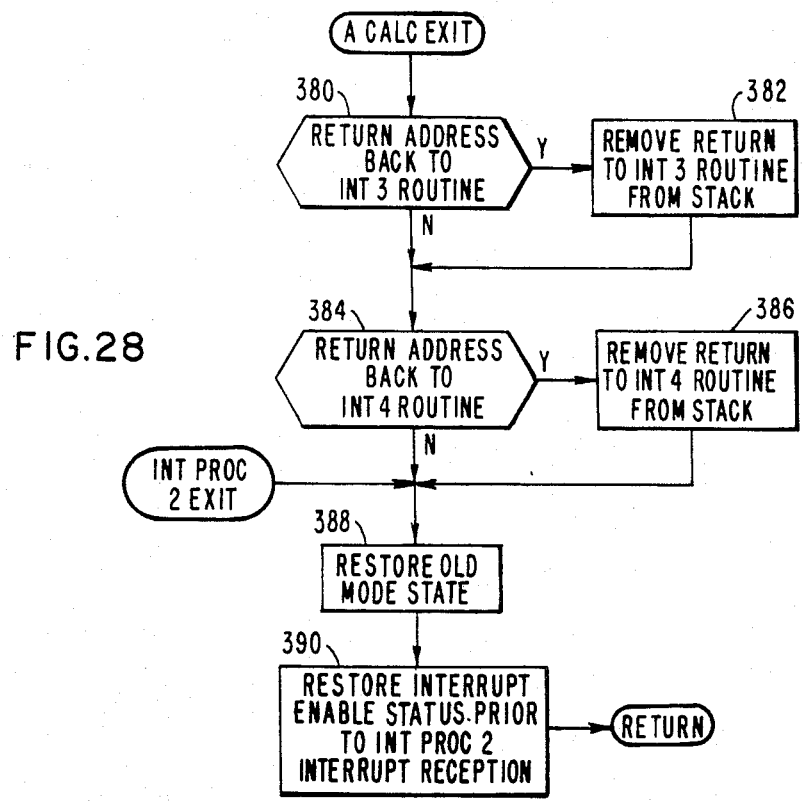
FIG. 28 shows a flow chart for the A Calc Exit routine.
Figure 29:
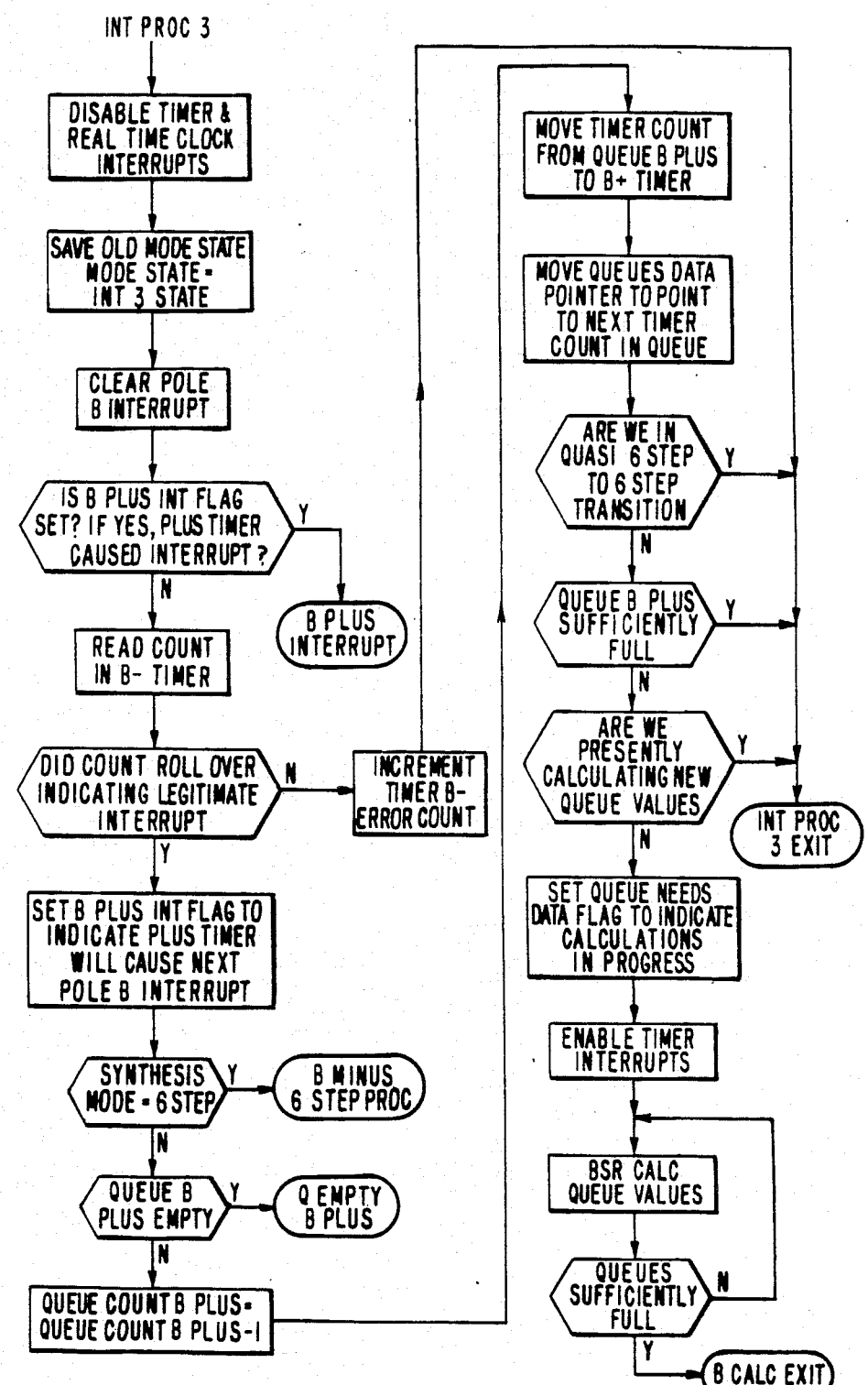
FIG. 29 shows a flow chart for the interrupt routine for phase B.

In the A Calc Exit routine shown in FIG. 28, at block 380 a check is made to see if the return address is back to the interrupt 3 routine shown in FIG. 29, which relates to the priority of the interrupts. If there is a return to the interrupt 3 routine on the stack, block 382 removes it from the stack. At block 384 a check is made to see if there is an interrupt 4 return on the stack, and if yes, then block 386 removes it from the stack. The reason for blocks 380, 382, 384, and 386 is to prevent interrupt routines from being executed twice which could be caused by the method used to reenable interrupts during synthesis timer pulse calculations at block 368 of FIG. 22 or block 480 of FIG. 25. The interrupt 2 may have occurred during either the execution of interrupt procedures 3 or 4 but prior to the disable interrupts first instruction of these 2 intrrupt procedures (see FIGS. 29 and 36). If such is the case, when the interrupts are enabled at block 368 or block 480, the processor will respond to the still pending other interrupt. Since the processor is responding here to the interrupt, it is undesirable to return back to the interrupted interrupt procedure and thereby process the same interrupt twice. At block 388 the old mode state is restored for debugging purposes, and then at block 390 the interrupt enable status is restored to the same state it was in prior to the interrupt procedure 2 interrupt reception.

The phase B interrupt routine is the interrupt procedure 3 shown in FIG. 29. The functional operation of the program flow chart shown in FIG. 29 in relation to phase B is substantially the same as for the program flow chart of the phase A interrupt shown in FIG. 22.

Figure 30:
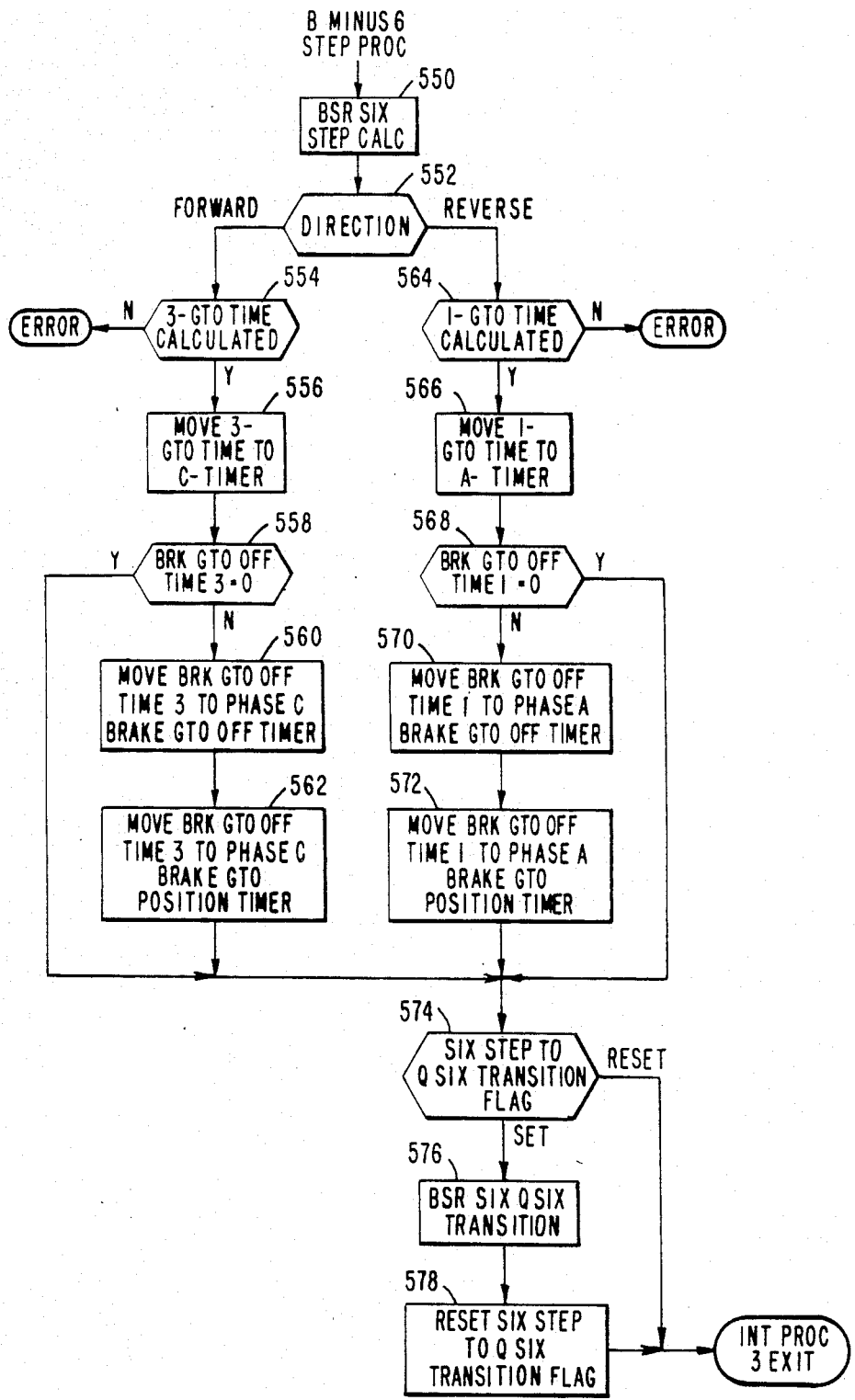
FIG. 30 shows a flow chart for the B minus six-step routine.

In FIG. 30 there is shown the B minus six-step procedure, with the first portion of this procedure being similar to the A minus six-step procedure shown in FIG. 23. In FIG. 30, at block 550 there are calculated 60° worth of six-step pulses using the routine shown in FIG. 45. For phase B a minus interrupt would be at the 240° mark of FIG. 11, and there should be calculated a 3 minus pulse that will be output to the phase C. Assuming the forward direction in block 552, then at block 554 a check is made to see if the 3 minus GTO time was calculated. If it was, at block 556 the 3 minus GTO time is moved to the C minus timer. At block 558 a check is made to see if the brake GTO off time 3 equals 0, which brake GTO off time is calculated in the six-step Calc routine at block 550. If not, then in blocks 560 and 562 the off time and the position time are moved to the phase C brake timers. The program flow then proceeds to block 574 which will be explained later. In reverse at block 552, the operation is more complicated with the phase B because the phase B in reverse provides the interrupt that would correspond to VC at 120° of FIG. 11, and a 1 minus time should be calculated because it is the next full pulse after that interrupt. At block 564 a check is made to see if there was a 1 minus GTO time calculated. If yes, at block 566 the 1 minus GTO time is moved to the A minus timer, and then at block 568 a check is made to see if the brake GTO off time 1 equals 0. If not, at blocks 570 and 572 the off time and the position time for phase number one are moved to the phase A brake timers. At blocks 574 a check is made to see if the program is in a six-step to quasi six-step transition. If the flag is set, then a six-step to quasi six-step transition is desired. At block 576 a branch is made to the subroutine for the six-step to quasi six-step transition shown in FIG. 49. In the transition routine, two sixty degree sections will be calculated, and the times will be placed in the queues, since the queues will now be used again. Then at block 578 the six-step to Q six transition flag is reset, and the transition to quasi six-step is complete at this point. Then the program goes to the interrupt procedure 3 exit shown in FIG. 35.

Figure 31:
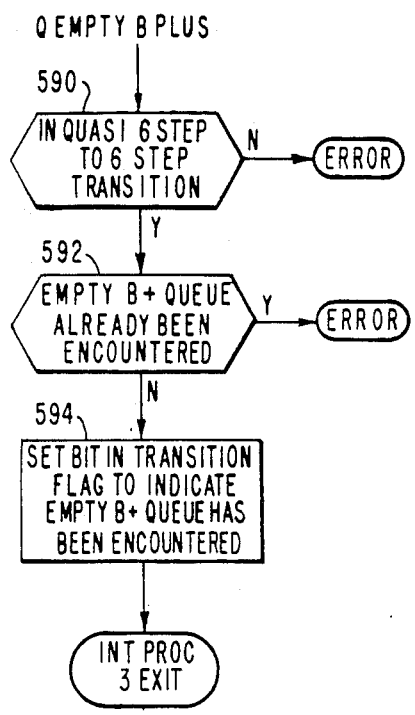
FIG. 31 shows a flow chart for the Q empty B plus routine.

In the Q empty B plus routine shown in FIG. 31, at block 590 a check is made to see if the program is in a quasi six-step to six-step transition. If not, there is an error. If yes, at block 592 a check is made to see if the empty B plus queue has already been encountered. If it has, then there is an error. If not, then at block 594 a bit in the transition flag is set to indicate the empty B plus queue has been encountered.

Figure 32:
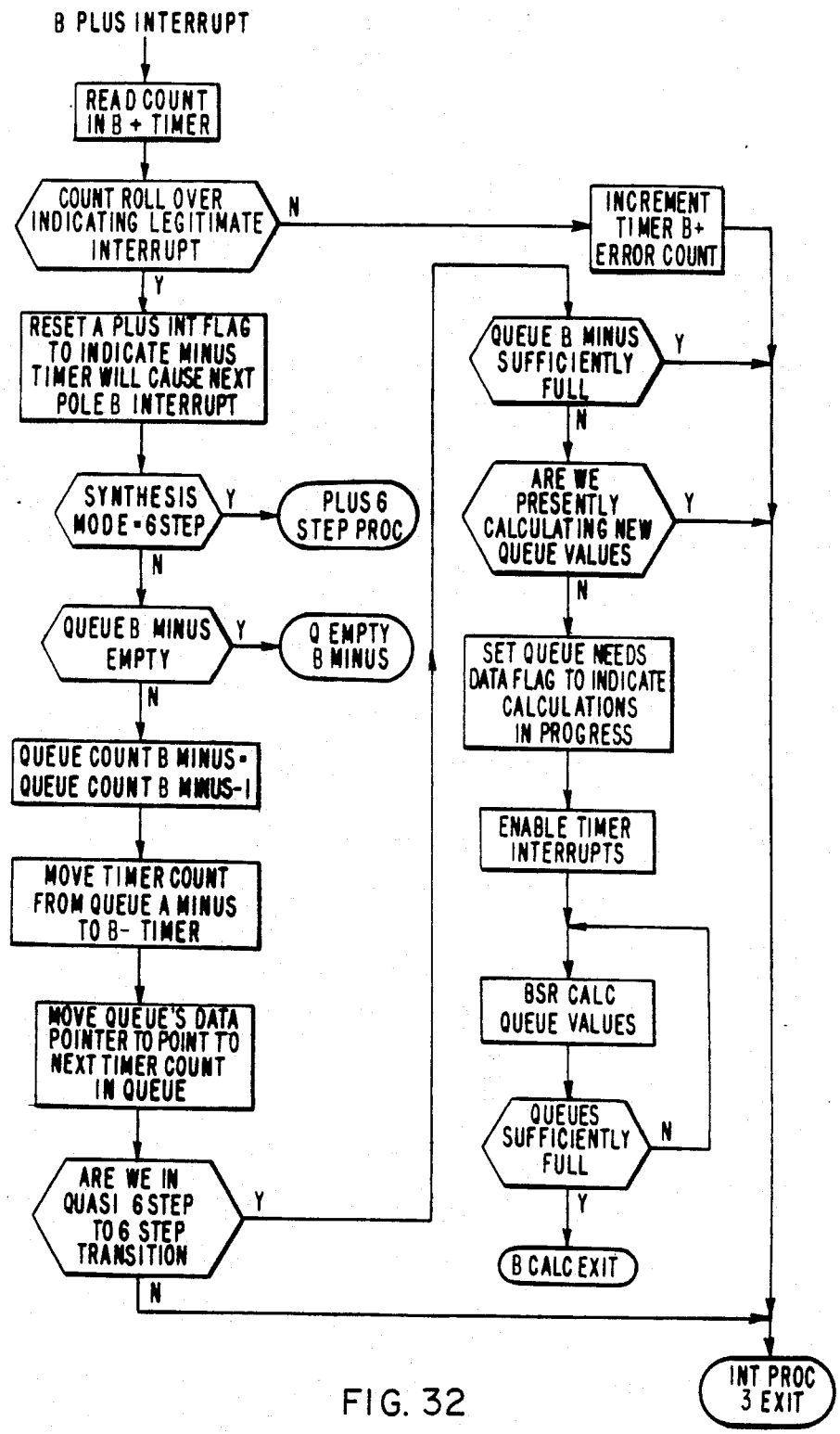
FIG. 32 shows a flow chart for the B plus interrupt routine.

The B plus interrupt shown in FIG. 32 in relation to phase B is similar in operation to the A plus interrupt shown in FIG. 25 in relation to phase A.

Figure 33:
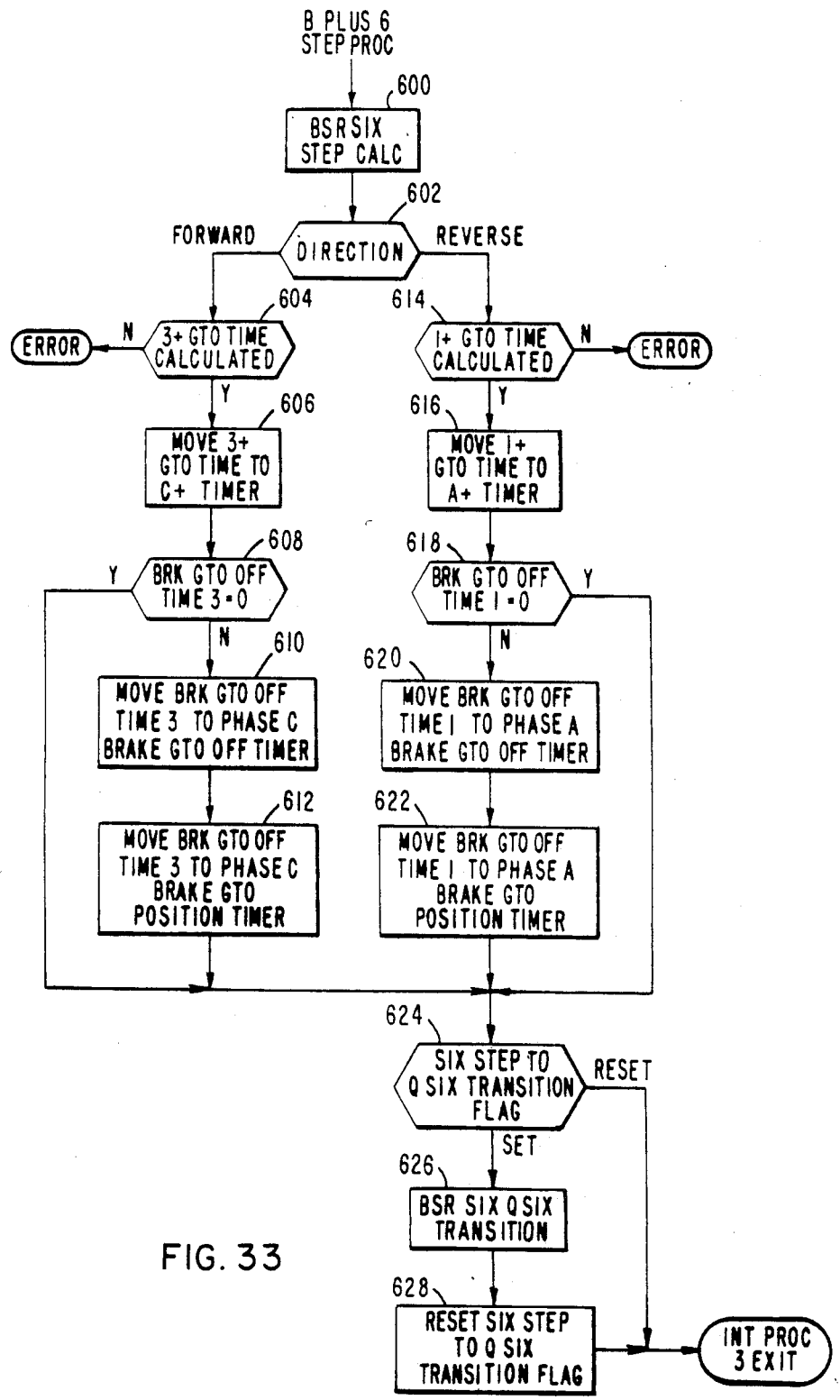
FIG. 33 shows a flow chart for the B plus six-step routine.

The B plus six-step procedure shown in FIG. 33 in relation to phase B is similar in operation to the A plus six-step procedure shown in FIG. 26 in relation to phase A. At block 600 a branch is made to the six-step Calc subroutine shown in FIG. 45 to calculate 60° worth of six-step pulses. At block 602 a check is made of the motor direction. If it is forward, in reference to the phase B in forward after the B plus interrupt which occurred at 60° of FIG. 11, there should now be calculated the plus pulse from 120° to 300° for the VC waveform. At block 604 a check is made to see if the 3 plus GTO time was calculated by the subroutine called in block 600. If it was not, there is an error, and if it was, at block 606 the 3 Plus GTO time is moved to the C plus timer. And then at block 608 a check is made to see if the brake GTO off time 3 is equal to zero, and if not, at blocks 610 and 612 brake off and position times are moved to the phase C braking timers. The program flow then proceeds to block 624 which will be explained later. If the direction is reverse, that means that VC corresponds to phase B, and the plus interrupt occurred at 300°, so there should have been calculated the time for the phase 1 from 0° to 180° plus pulse. At block 614 a check is made to see if a one plus GTO time was calculated. If not, there is an error. If so, at block 616, the one plus GTO time is moved into the A plus timer. At block 618 a check is made to see if the brake GTO off time 1 is equal to zero. If not, at blocks 620 and 622 the off time and the position are moved to the phase A timers. At block 624 a check is made to see if the program is in a six-step to quasi six-step transition. If the flag is set, then a six-step to quasi six-step transition is desired. At block 626 a branch is made to the subroutine for the six-step to quasi six-step transition shown in FIG. 49. In the transition routine, two sixty degree sections will be calculated, and the times will be placed in the queues since the queues will now be used again. Then at block 628 the six-step to Q six transition flag is reset, and the transition to quasi six-step is complete at this point. Then the program goes to the interrupt procedure 3 exit shown in FIG. 35.

Figure 34:
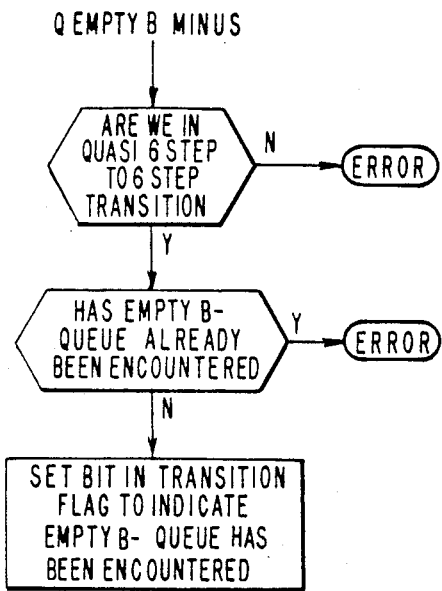
FIG. 34 shows a flow chart for the Q empty B minus routine.

The Q empty B minus routine shown in FIG. 34 is functionally similar to the Q empty B plus routine shown in FIG. 27.

Figure 35:
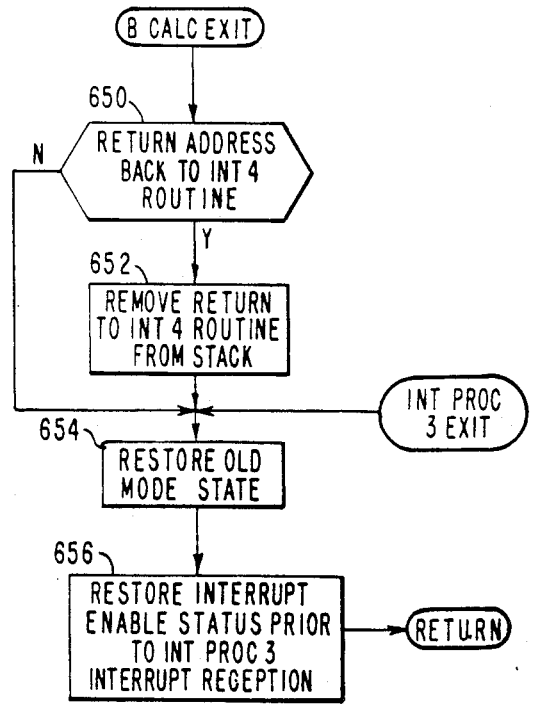
FIG. 35 shows a flow chart for the B calculation exit routine.
Figure 36:
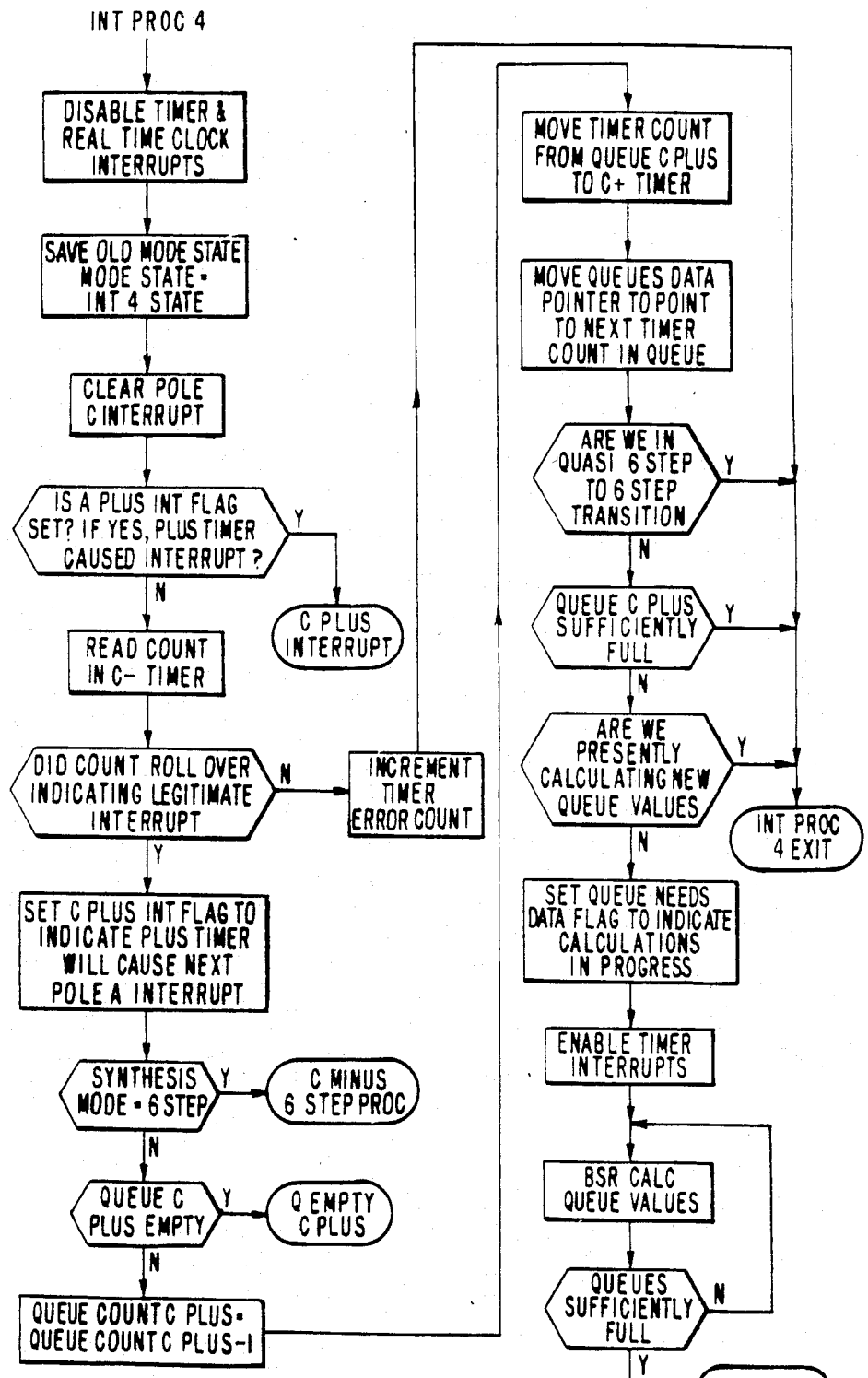
FIG. 36 shows a flow chart for the interrupt routine for phase C.

The B Calc Exit routine shown in FIG. 35 is provided to check if the program was in the interrupt 4 procedure of FIG. 36 before disabling the interrupts at the beginning of the interrupt procedure 4 when the interrupt 3 occurred. If so, it is desired to remove the interrupt 4 return address from the stack. At block 650 a check is made to see if the return address is back to the interrupt 4 routine. If yes, at block 652 this return address is removed from the stack. At block 654 the old mode state is restored, and at block 656 the interrupt enable status is restored as it was prior to the execution of the interrupt procedure 3. The interrupt procedure 3 exit from any of FIGS. 29, 30, 31, 32, 33 and 34 branches into the B Calc exit routine shown in FIG. 35 above the block 654.

In FIG. 36 there is shown the interrupt procedure 4, which is functionally similar to interrupt procedure 2 in FIG. 22 and interrupt procedure 3 in FIG. 29, but it involves the phase C rather than the phase A and the phase B.

Figure 37:
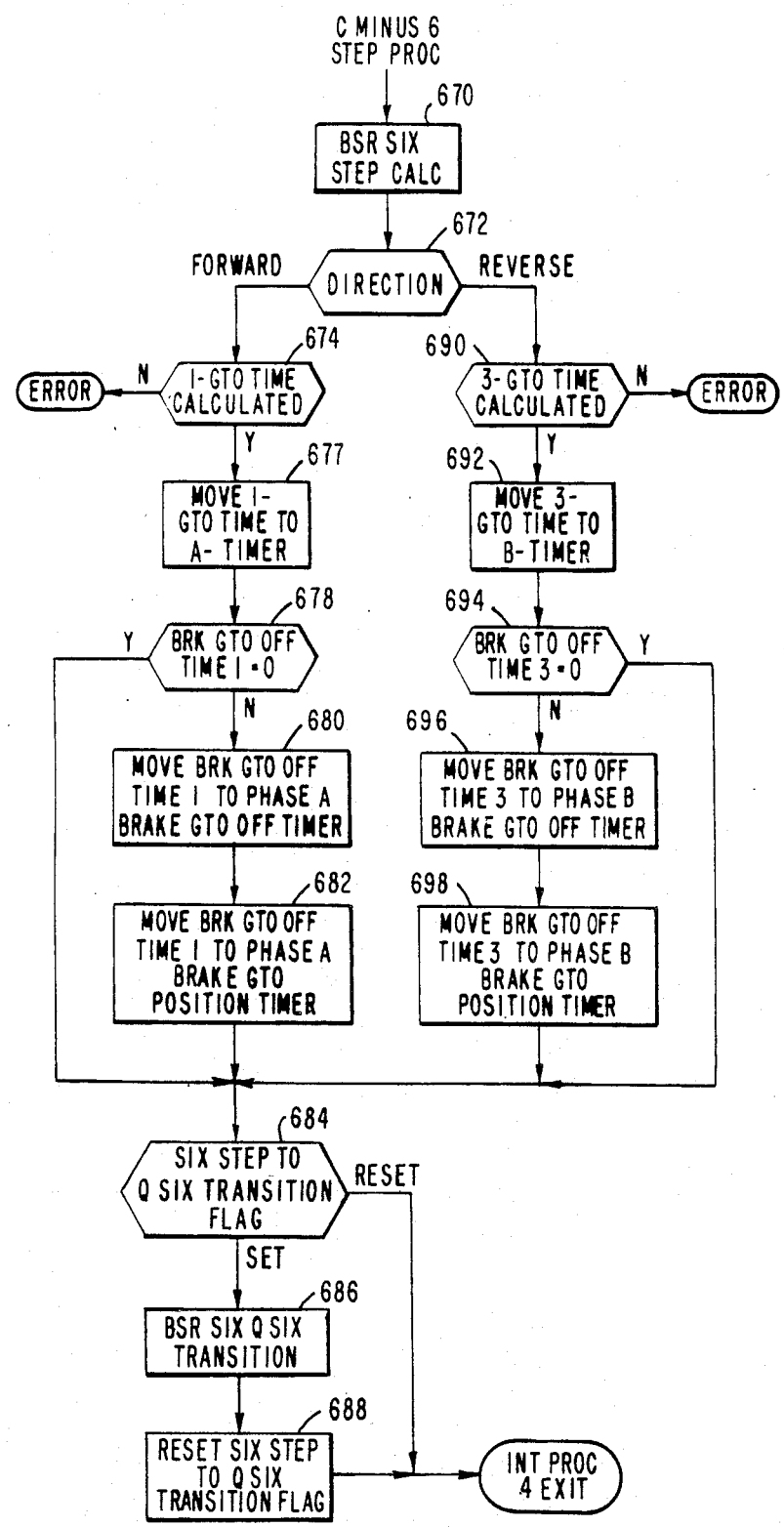
FIG. 37 shows a flow chart for the C minus six-step routine.

In FIG. 37 there is shown the C minus six-step procedure, the first portion of which is functionally similar in relation to phase C as is FIG. 23 in relation to phase A and FIG. 30 in relation to phase B. At block 670 60° worth of six-step calculations are performed using the routine shown in FIG. 45. At block 672 a check is made to determine the motor direction. As shown in FIG. 11, VC represents what phase C would be in the forward direction and VB represents what phase C would be in the reverse direction. In the forward direction, a C minus interrupt would be at the 120° mark, and there should have been calculated the 60° worth of the six-step calculations from 300° to 360°, so that would have completed the phase one minus time shown for VA, which extends from 180° to 360°. At block 674 a check is made to see if the one minus GTO time has been calculated. If it was not, there is some kind of error. If yes, then at block 676 that one minus GTO time is moved into the A minus timer. At block 678, a check is made to see if the brake GTO off time one is equal to zero. If not, at blocks 680 and 682 the brake GTO off time one and brake GTO position time one are moved to the respective phase A brake timers. The program flow then proceeds to block 684 which will explained later. If the direction is reverse at block 672, as shown in FIG. 11 the interrupt that would cause a reverse C minus interrupt is VB waveform at 240°. This should have caused a 3 minus pulse to be calculated from 300° around to 120°, and at block 690 a check is made to see if it was indeed calculated. If not, there is an error. If yes, then t block 692 the 3 minus GTO time that was calculated is moved to the B minus timer. At block 694, if the brake GTO off time 3 is not zero, then at blocks 696 and 698 the brake GTO off time 3 and the brake GTO position time 3 are moved to the respective phase B timers. At block 684 a check is made to see if the program is in a six-step to quasi six-step transition. If the flag is set, then a six-step to quasi six-step transition is desired. At block 686 a branch is made to the subroutine for the six-step for quasi six-step transition shown in FIG. 49. In the transition routine, two sixty degree sections will be calculated, and the times will be placed in the queues since the queues will now be used again. Then at block 688 the six-step to Q six transition flag is reset, and the transition to quasi six-step is complete at this point. Then the program goes to the interrupt procedure 4 exit.

Figure 38:
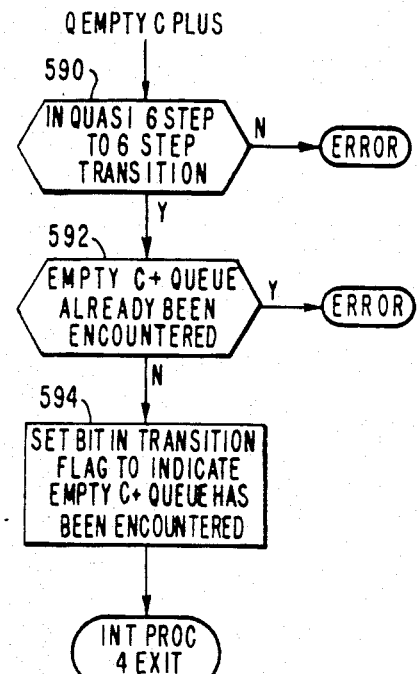
FIG. 38 shows a flow chart for the Q empty C plus routine.

In FIG. 38 there is shown the routine that is used when the queue C plus is empty, and which is functionally similar to the Q empty B plus routine shown in FIG. 31.

Figure 39:
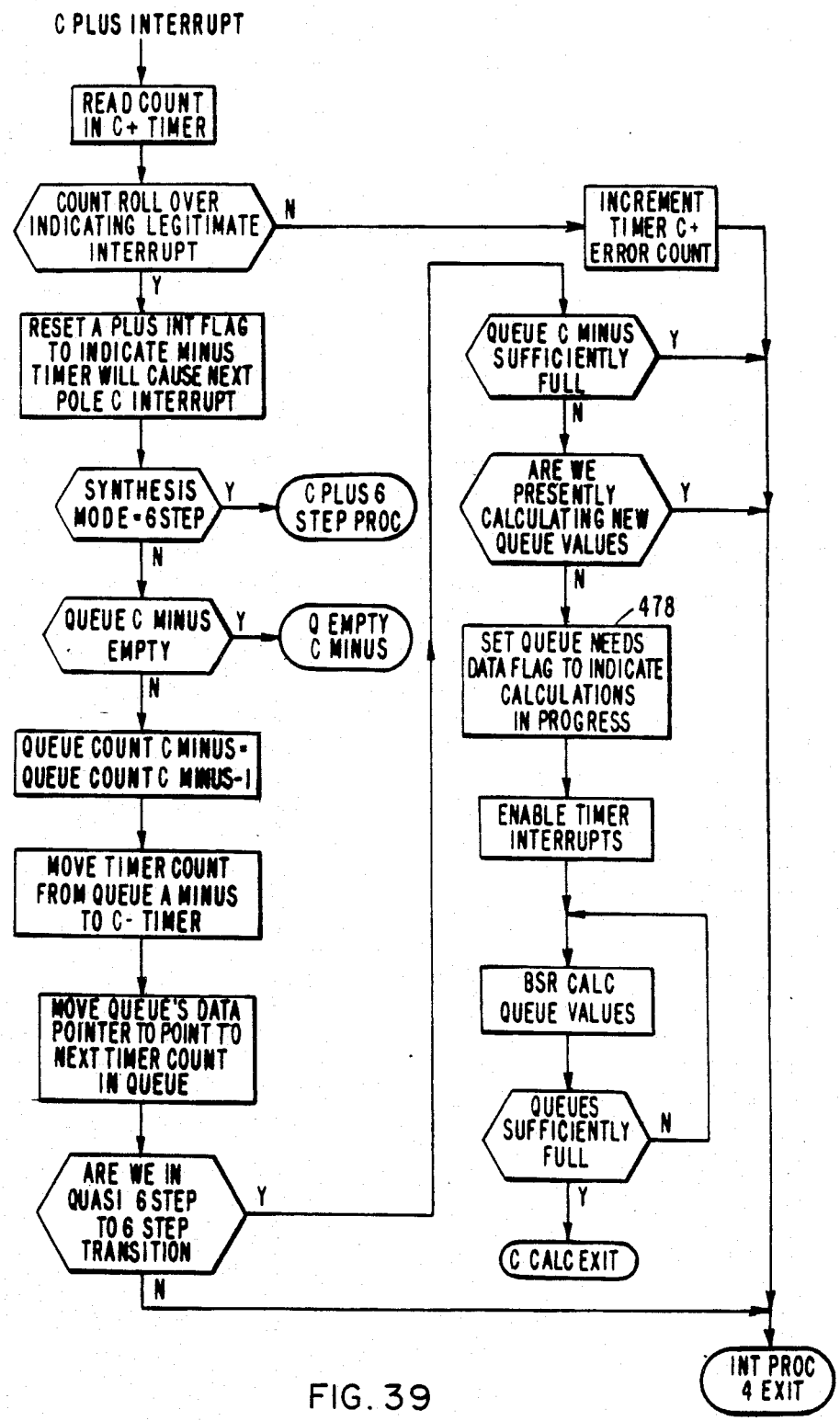
FIG. 39 shows a flow chart for the C plus interrupt routine.

In FIG. 39 there is shown the C plus interrupt which operates similarly to the A plus interrupt routine shown in FIG. 25.

Figure 40:
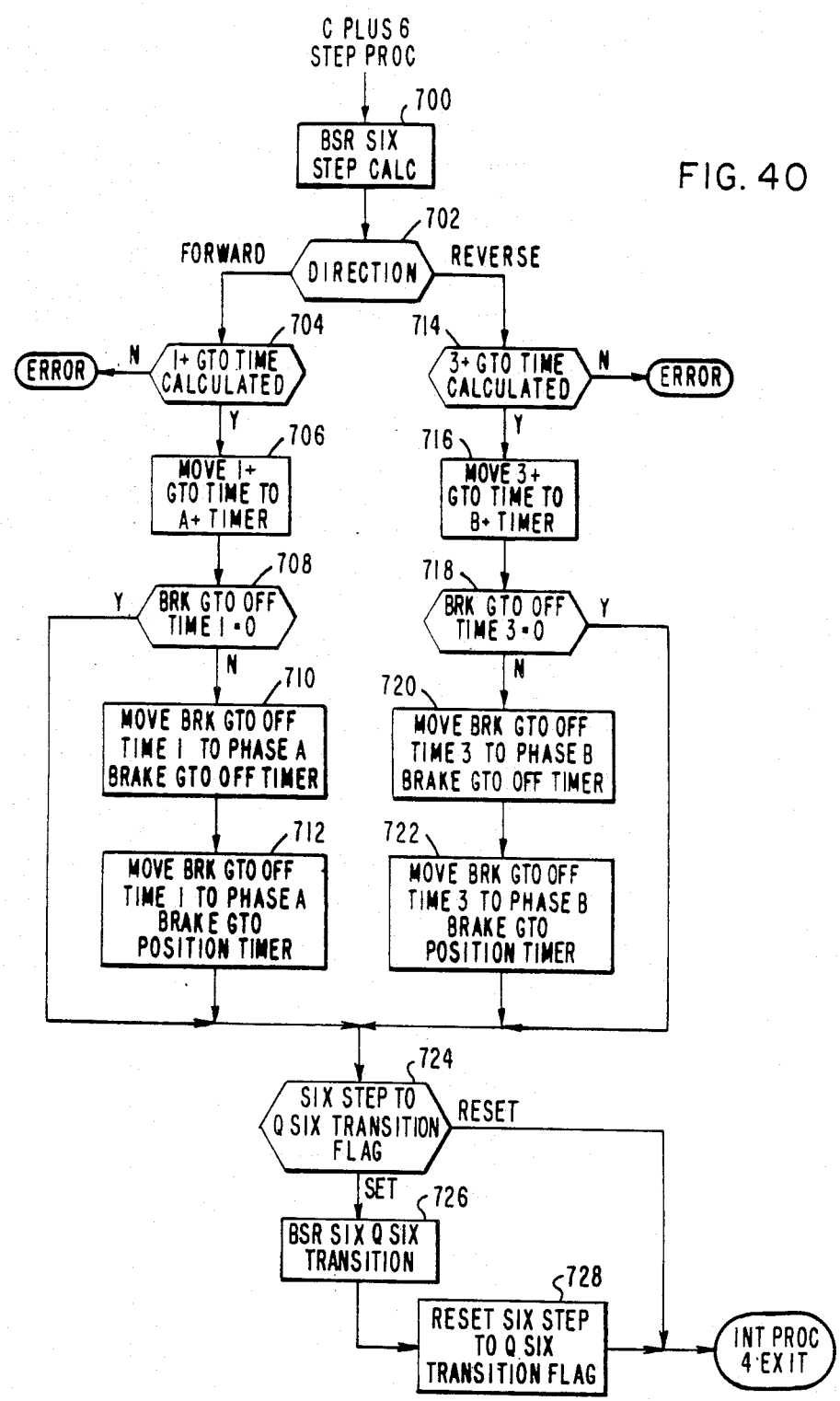
FIG. 40 shows a flow chart for the C plus six-step routine.
Figure 45A:
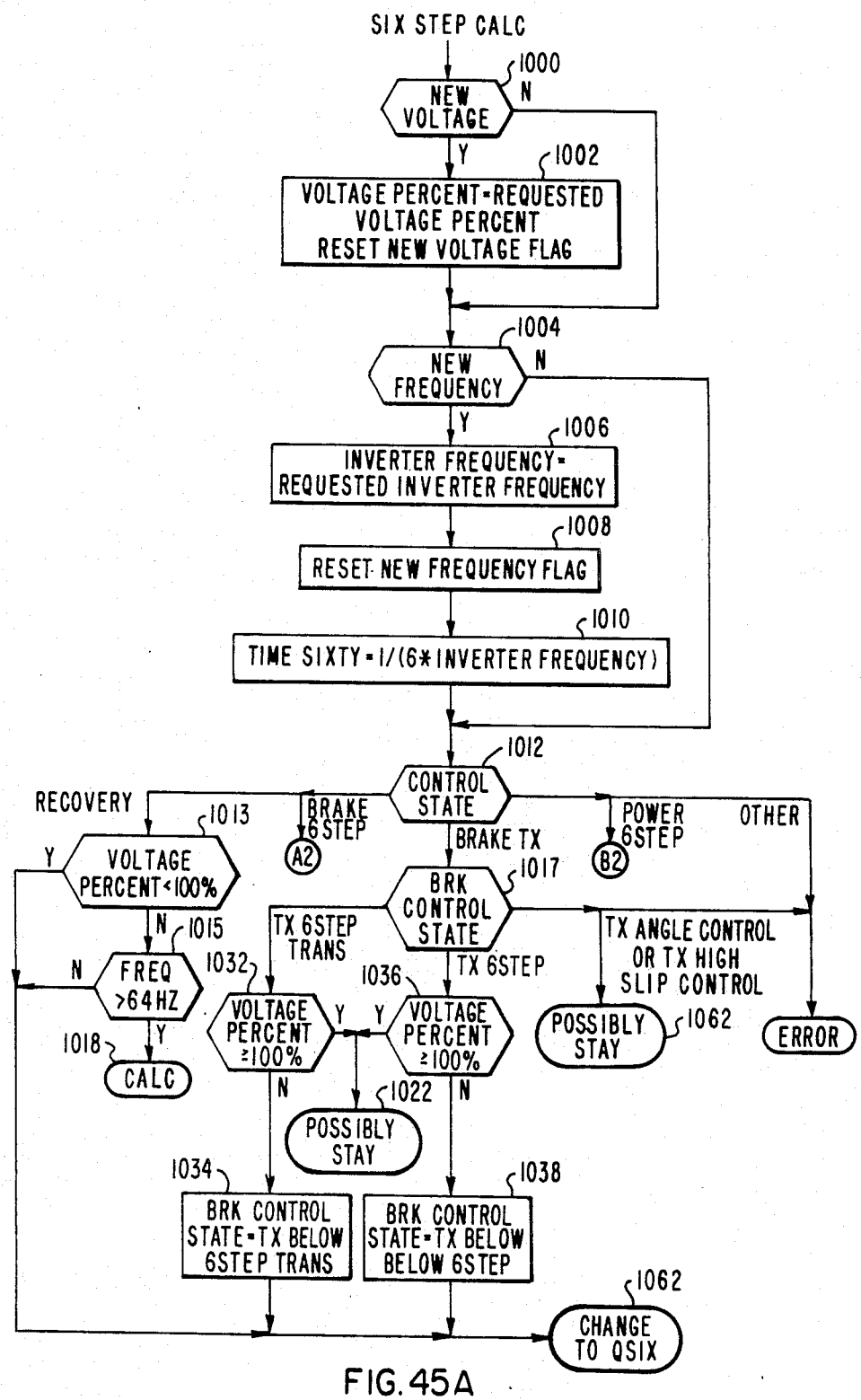
FIGS. 45A, 45B, and 45C show a flow chart for the six-step timer period calculations routine.
Figure 45B:
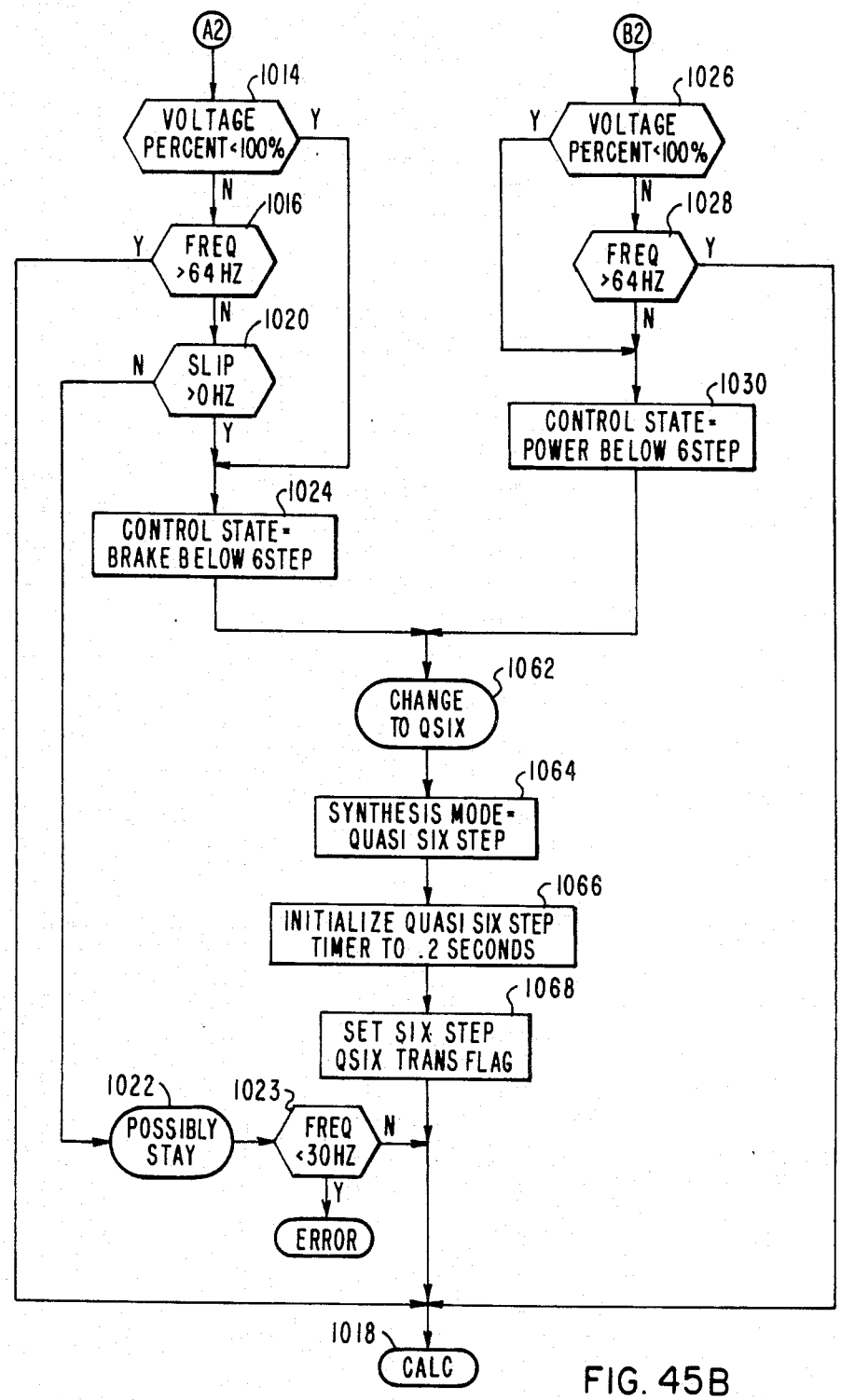
Figure 45C:
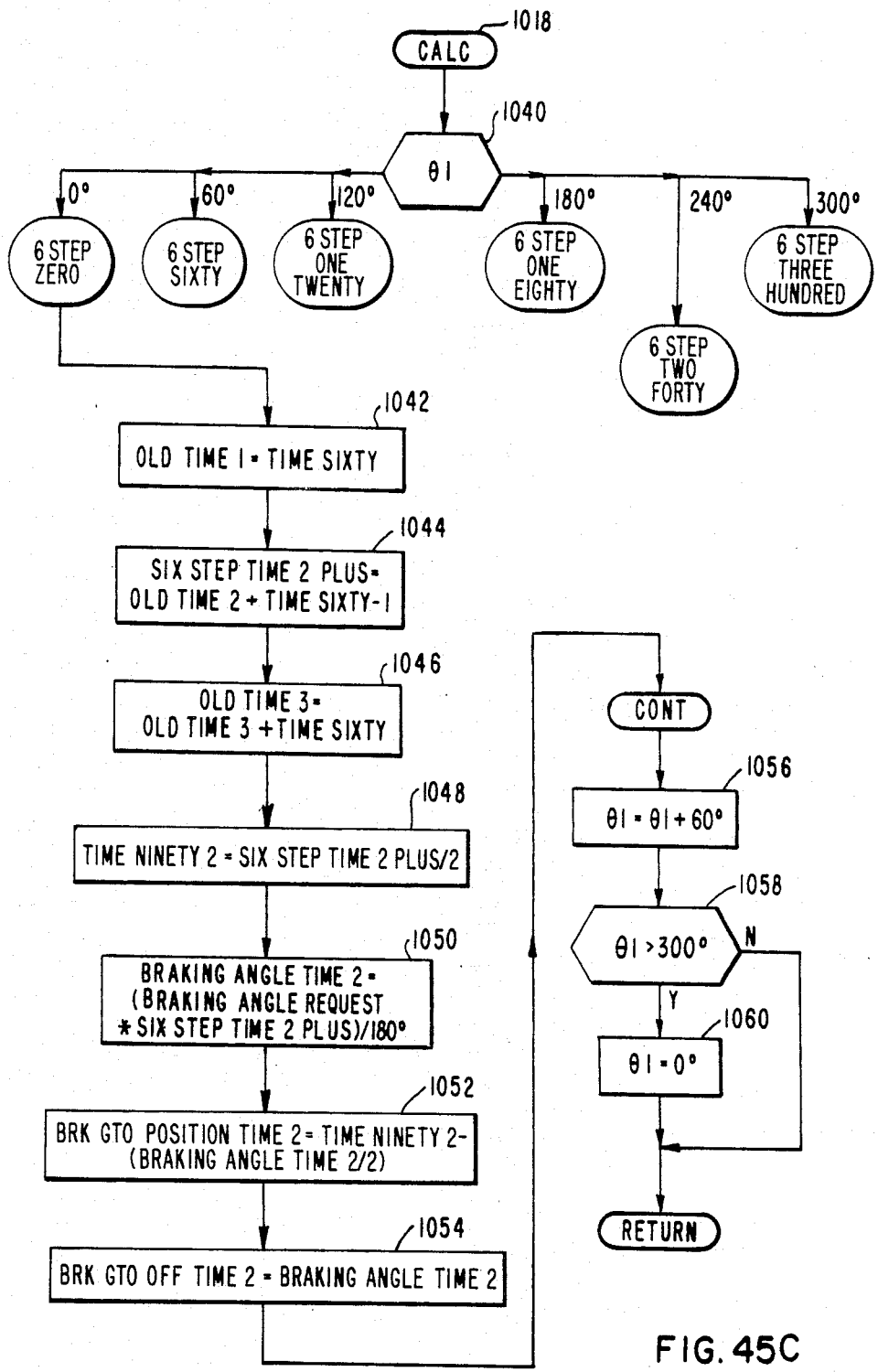

In the C plus six-step procedure shown in FIG. 40, at block 700 a branch is made to the six-step calculation subroutine shown in FIG. 45. At block 702 a check is made to determine the direction, and if it is forward, the VC plus interrupt occurs at 300° as shown in FIG. 11. In response to this interrupt, the GTO time calculations for phase 1 plus should have been made from 0° to 180°. So at block 704 a check is made to see if the one plus GTO time was calculated in block 700. If not, there is an error. If so, at block 706 this one plus GTO time is moved to the A plus timer. At block 708 a check is made to see if the brake GTO off time one equals zero. If not, at blocks 710 and 712 the brake GTO off time 1 and the brake GTO position time 1 are sent to the appropriate phase A GTO brake timers. The program flow then proceeds to block 724 which will be explained later. If the direction is reverse at block 702, this means that with the waveform VB the interrupt occurs at the 60° mark, and there should have been calculated the 3 plus GTO time at block 700 and which goes from 120° to 300° of waveform VC shown in FIG. 11. At block 714 a check is made to see if this time was calculated, and if so we jump down here to block 716 where the 3 plus GTO time is moved to the B plus timer. At block 718 a check is made to see if the brake GTO off time 3 is equal to zero. If not, at blocks 720 and 722 the brake GTO off time 3 and the brake GTO position time 3 are moved out to the proper phase B brake timers. At block 724 a check is made to see if the program is in a six-step to quasi six-step transition. If the flag is set, then a six-step to quasi six-step transition is desired. At block 726 a branch is made to the subroutine for the six-step to quasi six-step transition shown in FIG. 49. In the transition routine, two sixty degree sections will be calculated, and the times will be placed in the queues since the queues will now be used again. Then at block 728 the six-step to Q six transition flag is reset, and the transition to quasi six-step is complete at this point. Then the program goes to the interrupt procedure 4 exit.

Figure 41:
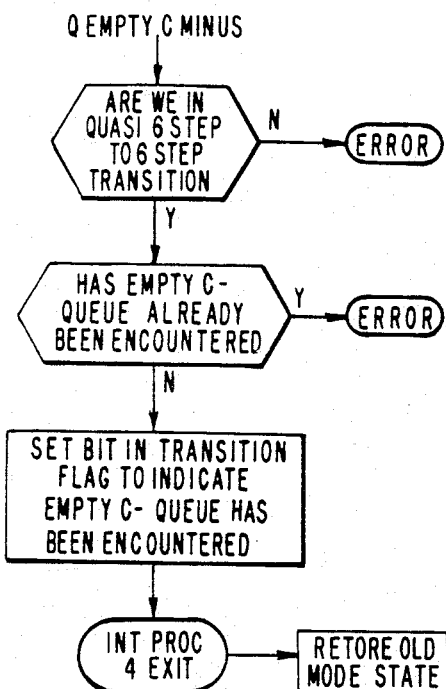
FIG. 41 shows a flow chart for the Q empty C minus routine.

The Q empty minus routine shown in FIG. 41 functions similarly to the Q empty A minus routine shown in FIG. 27.

There is no lower priority interrupt for the timers after the interrupt procedure 4, so there is no possibility of receiving an interrupt 4 in one of the other timer interrupt procedures before the disabling of the interrupts in those procedures, so there is no need to worry about the stack. For this reason, there is no Calc Exit routine associated with the interrupt procedure 4 routine. However, the small interrupt procedure 4 exit procedure which consists of restoring the old mode state and restoring the interrupt enable status to the conditions they were in prior to the interrupt 4 occurring are necessary and are included in FIG. 41.

Calculate Q values routine is shown in FIG. 42. At block 730 the old mode state is saved and mode state is set equal to compute state, which indicates queue times are being computed. At block 732 a check is made to see what is the synthesis mode. The queue values are calculated only in PWM and quasi six-step modes. If the mode is PWM, a branch is made to the subroutine shown in FIG. 43 called load Q PWM in block 734. If the mode is quasi six-step, a branch is made to the load Q Q-six routine shown in FIG. 44 at block 736. At block 738 the mode state is restored.

Figure 43A:
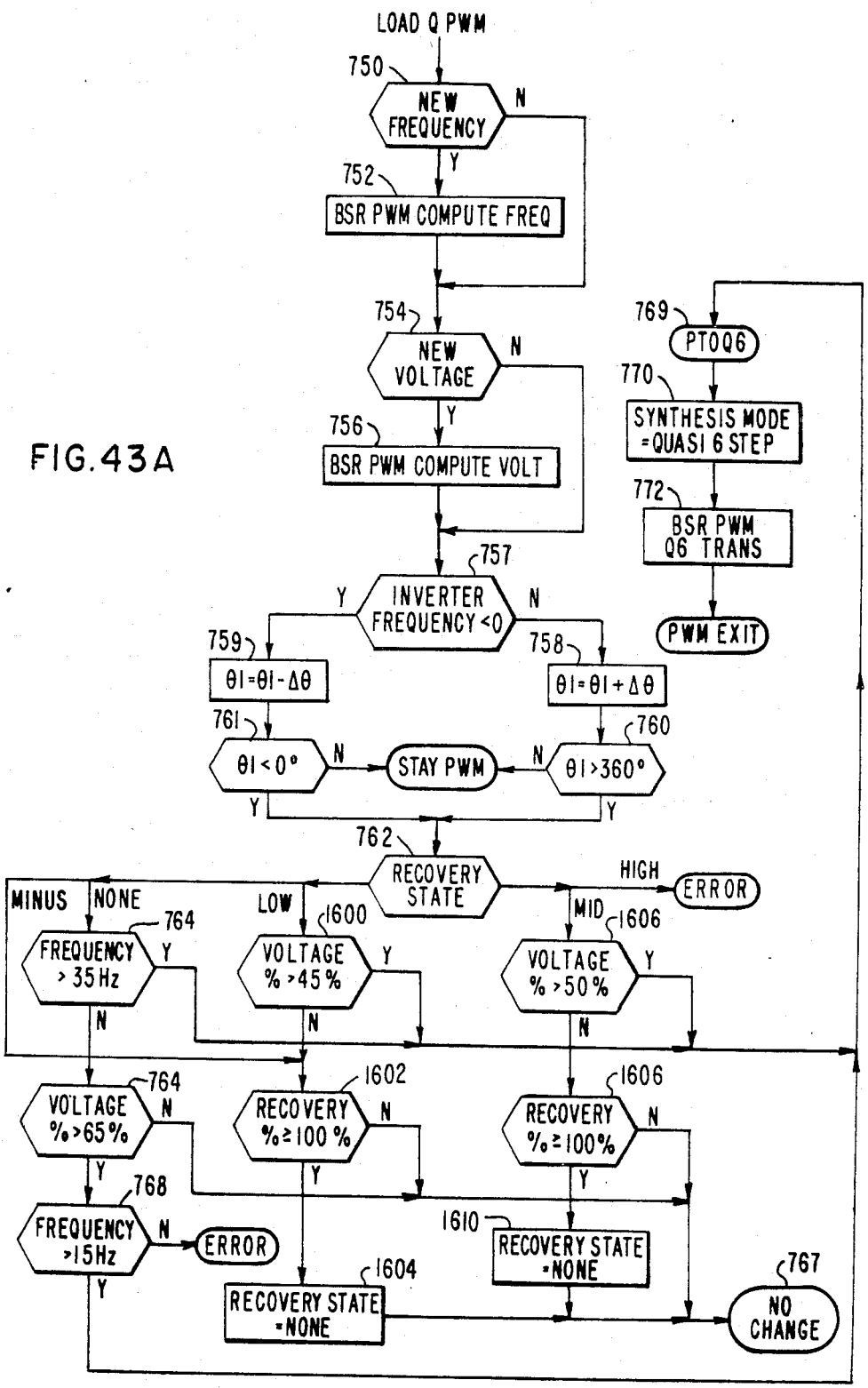
FIGS. 43A, 43B, and 43C show a flow chart for the load Q in PWM mode routine.
Figure 43B:
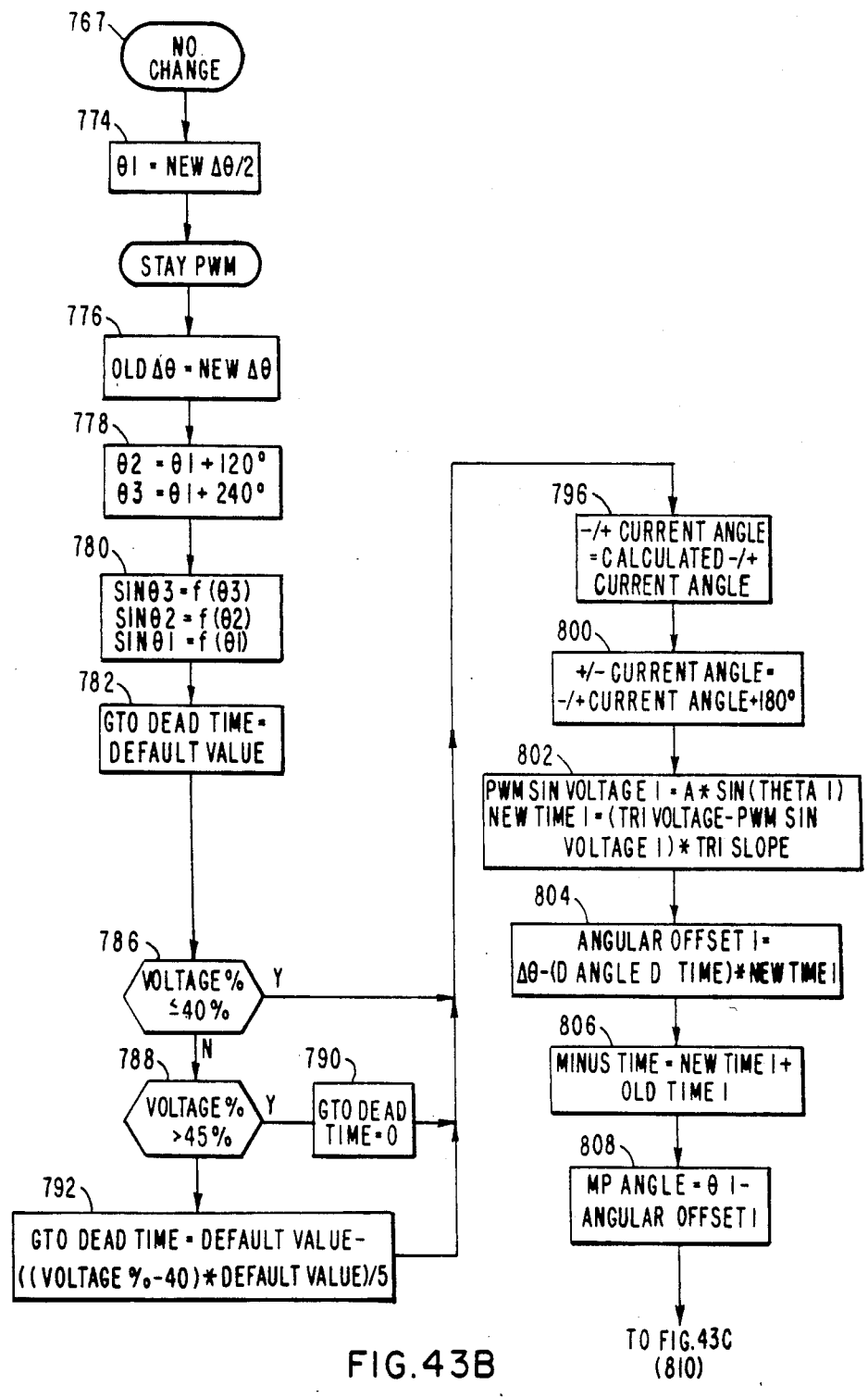
Figure 43C:
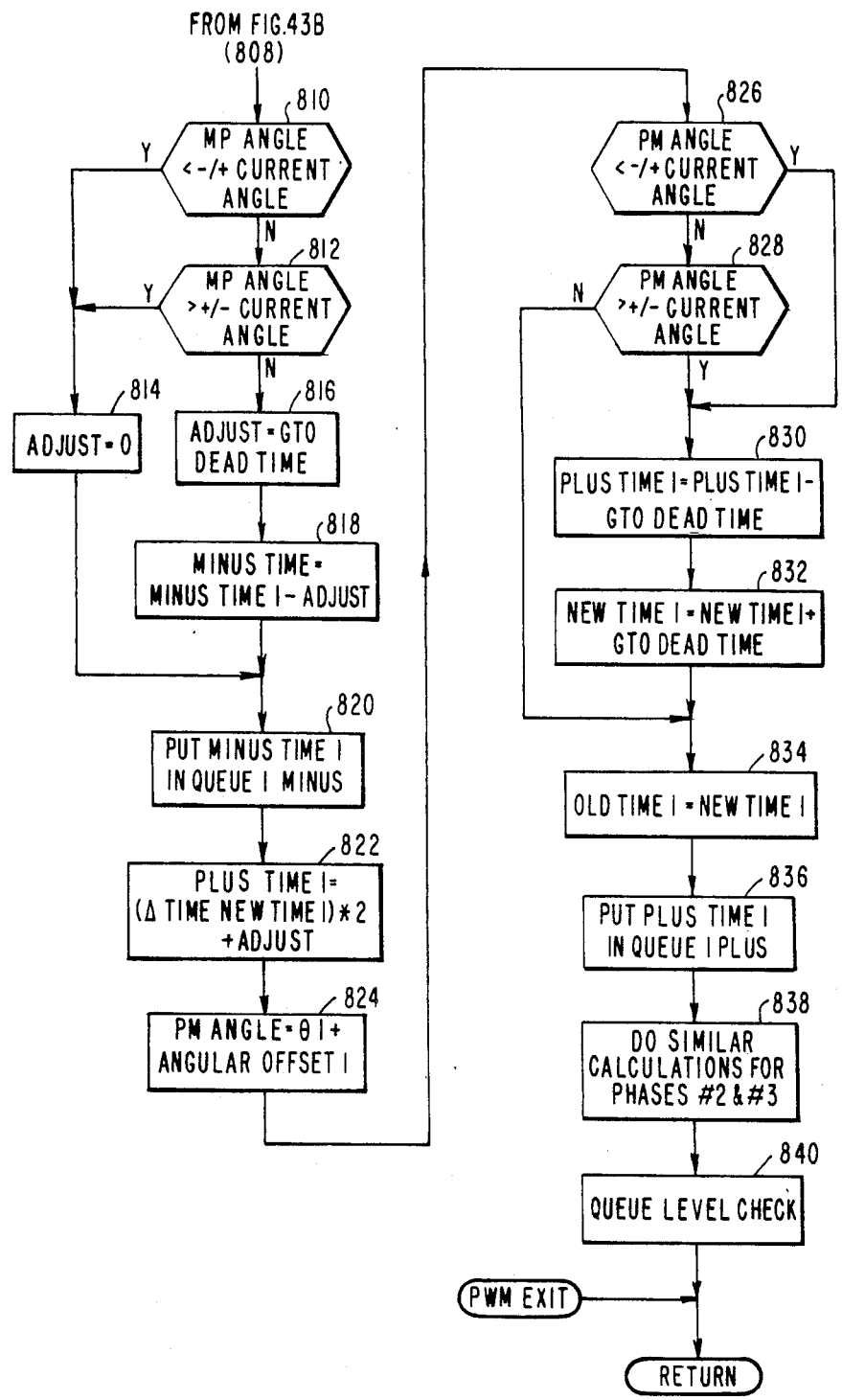
Figure 44A:
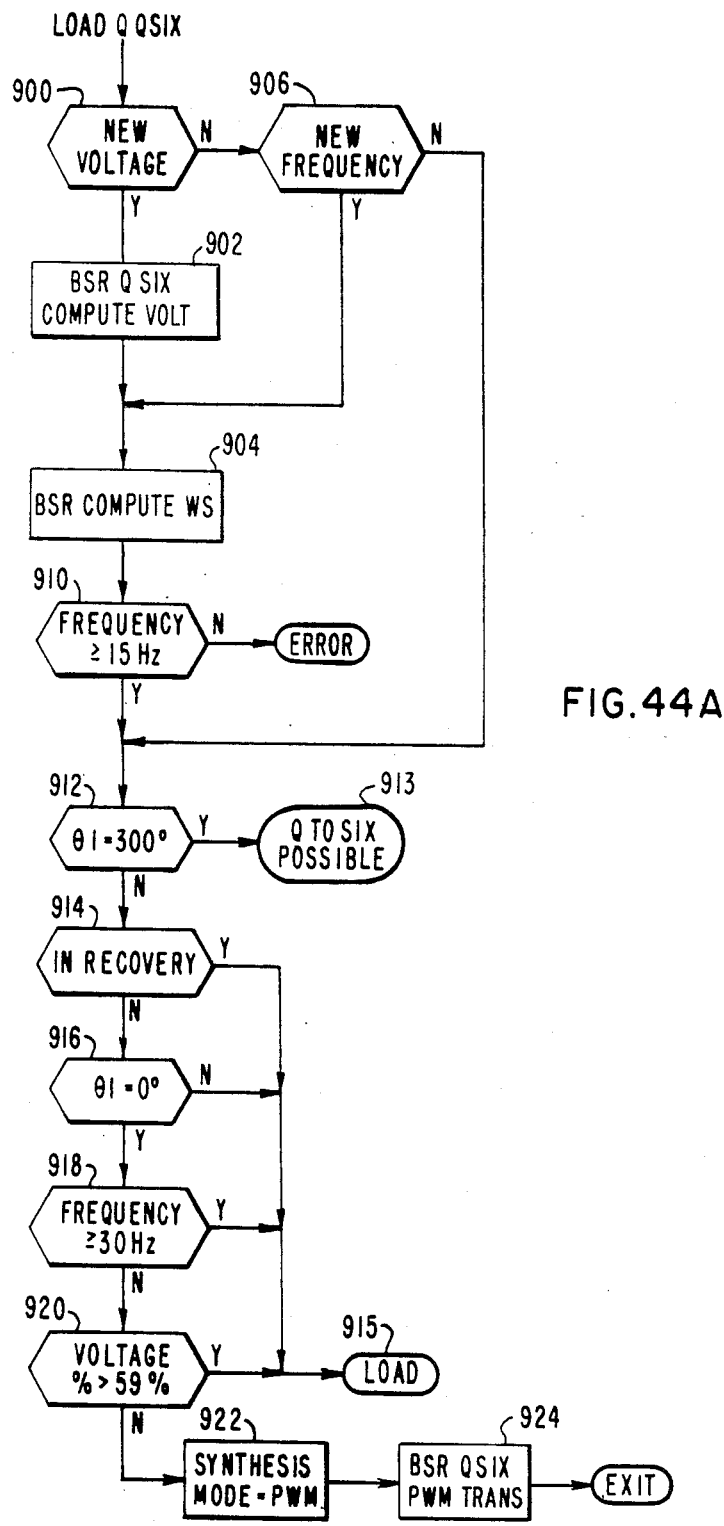
FIGS. 44A, 44B, 44C, 44D, and 44E show a flow chart for the load Q in Quasi six-step mode routine.
Figure 44B:
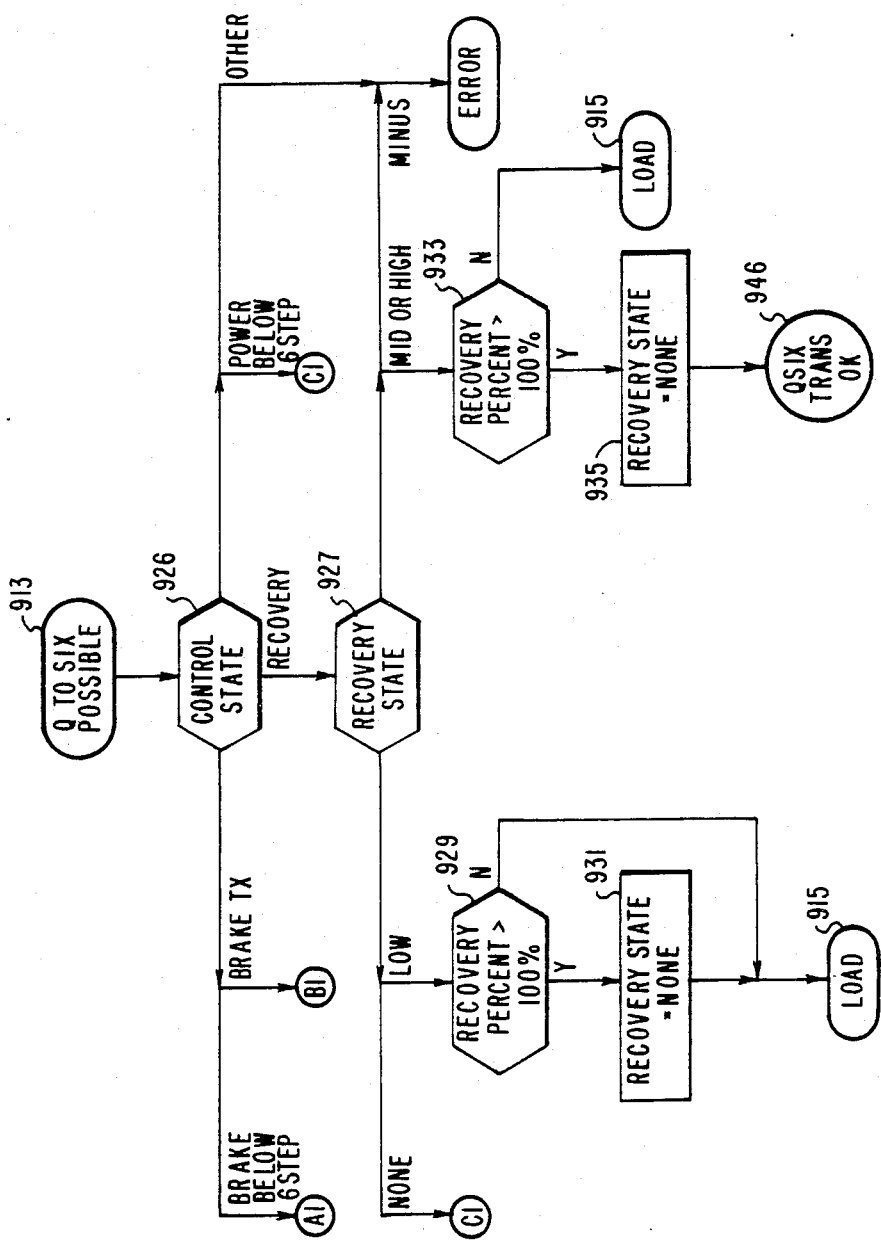
Figure 44C:
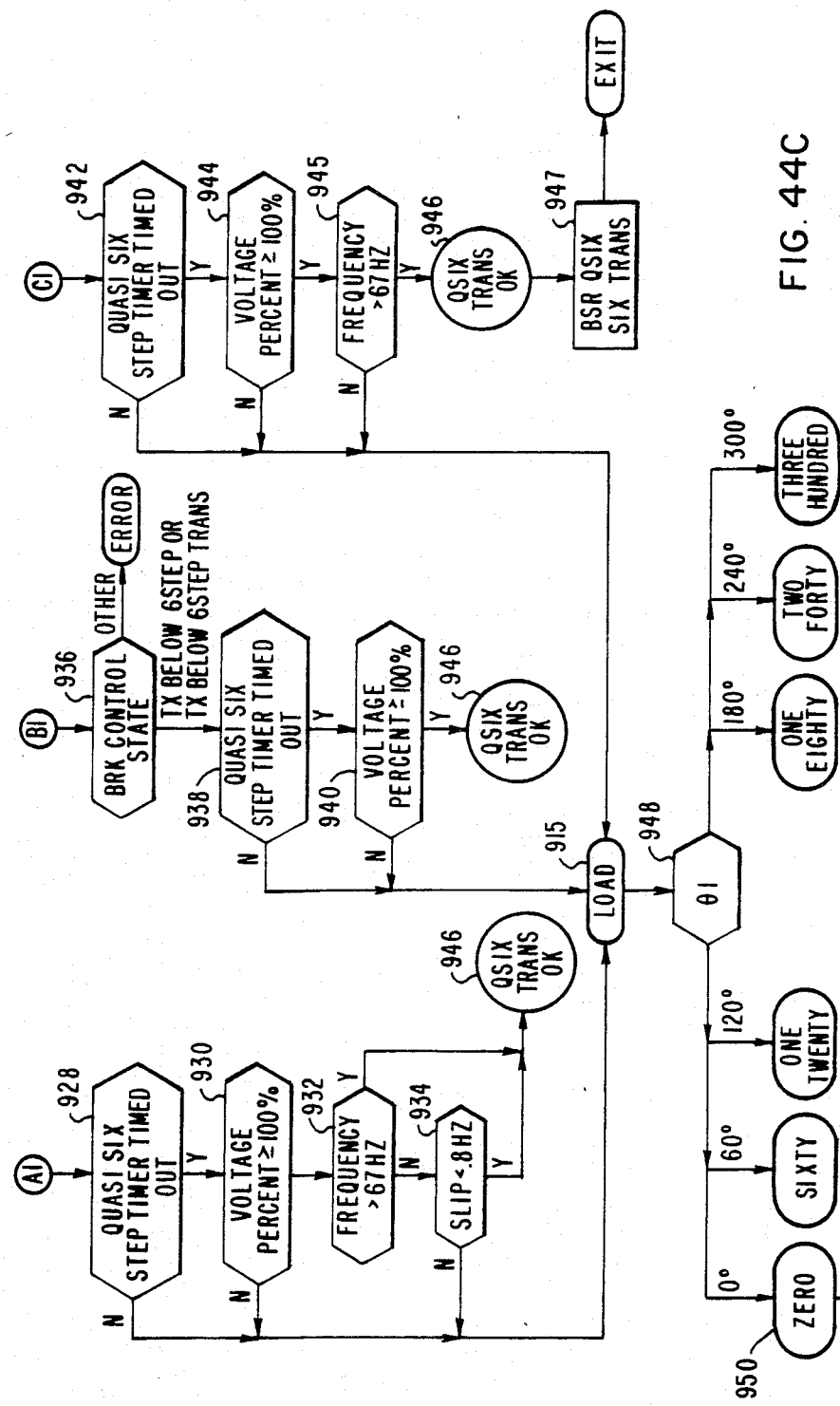
Figure 44D:
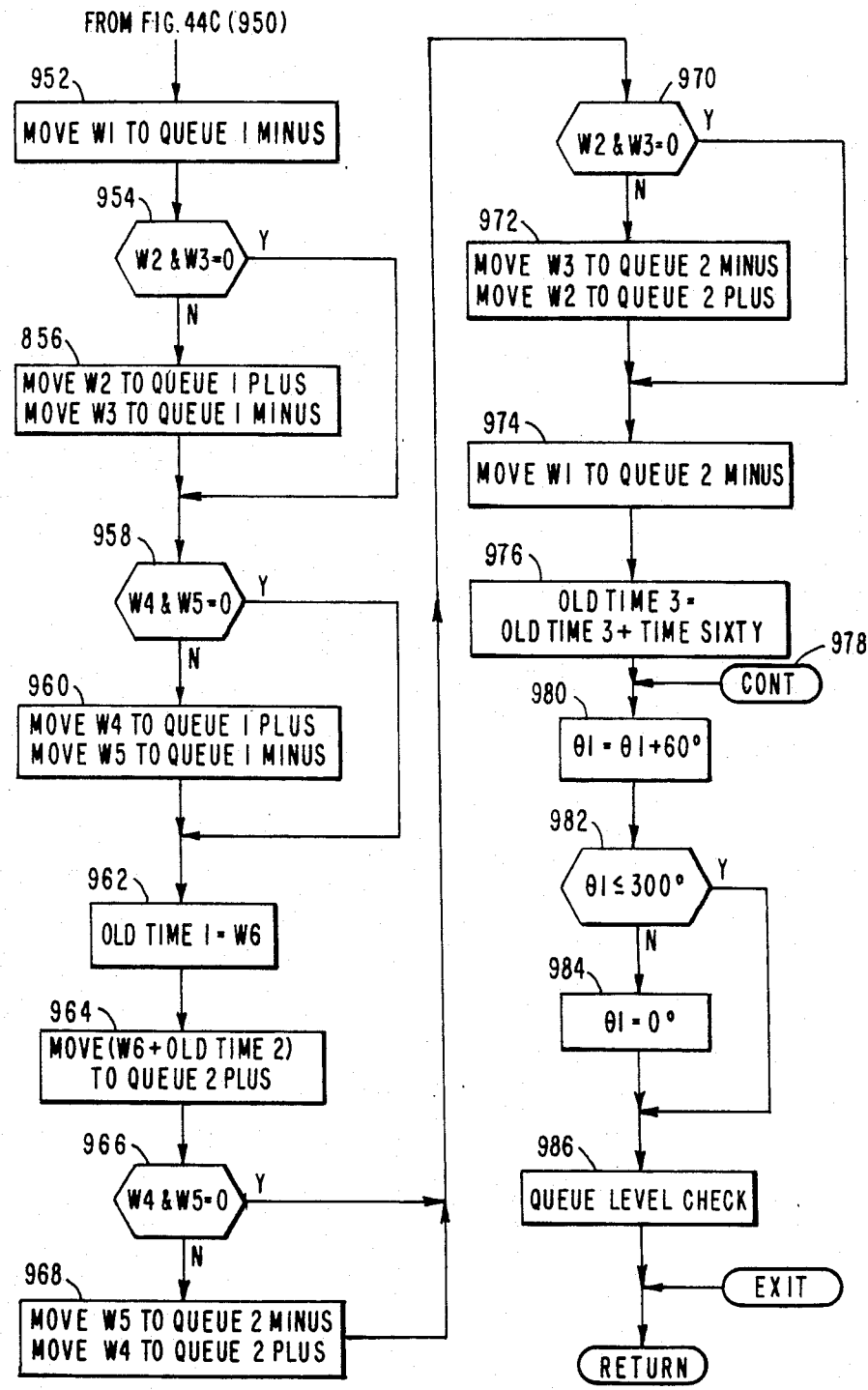
Figure 44E:
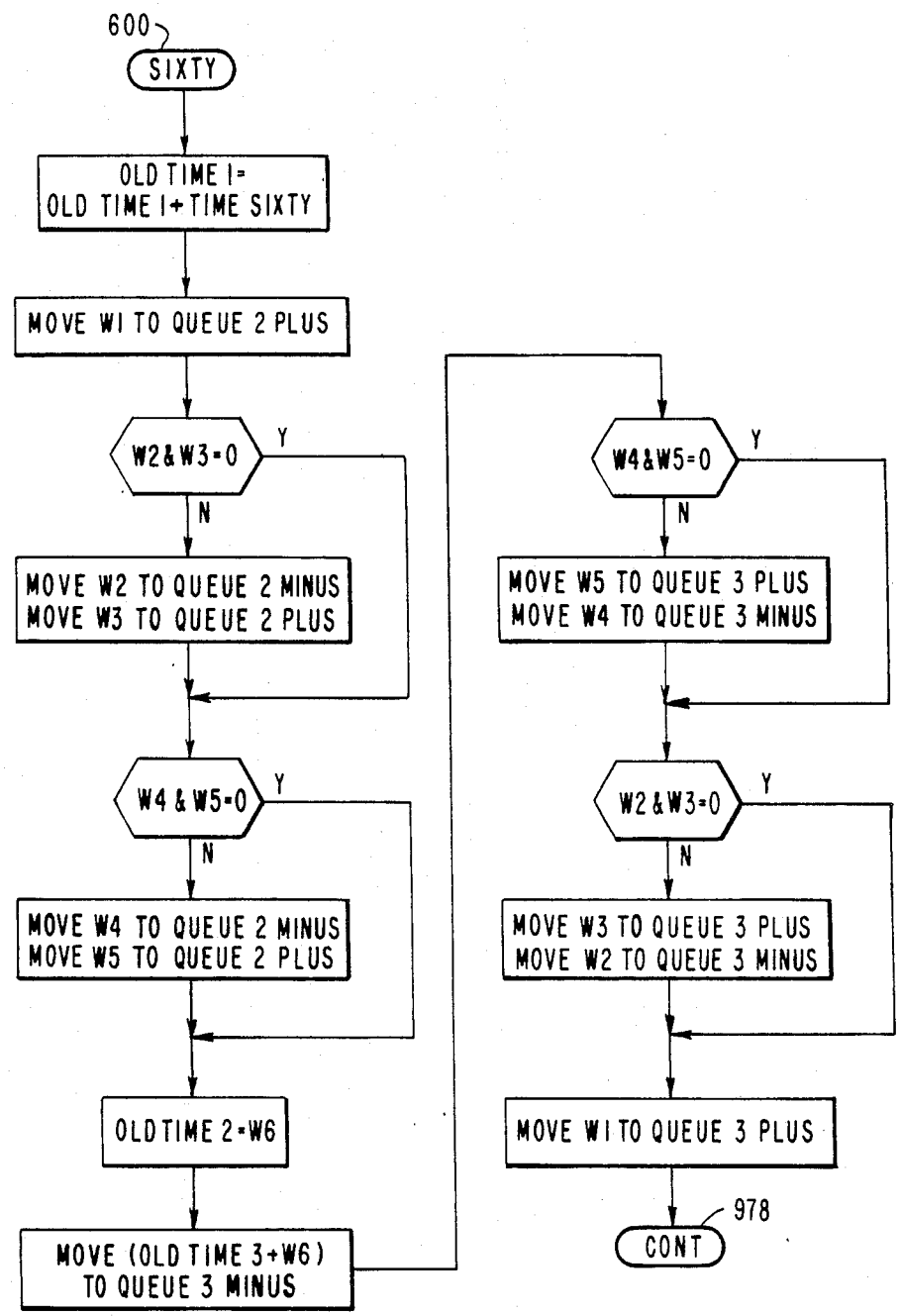
Figure 50:
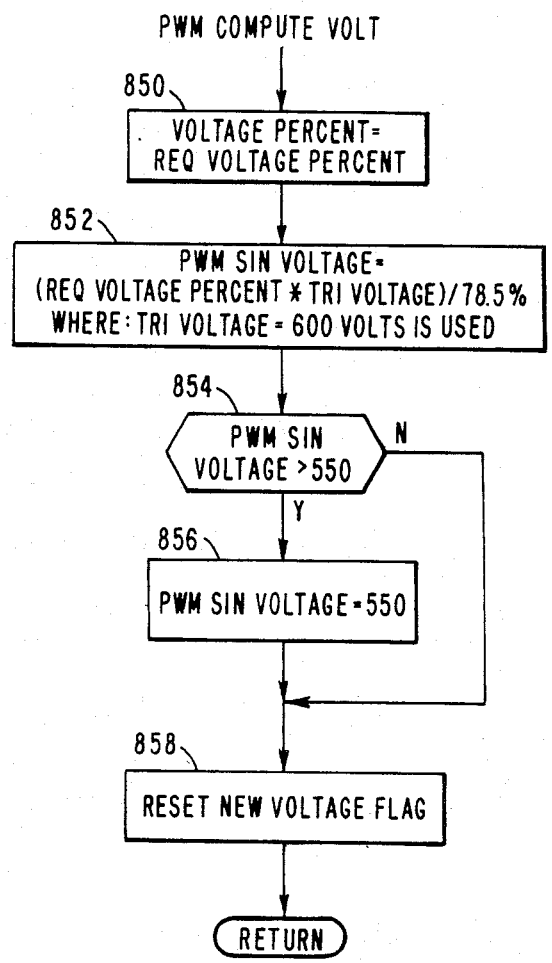
FIG. 50 shows a flow chart for the PWM compute voltage routine.

In FIGS. 43A, 43B and 43C there is shown the Load Q PWM routine called at block 734 of FIG. 42. At block 750 a check is made to see if a new frequency is requested by the motor controller 62. If yes, at block 752 the new frequency related variables are calculated using the routine shown in FIG. 51. A check is made at block 754 to see if a new voltage is requested. If yes, the routine shown in FIG. 50 is used to calculate the new voltage related variables.

Figure 46:
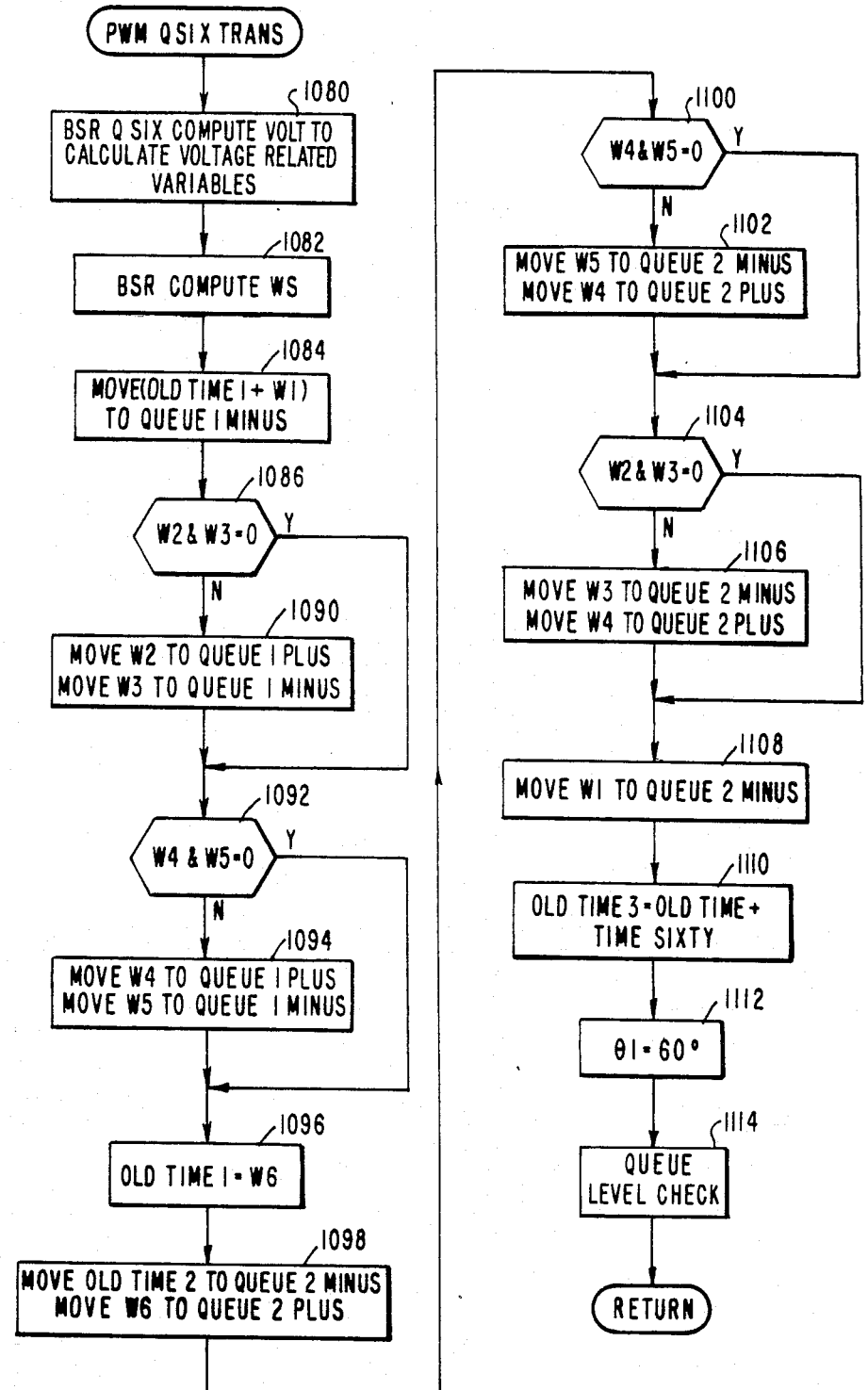
FIG. 46 shows a flow chart for the PWM to Quasi six-step transition routine.

At block 757, a check is made to see if the inverter frequency is positive or negative. For a load such as a transit vehicle, upon starting from a stationary position on a hill, it is possible for the car to roll backwards initially. The motor must run first in the negative direction and later switch to a positive direction as the car starts to move forward. Simply switching two motor phases to change direction is not desirable because this will result in instantaneous phase shifts in the motor voltage that will result in overcurrent conditions which will shut the inverter down. A smooth motor directional change can be obtained under PWM operation by blocks 757 through 761. If the motor is rotating in the reverse direction, block 759 is executed. Here delta theta is subtracted from the old theta 1 value to form the new theta 1 value where theta 1 is the angular displacement of the phase 1 sine waveform which corresponds with the triangle waveform shown in FIG. 12. In block 761, theta 1 is checked to see if it is less than 0°. If not, a branch to stay PWM in FIG. 43B will occur. If yes, block 762 will be executed. If the motor is rotating in the proper direction block 758 will be executed. Here delta theta is added to the old theta 1 value to form the new theta 1 value. In block 760, a check is made to see if theta 1 is now greater than 360°. If not a branch to stay PWM will result. If so a branch to block 762 will result. Subtracting delta theta from theta 1 will result in an inverter frequency rotating in the opposite direction as that produced from adding delta theta to theta 1. Also, changing from subtracting to adding will result in a rotational direction change but will not result in any instantaneous phase shifts or other undesirable transients which would result in a rough vehicle ride or even a shutdown. The resulting new theta 1 corresponds to $\theta 1$ in FIG. 12 whereas the old theta 1 corresponds to the corresponding $\theta 1$ in the triangle period calculated the last time PWM calculations were performed. The only time a change from PWM to quasi six-step is allowed, as shown in FIG. 15, is at the 0° crossing of phase A. When theta 1 is greater than or equal to 360° in block 760 or less than 0° in block 761, the first triangle period is to be calculated after phase A passes through 0°. This indicates that the operation is at the 0° mark of phase A which means that if conditions are right to switch to quasi six-step, this may be done at this moment. At block 762, a check is made of the recovery state. Under normal operation, recovery state will be set to none. The recovery state is set to one of the other conditions shown when the inverter has been shut down to an abnormal condition, such as an overcurrent fault or overvoltage fault, and that fault condition has disappeared, and the inverter is desired to be restarted when the motor is already rotating. A special recovery procedure controlled by the motor controller 62 is utilized to bring up the inverter output voltage to its normal operating value. During this special recovery procedure, PWM will be used at frequencies above the 35 Hz shown in FIG. 7 and requested voltage percent alone will be used to determine if a switch to quasi six-step is warranted. If in normal operation, the program flow will go to block 764. At block 764, a check is made to see if the frequency is greater than 35 Hz; and if the frequency is greater than 35 Hz, then a change is made to quasi six-step because it is not desired to stay in PWM at a frequency above 35 Hz. If the frequency is not greater than 35 Hz, at block 766 a check is made to see if the voltage percent is greater than 65%. If not, then at block 767 a change is not desired which will keep the operation in PWM. If the voltage percent is greater than 65%, then at block 768 a check is made to see if the frequency is greater than 15 Hz, because it is desired to change to quasi six-step; but if for some reason the frequency is not at least 15 Hz, then the change to quasi six-step cannot be made because the frequency is too low. If not, there is an error. Actually FIGS. 7 and 8 are a simplification of the actual switching points between synthesis modes. The switching points shown in these Figures are only valid for a DC line voltage of about 600 volts or greater. Switches between synthesis modes are also effected by the percentage of full voltage requested out of the inverter. If the DC lines voltage is less than 600 volts, the PWM/Quasi six-step switch points will occur at proportionally lower frequencies. However, this lower frequency is limited to no less than 15 Hz. If at block 764 or at block 768 there is a decision to go to quasi six-step, a jump is made to the P to Q6 block 769. In block 770, a change to quasi six-step synthesis is desired, so the synthesis mode is set equal to quasi six-step, and then a subroutine call is made to the PWM to quasi six-step transition routine at block 772, which routine is shown in FIG. 46. This PWM to quasi six-step transition routine will calculate the time pulses between 0° to 60° as shown in FIG. 15, and which are called the PWM to quasi six-step transition time pulses as shown by the VA, VB, and VC waveforms. If at block 762 recovery is in the minus state, at block 1602 a check is made to see if the recovery percent is greater than or equal to 100%, and if it is not, the operation will remain in PWM at bubble 767. If yes at block 1602, then the recovery state is set equal to none and a jump is made to bubble 767 to remain in PWM. If the recovery state equals low, which means the frequency is between 0 Hz and 70 Hz, then at block 1600 a check is made to see if the voltage percent is greater than 45%. If it is, then the operation will change to quasi six-step with a branch made to bubble 769. If not, a branch is made to block 1602 to check if the recovery percent is greater than or equal to 100%, and if it is, then the recovery state is set equal to none. If recovery state at block 762 equals mid, which means the frequency is from 70 to 100 Hz, at block 1606 a check is made to see if the voltage percent is greater than 50% and if it is, then a jump is made to bubble 769 to change to quasi six-step. If not, at block 1608 a check is made to see if the recovery percent is greater than or equal to 100%. If it is, the recovery state is set equal to none at block 1610. If not, a branch is made to bubble 767 to stay in PWM. If the recovery state is equal to high at block 762, that is an error condition since the operation cannot be in PWM above 100 Hz. If the theta 1 criteria in blocks 760 or 761 results in a yes answer and a decision to stay in PWM was made in subsequent tests, a branch would be made to the no change routine in block 767. At block 774 theta 1 is set equal to the new delta theta divided by 2. Due to computational roundoff error theta 1 must be reinitialized at the beginning of every 360° cycle to insure that the roundoff errors do not accumulate. The waveform shown in FIG. 12 shows new delta theta as the period of the triangle wave and theta 1 would equal new delta theta divided by 2. In block 760 or 761, if theta 1 does not satisfy the angle requirements, then a branch is made to stay PWM in block 761, which is where the operation is now. Delta theta is shown in FIG. 12 as equal to new delta theta, so in block 776 old delta theta is set equal to new delta theta. At block 778 theta 2 is set equal to theta 1 plus 120°, and theta 3 is set equal to theta 1 plus 240° to set up theta for the other two phases. At block 780 the sine of theta 3 is obtained from a lookup table as a function of theta 3, the sine of theta 2 is obtained from a lookup table as a function of theta 2, and the sine of theta 1 is obtained from a lookup table as a function of theta 1.

At block 802 the PWM sine voltage for phase 1 is set equal to the amplitude of the approximated sine waveform times the sine of theta 1. And new time 1, which is the displacement from the beginning of the triangle period to the crossing of the approximated sine waveform, is set equal to the triangle voltage minus the PWM sine voltage 1 times the triangle slope where triangle voltage equals 600 volts. This is shown in FIG. 12 as the period B.

In an actual inverter, dead times where both GTOs are off must be inserted whenever one GTO of a pole is turned off and the other GTO in the sme pole is turned on. These dead times last 30 to 35 microseconds and affect the output voltage from the inverter depending upon how much the motor current lags the motor voltage. If the lag is less than 90° with the motor in power, the inverter output voltage will be reduced. If the lag is more than 90° with the motor in brake, the inverter output voltage will be increased. At low output voltage percentages, these dead times should be compensated for to provide proper motor operation. The dead times can be properly compensated for by advancing the −GTO to +GTO transition if the motor current flow from the inverter to the motor for that pole is positive at the time of the GTO switch transition. If the motor current is negative at the time of the GTO switch transition, the +GTO to −GTO transition is advanced. This modification of the transition point negates the effects of the GTO dead times. Also other losses in the inverter result in similar dead time voltage effects. These other losses can be compensated for by using a larger than 30 to 35 microsecond adjustment. Through experimental methods, a value of about 65 microseconds for the transition adjustment practically negates all dead times and inverter losses. The default value in block 782 is equal to this 65 microsecond value. The GTO dead time in block 782 is set equal to the default value and represents the amount of time that the GTO transitions will be adjusted. It is both time consuming and unnecessary for the GTO transitions to be adjusted while in quasi six-step or six-step, so the transition adjustment is phased out while in PWM synthesis. Once the requested voltage percent reaches 40% the phase out begins by decreasing the compensation time so that by the time the voltage percent equals 45% this compensation time variable called GTO dead time, is equal to zero. The compensation time must be phased out gradually because a drastic change will result in unwanted motor transients. Block 786 tests the requested voltage percent to see if it is less than or equal to 40%. If yes, a GTO dead time equal to default value will be used. If not, in block 788, the voltage percent is checked against 45%. If greater than 45%, block 790 will set GTO dead time equal to zero, thus eliminating the transition correction. Block 792 is executed if the voltage percent is between 40% and 45% and calculates a GTO dead time value which is between zero and the default value. At block 796 the −/+ current angle, which is the angle that the current lags the voltage, is set equal to a calculated lag angle. This calculated lag angle is calculated by the motor controller 62. This angle could also be measured with external hardware if so desired. In block 800, the +/− current angle is set equal to the −/+ current angle +180°. The motor current for phase 1 is negative between 0° and −/+ current angle, positive between −/+ current angle and +/− current angle, and negative between +/− current angle and 360° in relation to the voltage angle shown in FIG. 9.

In block 804, angular offset 1 is set equal to delta theta minus the quantity D angle D time multiplied by new time 1. D angle D time represents the per unit angular offset represented by a per unit time. Angular offset 1 represents the angular period represented by time C in FIG. 12.

Block 806 determines the minus time, shown in FIG. 12 as A±B, as equal to the new time 1 plus the old time 1, where the old time 1 is the time A left over from the last calculation period. In block 808, MP angle is set equal to theta 1 minus the angular offset 1. MP angle represents the angle at which the minus time calculated in block 806 ends. In other words, MP angle is the angle at which the −GTO to +GTO transition will occur. In block 810, this MP angle is compared with the −/+ current angle to see if the motor current is negative at the time that the −GTO to +GTO transition occurs. If MP angle is less than −/+ current angle, then the motor current is negative and no adjustment will be made to the −GTO to +GTO transition and adjust is set equal to zero in block 814. If the MP angle is not less than −/+ current angle, the current has a chance at being positive at the −GTO to +GTO transition point. In block 812, if MP angle is greater than +/− current angle, the current is negative and block 814 will set the adjust equal to zero. But if MP angle is less than or equal to +/− current angle, the current is positive at the −GTO to +GTO transition point and adjust is set equal to GTO dead time in block 816. In block 818 the minus time calculated in block 806 is adjusted by subtracting adjust from it. This subtraction will in effect advance the −GTO to +GTO transition point to adjust for the dead time. At block 820, the minus time 1 is put into the minus queue for phase 1.

At block 822, the plus time 1 is calculated as equal to the delta time, which is the half of the period as shown in FIG. 12, minus new time 1, which is defined by B, which gives the C time, and the C time is multiplied by 2 and adjust is added. Since C=D, then two times C, gives the plus time. Adding the adjust time completes the −GTO to +GTO transition compensation for the dead time effects.

At block 824, PM angle is set equal to theta 1 plus the angular offset 1. PM angle represents the angle at which the plus time calculated in block 820 ends. In other words, PM angle is the angle at which the +GTO to −GTO transition will occur. In block 826, this PM angle is compared with the −/+ current angle to see if the motor current is negative at the time that the +GTO to the −GTO transition occurs. If PM angle is less than −/+ current angle, then the motor current is negative and an adjustment will be made to the +GTO to −GTO transition starting with block 830. If the PM angle is not less than −/+ current angle, the current has a change at being positive at the +GTO to −GTO transition point. In block 828, if PM angle is greater than +/− current angle, the current is negative and block 830 will be executed. If PM angle is not greater than +/− current angle, the current is positive at the +GTO to −GTO transition and no adjustment for dead times is needed; therefore the program jumps to block 834. In blocks 830 and 832, the +GTO to −GTO transition point is advanced to compensate for dead time effects. Plus time 1 is adjusted by subtracting GTO dead time in block 830, and new time 1 is adjusted by adding GTO dead time in block 832. The result of the calculations in blocks 830 and 832 is to advance the +GTO to −GTO transition point.

At block 834 the old-time 1, which is time E shown in FIG. 12, is set equal to new-time 1, which is time B. In block 836 the plus-time 1 is put into the 1 plus queue. So there has now been calculated a minus time and a plus time. At block 838 for phase 2 and phase 3, calculations are made similar to those made for phase 1, both the plus and minus times. At block 840 a check is made to see if the queues are all filled.

If the operation is in quasi six-step, the load queue quasi six-step routine shown in FIGS. 44A, 44B, 44C and 44D is called. At block 900 a check is made to see if there is a new voltage request. If there is a new voltage request, then at block 902 there are calculated new voltage related variables using the queue six-step mode compute voltage routine shown in FIG. 54. At block 904 there are calculated new W times using the compute W's routine shown in FIG. 55, because if the voltage-related variables are changed, then new W times are desired. At block 906, if a new voltage was not requested, a check is made to see if a new frequency was requested. If so, then at block 904 the new W times shown in FIG. 13.

At block 910 a check is made to see if the frequency is greater than or equal to 15 Hz. If it is not, there is an error. If the frequency is greater than 15 Hz, at block 912 a check is made to see if theta 1 is equal to 300. In FIG. 16 if theta 1 is equal to 300°, it is possible to make the transition to six-step at block 913. If theta 1 does not equal 300°, then at block 914 a check is made to see if the operation is in recovery. Assume it is not; so at block 916 a check is made to see if theta 1 is equal 0°. This check determines if the operation can go to PWM. As shown in FIG. 18, at 0° is where the transition is made to PWM. If theta is not 0°, then a branch is made to LOAD at block 915 where the regular quasi six-step calculations are performed. If theta is equal to 0°, then a check is made to see if there is a desire to switch to PWM. At block 918 a check is made to see if the frequency is greater than or equal to 30 Hz. If it is greater than or equal to 30 Hz, there is no desire to switch to PWM; but if in block 918 the frequency is not greater than or equal to 30 Hz, then a check is made to see if there is a desire to switch to PWM. At block 920 a check is made to see if the voltage percent is greater than 59%, and if yes, then the operation will stay in quasi six-step. If less than 59%, then at block 922 the synthesis mode is set equal to PWM, and in block 924 a branch is made to the quasi six-step to PWM transition routine shown in FIG. 47, which will ease into the PWM synthesis at 0° as shown in FIG. 18.

At block 912 in FIG. 44, if theta 1 is equal to 300°, then a branch is made to the quasi six-step to six-step transition is possible routine at block 913.

At block 926 the control state is checked, and if the control state is brake below six-step at block 928 a check is made to see if the quasi six-step timer is timed out. This is a 0.2 second timer which prevents the control state going back and forth between quasi six-step and six-step too many times because whenever a change is made from quasi six-step to six-step and back again, a small transient results that could produce some problems. When a change is made from six-step to quasi six-step the operation should remain in quasi six-step for 0.2 seconds before going back to six-step. If that quasi six-step timer is not timed out, the operation will just remain in quasi six-step and a branch is made to bubble 915 which is the load routine. If the timer is timed out, then in block 930, a check is made to see if the voltage percent is greater than or equal to 100% and if it is not, then the operation will remain in quasi six-step at bubble 915. If yes at block 932 a check is made to see if the frequency is greater than 67 Hz. If it is greater than 67 Hz, then the program goes to the quasi six-step transition okay bubble 946 and that will perform the transition to six-step. If in block 932 the answer is no, then at block 934, a check is made to see if the slip is less than −0.8 Hz, which is more negative than −0.8 Hz. If it is not more negative than −0.8 Hz, then at bubble 915 the operation will remain in quasi six-step. If it is, then at bubble 946 a branch is made to six-step. If this is in braking, it is not desired to remain in quasi six-step if the slip is less than −0.8 Hz, because that means the transformer may be needed and in order to have the transformer, the operation has to be in six-step. If this is power, the use of quasi six-step is allowed up to 67 Hz. At block 926, if the operation is in brake TX state, then a branch is made to block 936 where a check is made of the brake control state. If the brake control state is either TX below six-step or TX below six-step trans, then a branch is made to block 938. If not, then there is some problem with the software and a branch is made to the error routine at bubble 937 for a shutdown. At block 938 a check is made of the quasi six-step timer to see if it is timed out. If it is not timed out, the operation will remain in quasi six-step at bubble 915. If this timer is timed out, before a switch is made to six-step, in block 940 a check is made to see if the voltage percentage is greater than or equal to 100%, and if not, then the operation will remain in quasi six-step at bubble 915.

At block 926, if the control state is power below six-step, a branch is made to block 942 where a check is made to see if the quasi six-step timer is timed out. If not, the operation will remain in quasi six-step at the bubble 915. If the answer is yes at block 942, then at block 944, a check is made of the voltage percent to see if it is greater than or equal to 100%. If not, the operation will remain in quasi six-step. If yes, at block 945 a check is made to see if the frequency is greater than 67 Hz and if it is not, the operation will remain in quasi six-step and jump to bubble 915. If the frequency is up above 67 Hz at block 945, then a transition can be made to six-step and a jump is made to bubble 946 which is the quasi six-step transition okay routine and then at block 947 a branch is made to the quasi six-step to six-step transition subroutine which will perform the transition calculations.

At block 926 if the control state is recovery, at to block 927 a check is made to see which recovery state. The recovery state is provided after a shutdown of the inverter with the motor still rotating and it is desired to bring up the inverter again. A special procedure is provided to bring back the voltage slowly across the motor, since it is not desired to put the full voltage across the motor or else there can be overcurrent trips because there is not enough back EMF of the motor to oppose the line voltage and this can result in a high motor current. The states of the recovery procedure are none, low, mid, high and minus, which are based on the inverter frequency at the start of the recovery procedure. None indicates the operation is not in a recovery and is in normal operation. Low is a frequency below 70 Hz, mid is a frequency between 70 Hz and 100 Hz, and high is above 100 Hz. Minus is a frequency that is negative, with the motor rotating in the reverse direction so in effect there is a negative frequency. The reasons for having these different recovery states is the need to use different types of synthesis in order to bring up the voltage. For example, above 100 Hz, it is not desired to use PWM, so above 100 Hz one angle quasi six-step is used. For a frequency of 70 to 100 Hz, PWM and quasi six-step is used. If the recovery state is none, the same operation is provided as was done when the control state was power below six-step, since the operation was in recovery and has now finished and is ready to switch to a regular control state so it might as well operate as if it was in power below six-step. If the recovery state is low at block 927, then at block 929 a check is made to see if the recovery percent is greater than or equal to 100%. The motor operation requires a certain voltage percent across the motor to maintain the desired constant volts per hertz and in the recovery procedure the operation starts at a low percentage of that voltage and then builds up to 100% of that voltage to provide a gradual build up to reduce the transients on the motor. Once the voltage is 100%, that means the recovery state is done. In the low recovery state below 70 Hz, if the recovery percent is greater than or equal to 100% the recovery state is done and at block 931 the recovery state is set equal to none to tell the main control loop that recovery is done and it is time to switch to another major control state other than recovery and a branch is made to the load bubble 915. If the recovery state is mid or high at block 927, which means the frequency is above 70 Hz, then at block 933 a check is made to see if the recovery percent is greater than or equal to 100% and if yes at block 935 the recovery state is set equal to none and a branch is made to the quasi six-step transition okay at bubble 946 which means the operation can go to six-step.

If the recovery state has a negative frequency, the recovery state is equal to minus. To keep the motor from going the wrong way too fast, the syntheses will remain in PWM if the motor is going in the reverse direction. The recovery state equal to minus indicates there is a negative inverter frequency and recovery will use PWM. When the recovery state is equal to low, this means the inverter frequency is between 0 and 70 Hz on the motor and the synthesis starts with PWM, and the synthesis can switch to quasi six-step but will not switch to six-step. Depending on the quasi six-step to six-step transition criteria, at the end of the recovery state the operation will still be in quasi six-step and after that, if the control wishes, it can switch to six-step. In the 70 Hz to 100 Hz range in mid-recovery state, the synthesis starts with PWM and changes to quasi six-step, and when the recovery ends a change can be made to six-step. In the high recovery state above 100 Hz, PWM is not used because the switching frequency would be too high and one angle quasi six-step is used to keep the switching frequency down and a change is made to six-step at the end of the recovery.

Figure 57:
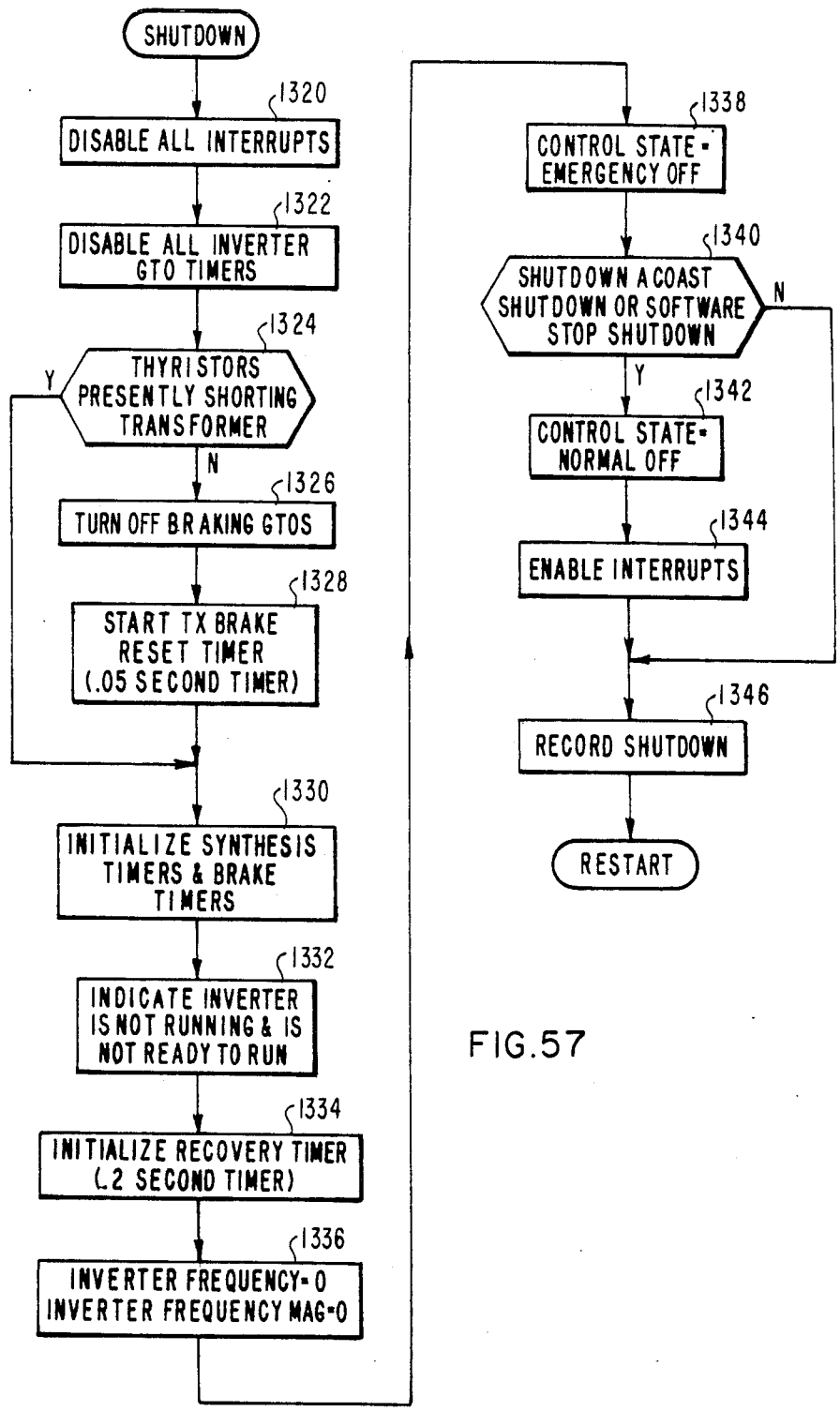
FIG. 57 shows a flow chart for the shutdown or error routine called by several of the disclosed routines.

At block 926, if the operation is in any other control state, there is a problem with the software and a branch is made to the error or shutdown routine shown in FIG. 57 to shut down the inverter.

The motor controller which is block 62 of FIG. 4 is what determines the recovery state and also controls the raising of the recovery percent from its minimum percent up to 100%. If the program stays in quasi six-step a branch is made to the bubble 915 called LOAD, at block 948 a check is made to see what theta 1 is. Theta 1 can either be 0°, 60°, 120°, 180°, 240°, or 300°, and this relates to the beginning of each 60° section of GTO firing times to be calculated. In FIG. 10, for the three phases of quasi six-step, 0° would be to the far left of the figure and that is the 0° to 60° section. When theta is zero, the program goes to the zero bubble 950. For the phase 1 waveform shown in FIG. 13, at block 952 W1 is the first time and that goes into the 1 minus queue. At block 952 a check is made to see if W2 and W3 equal 0, since if one is zero, the other one is going to be zero, because sometimes it is desired to eliminate these pulses. For example, for high percentages of voltages, it is desired to drop down to three angles. If W2 and W3 are not zero, at block 956 W2 is moved to the plus queue for phase 1 and W3 is moved to the minus queue. At block 958 a check of W4 and W5 is made to see if they are zero, and if not, then at block 960 the W4 pulse is moved to the plus queue of phase 1 and the W5 pulse is moved to the minus queue. At block 962 old-time 1 is set equal to W6, since the last W6 which completes the 60° does not make up a full pulse, so it is called old-time 1. For phase 2 at block 964, the W6 time is the first pulse showing so W6 is added to the old-time 2, and that would give a plus pulse that is moved to the plus queue. In block 966 a check of W4 and W5 is made to see if they are zero, and if not at block 968 W5 is moved to the 2 minus queue and W4 is moved to the 2 plus queue. At block 970 a check is made to see if W2 and W3 are zero. If not, at block 972 W3 is moved to the 2 minus queue and W2 is moved to the 2 plus queue. At block 974 W1 is moved to the 2 minus queue. In block 976, looking at the third phase VC, this phase will not result in any pulses being calculated in this time, so that would be a W6 time left over from the last 60° calculation. Then a branch is made to the CONT bubble 978. At block 980, 60° is added to theta 1, and at block 982 a check is made to see if theta 1 is less than or equal to 300°. If it is not less than or equal to 300°, then that means it is 360°, and at block 984 theta 1 is reset equal to 0°. At block 986 a queue level check is made to see if any of the queues are in need of more times such that another 60° should be calculated. And then the routine ends at return.

The other cases shown in FIG. 44 here for 60°, 120°, 180°, 240°, and 300° are functionally similar to the 0° case described. The example for 60° is shown in FIG. 44D.

In FIGS. 45A and 45B there is shown the six-step timer period calculations routine. At block 1000 a check is made to see if a new voltage percent is requested. At block 1000 a check is made to see if there is a new voltage. If yes, at block 1002 the voltage percent is set equal to the requested voltage percent and the new voltage flag is reset to acknowledge that the new voltage percent request was processed. At block 1004, a check is made to see if a new frequency has occurred. If not, a branch is made around to block 1012, but if yes, at block 1006 the inverter frequency is set equal to the requested inverter frequency and at block 1008 the new frequency flag is reset to acknowledge that the new frequency is processed. At block 1010, time sixty is calculated equal to 1 divided by the quantity six times the inverter frequency to essentially give the time equivalent of a 60 degree section. Then down at block 1012, a check is made of the control state. If the control state is equal to recovery, that means the operation is in the recovery procedure and at block 1013 if the voltage percent is less than 100%, then a branch is made to change back to quasi six-step at bubble 1062. If the voltage percent is not less than 100%, then at block 1015, a check is made to see if the frequency is greater than 64 Hz. If it is not greater than 64 Hz, then a change back to quasi six-step is made at buble 1062. If it is, then a branch is made to calc at block 1018 to do the six-step calculations.

If at block 1012 the control state is equal to brake six-step, at block 1014 a check of the voltage percent is made to see if it is less than 100%. If it is less than 100%, a branch is made to block 1024 for a change to quasi six-step. If the voltage percent at block 1014 is not less than 100%, that means it is probably equal to 100%, and at block 1016 a check is made to see if the frequency is greater than 64 Hz. If it is greater than 64 Hz, the operation will remain in six-step and a branch is made to calc at bubble 1018. If not, then at block 1020, a check is made to see if the slip is greater than 0 Hz, and if it is greater than 0 Hz, that means the operation is in power and when less than 64 Hz the operation should switch back to quasi six-step. If the operation is in brake at block 1020, a branch is made to bubble 1022 which is the possibly stay in six-step bubble to do some checks to make sure the operation can stay in six-step. At block 1024, when a decision has been made to change to quasi six-step, the control state is set equal to brake below six-step because the operation was in brake six-step before and now a change is desired to change to brake below six-step. At block 1062 is the change to quasi six-step bubble. At block 1064, the synthesis mode is set equal to quasi six-step. Block 1066 initializes the quasi six-step timer to 0.2 seconds, which is the timer that prevents jumping back and forth several times between quasi six-step and six-step, and at block 1068 the six-step to quasi six-step transition flag is set. Then a branch is made to calc at bubble 1018. The six-step to quasi six-step transition flag will tell the interrupt routine which initially called this routine that the transition to quasi six-step can be made as soon as it puts out the six-step pulse to the synthesis timers.

Back at block 1012, if the control state is brake TX which indicates the braking apparatus 80 is in use with the transformer, at block 1017 a check is made of the brake control state to see what transformer braking state the operation is in. If it is in the TX six-step transition, at block 1032 a check is made of the voltage percent to see if it is greater than or equal to 100%. If not, a change to quasi six-step is desired and that will require in block 1034 setting the brake control state equal to TX below six-step trans. Then a branch is made to bubble 1062 for a change to the quasi six-step. If the brake control state is equal to TX six-step, then at block 1036 a check of the voltage percent is made to see if it is greater than or equal to 100%, and if it is then a branch is made to the possibly stay in six-step bubble 1022. If not, then a change to quasi six-step is desired and that will require at block 1038 setting the brake control state equal to TX below six-step and a branch is made to bubble 1062 which is the change to quasi six-step. If at block 1017, the brake control state is equal to TX angle control or TX high slip control, then it is desired to remain in six step and a branch is made to the possibly stay in six-step bubble 1022 because it is not desired to go to quasi six-step with the transformer being modulated. If the brake state is any other state, there is some problem so a jump is made to the error routine shown in FIG. 57 to shut down the inverter. At the possibly stay bubble 1022, a check is made at block 1023 to see if the frequency is less than 30 Hz. When the frequency is less than 30 Hz, this is too low for six-step so a branch is made to the error routine and a shutdown as a safeguard that is put there just in case. If not, then a branch is made to calc at bubble 1018 which will do the six-step calculations. To do the six-step calculations at bubble 1018, a check is made of theta 1 in block 1040. Theta 1 could be either 0°, 60°, 120°, 180°, 240°, or 300°, and a branch is made to one of six routines. If theta 1, in relation to the six-step waveforms shown in FIG. 11 is at the 0° mark here, then for phase A which is phase 1 shown by VA, at block 1042 old-time 1 is set equal to time sixty. For the second phase, which in FIG. 11 is VB, the 0° to 60° will result in the remainder of a full pulse for phase number 2, and at block 1044 the six-step time 2 plus is set equal to old-time 2, whatever old time was left over prior to 0°, plus time sixty minus one, because the hardware counters throw in an extra clock cycle pulse. For the third phase, at block 1046 the old-time 3 is set equal to old-time 3 plus time sixty, because this is right in the middle of the firing time pulse. In the calculations for braking, there is a value called time ninety. At block 1048 time ninety for phase 2 is set equal to the six-step time 2 plus pulse, which is the pulse just calculated, divided by two at block 1050 the braking angle time 2 is set equal to the braking angle request times the six-step time 2 plus, all divided by 180°. At block 1052 the brake GTO position time 2 is set equal to the time ninety two minus the braking angle time 2 divided by two at block 1054 the brake GTO OFF time 2 is set equal to the braking angle time 2. At block 1056 60° is added to theta 1 so the next time the next 60° period will be calculated. At block 1058 a check is made to see if theta 1 is greater than 300°. If it is, at block 1060 theta 1 is reset to zero, because it is obviously 360°, and the program goes to return.

In FIG. 46 there is shown the PWM to quasi six-step transition routine. As shown in FIG. 15, the transition routine will calculate the GTO times between 0° and 60°. In block 1080 a branch is made to the quasi six-step mode compute volt routine shown in FIG. 54 to calculate the voltage related variables. In block 1082 a branch is made to the compute Ws subroutine shown in FIG. 55 to compute the W times. At block 1084 for phase 1, the old time 1 plus W1 is moved into the 1 minus queue. At block 1086 a check is made to see if W2 and W3 are zero. If they are not, at block 1090 W2 is moved into the 1 plus queue and W3 is moved into the 1 minus queue. At block 1092 a check is made to see if W4 and W5 are equal to zero. If not, then at block 1094 W4 is moved into the 1 plus queue and W5 is moved to the 1 minus queue. At block 1096 old-time 1 is set equal to W6. For phase 2, at block 1098 old-time 2 is moved to the 2 minus queue because a plus transition is needed for the quasi six-step pulses, and W6 is moved to the 2 plus queue. At block 1100 a check is made to see if W4 and W5 are equal to zero. If not, at block 1102 W5 is moved to the 2 minus queue and W4 is moved to the 2 plus queue. At block 1104 a check is made to see if W2 and W3 are equal to zero. If not, at block 1106 W3 is moved into the 2 minus queue, and W2 is moved into the 2 plus queue. At block 1108 W1 is moved into the 2 minus queue. For phase 3, at block 1110, the old-time 3 is set equal to old-time 3 plus time sixty. At block 1112, theta 1 is set equal to 60°, and at block 1114 a queue level check is made to see if any of the queues are in need of more times.

Figure 47:
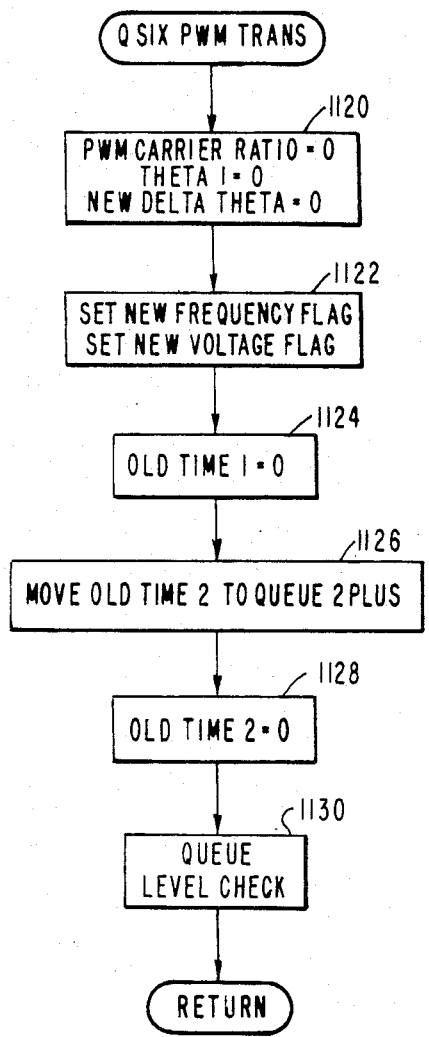
FIG. 47 shows a flow chart for the Quasi six-step to PWM mode transition routine.

The quasi six-step to PWM mode transition routine shown in FIG. 47 relates to the waveforms shown in FIG. 18. Block 1120 sets the PWM carrier ratio equal to zero, theta 1 is set equal to zero, and new delta theta is set equal to zero. In block 1122, the new frequency flag is set and the new voltage flag is set, since the next time will need the PWM values and they will be calculated in response to these flags. In block 1124 the old-time 1 is set equal to zero, since there was no old time left over from the quasi six-step calculation that was last performed. At block 1126 the old-time 2 is moved to the 2 plus queue. At block 1128 old-time 2 is set equal to zero. At block 1130 a queue level check is made to see if any of the queues are in need of more times.

Figure 48A:
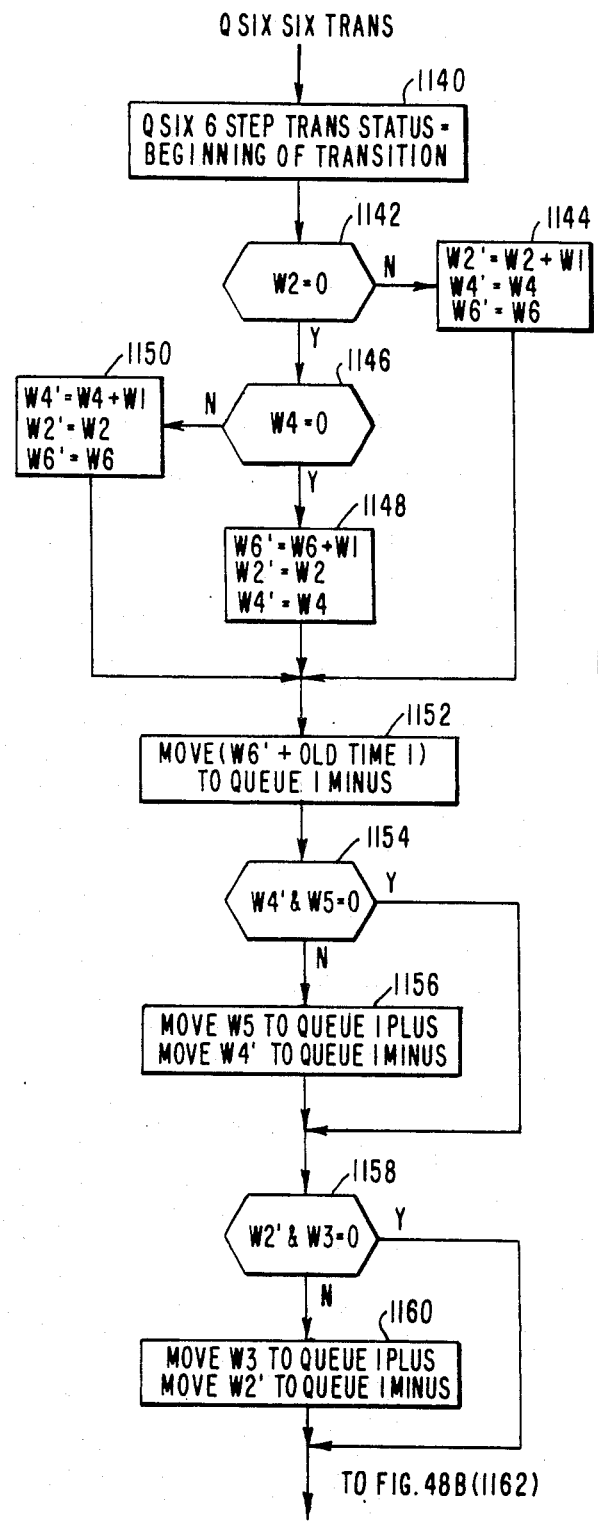

The quasi six-step to six-step transition routine is shown in FIGS. 48A and 48B and relates to the waveforms shown in FIG. 16. In block 1140 the Q six-step to six-step transition status flag is set equal to the beginning of the transition, so that the interrupt routines know that the operation is in this transition. It is necessary to deplete the queues when switching from quasi six-step to six-step synthesis. This status flag is used to monitor the transition process. The pulse W1 plus pulse W2 shown in phase VA is modified, because phase number 1 would normally end up with a high pulse and it is desired to end up at 0° in a low pulse. At block 1142 a check is made to see if W2 equals zero. If W2 does not equal zero, at block 1144 then W2' is set equal to W2 plus W1, W4' is set equal to W4 and W6' is set equal to W6. If W2 does equal zero, then at block 1146 a check is made to see if W4 is equal to zero. If yes, at block 1148 W6' is set equal to W6 plus W1, W2' is set equal to W2, and W4' is set equal to W4. If W4 does not equal zero, at block 1150 W4' is set equal to W4 plus W1, W2' is set equal to W2, and W6' is set equal to W6. At block 1152, W6', which could be either W6 or W6 plus W1 depending on what happened above, is added to the old-time 1 left over from quasi six-step, and moved to the 1 minus queue. At block 1154 a check is made to see if W4 and W5 are equal to zero. If they were not equal to zero, W5 is moved into the 1 plus queue and W4' is moved into the 1 minus queue. At block 1158 a check is made to see if W2' and W3 are equal to zero. If they are not equal to zero, at block 1160 W3 is moved into the 1 plus queue and W2' is moved into the 1 minus queue. At block 1162, where there is still 180° left to calculate, 3 times the time sixty, which is equal to that pulse, is moved into the 1 plus queue. At block 1164 for phase 2, old-time 2 plus 2 times the time sixty is moved to the 2 plus queue. In block 1166 old-time 2 is set equal to 2 times the time sixty for the last 120° of that calculation. Then at block 1168, the calculations for the third phase are begun and W1 is moved to the 3 plus queue. At block 1170 a check is made to see if W2 and W3 are zero. If not, at block 1172, W2 will be moved to the 3 minus 3 queue and W3 will be moved to the 3 plus queue. At block 1174 a check is made to see if W4 and W5 are equal to zero. In block 1176, if they are not equal to zero, W4 will be moved into the 3 minus queue and W5 will be moved into the 3 pulse queue. In block 1178 W6 plus 2 times the time sixty is moved to the 3 minus queue, and then at block 1180 old-time 3 is set equal to time sixty to take care of the last 60° in the calculation. And then the transition calculations are done. At block 1182, theta 1 is set equal to 180° because the calculations are up to 180°. At block 1184 the queue needs data flag is reset because the program is no longer calculating anything.

Figure 49A:
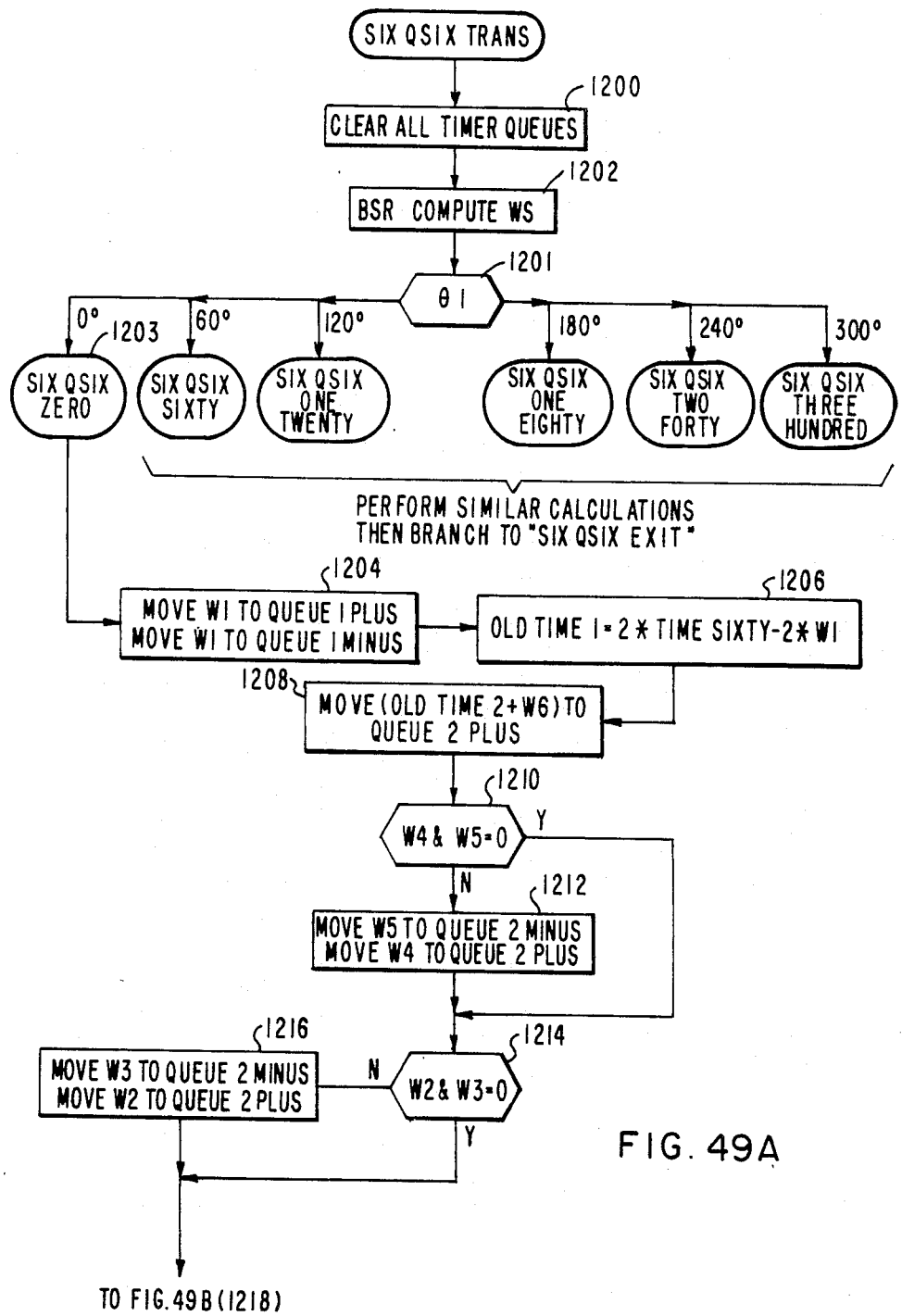
Figure 49B:
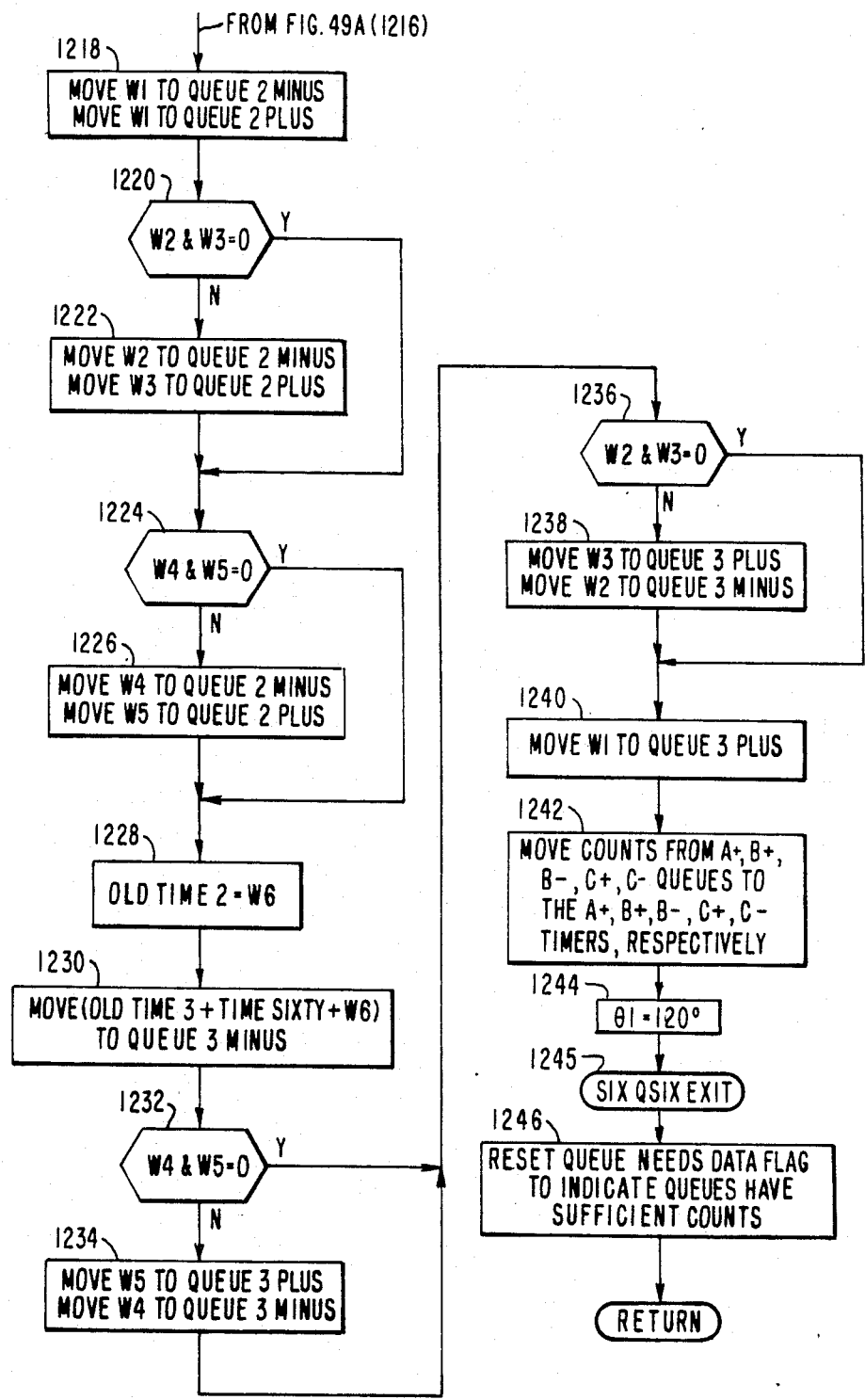

The six-step to quasi six-step transition is shown in FIGS. 49A and 49B in relation to the waveforms in FIG. 17. This routine builds up the queues and puts new counts out to the timers, because the quasi six-step operation will start using queues and the buffers in the timers. The decision to change from six-step to quasi six-step can occur at any 60° interrupt point of six-step. FIG. 17 shows the case during the 120° interrupt where the 300° to 0° six-step period is to be calculated and a decision is made to switch to quasi six-step synthesis. The last six-step pulse for 300° to 0° is calculated, a flag is set to indicate a transition is desired, and after that there is calculated the six-step to quasi six-step transition portion which consists of 0° to 120° as shown in FIG. 17. At block 1200 all timer queues are cleared. At block 1202 a branch is made to the routine shown in FIG. 55 to compute the Ws. At block 1201, the value of theta 1 is checked. Theta 1 represents the angle at which quasi six-step is to begin. For the case shown in FIG. 17, theta 1 is 0°. Depending upon what theta 1 is at block 1201, one of six transition routines will be executed. If the case shown in FIG. 17 exists, the block 1203 path will be performed. This path is the one shown in the following flow chart as an example. At block 1204 W1 for phase 1 is moved to the 1 pulse queue, because normally W1 would be a low pulse and it is desired to start with a high pulse, so W1 is arbitrarily moved to the 1 plus queue, and W1 is moved to 1 minus queue just to get the transitions going right. At block 1206 the old-time 1 is set equal to 2 times the time sixty and minus 2 times W1, which is the remaining portion of the 120°. That takes care of phase 1. For phase 2, at block 1208, old-time 2 with W6 added to it is moved to the 2 plus queue. At block 1210 a check is made to see if W4 and W5 are zero, and if they are not, at block 1212 W5 is moved into the 2 minus queue and W4 is moved into the 2 plus queue. In the present case they are equal to zero. At block 1214 a check is made to see if W2 and W3 are at zero; if not, at block 1216 W3 is moved into the 2 minus queue and W2 is moved into the 2 plus queue. At block 1218 W1 is moved into the 2 minus queue, and W1 is moved into the 2 plus queue because now the operation is working on the second 60° section. At block 1220 a check is made to see if W2 and W3 are equal to zero. If they are not equal to zero, at block 1222 W2 is moved into the 2 minus queue and W3 is moved into the 2 plus queue. At block 1224 a check is made to see if W4 and W5 are equal to zero. If not, at block 1226 W4 is moved into the 2 minus queue and W5 is moved into the 2 plus queue. At block 1228 old time 2 is set equal to W6. That completes the second phase, and now all that is left is the third phase. At block 1230 old-time 3, left over from the six-step calculations, is added to time sixty and W6 and then moved to the 3 minus queue. At block 1232 a check is made to see if W4 and W5 are zero; if not, then at block 1234 W5 is moved into the 3 plus queue and W4 is moved into the 3 minus queue. At block 1236 a check is made to see if W2 and W3 are equal to zero; if not, at block 1238 W3 is moved into the 3 plus queue and W2 is moved into the 3 minut queue. At block 1240 W1 is moved into the 3 plus queue. And that completes the calculations for the six-step to quasi six-step transition. At block 1242 the counts from the A plus, B plus, B minus, C plus and C minus queues are moved to the A plus, B plus, B minus, C plus, and C minus timers, respectively. At the 0° transition there would have been calculated the minus pulse for phase number 1 shown for VA in FIG. 17, and it was put into the 1 minus timer, and that is the only timer that has a count in its buffer. All the other timers do not have any counts waiting for them, so it is necessary to load the other five counter buffers with counts. This is done at block 1242. At block 1244 theta 1 is set equal to 120° because that is where the calculations ended. And then in block 1246 the queue needs data flag is reset to indicate that the queues have sufficient counts for the transition and then a return is made. At block 1201, where another angle besides 0° exists as theta 1, one of the other five paths would be taken. Each path would result in similar calculations being performed and then a jump to six Q six exit at block 1245 would be performed.

In FIG. 50 there is shown the PWM compute voltage routine which was called at block 756 of the load Q PWM routine shown in FIG. 43. In block 850 the voltage percent is set equal to the requested voltage percent. Requested voltage percent 74 is received by the inverter and braking synthesis 76 from the motor controller 62 as shown in FIG. 4. It represents the percentage of the maximum obtainable inverter output voltage that the motor controller 62 is asking for. At block 852, the PWM sine voltage, which is the peak of the sine wave 90 shown in FIG. 12, is set equal to the requested voltage percent times the triangle voltage divided by 78.5 percent, where the triangle voltage is equal 600 volts. In block 854 a check is made to see if the PWM sine voltage is greater than 550. If it is, that means that the sine wave and the triangle voltages are approaching each other and this will produce very narrow GTO firing pulses, so it is not desired for them to approach closer than this to each other. If yes, at block 856 the PWM sin voltage is clamped at 550, to prevent very narrow GTO pulses from being calculated. At block 858 the new voltage flag is reset acknowledging the new voltage percent.

Figure 51B:
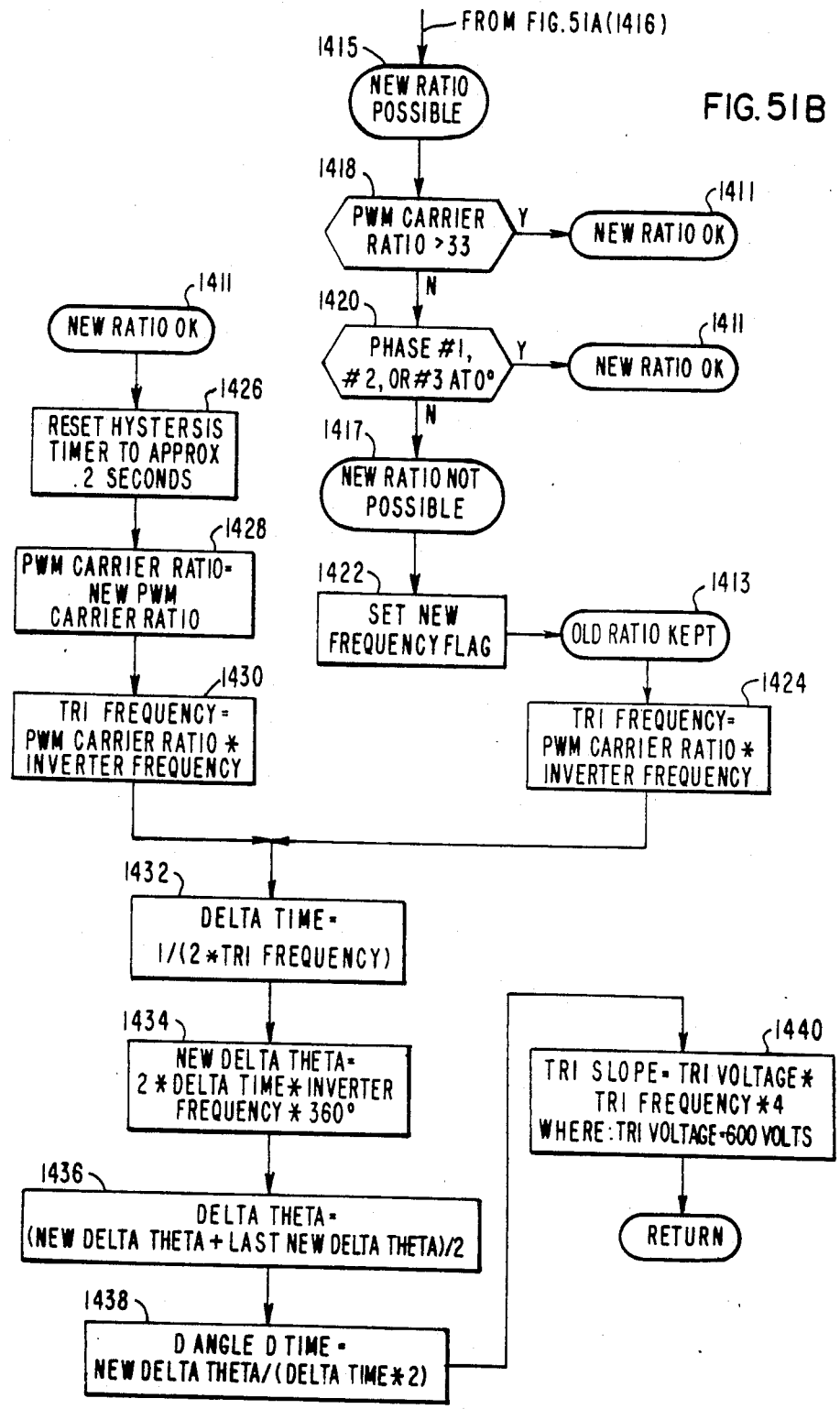
Figure 52:
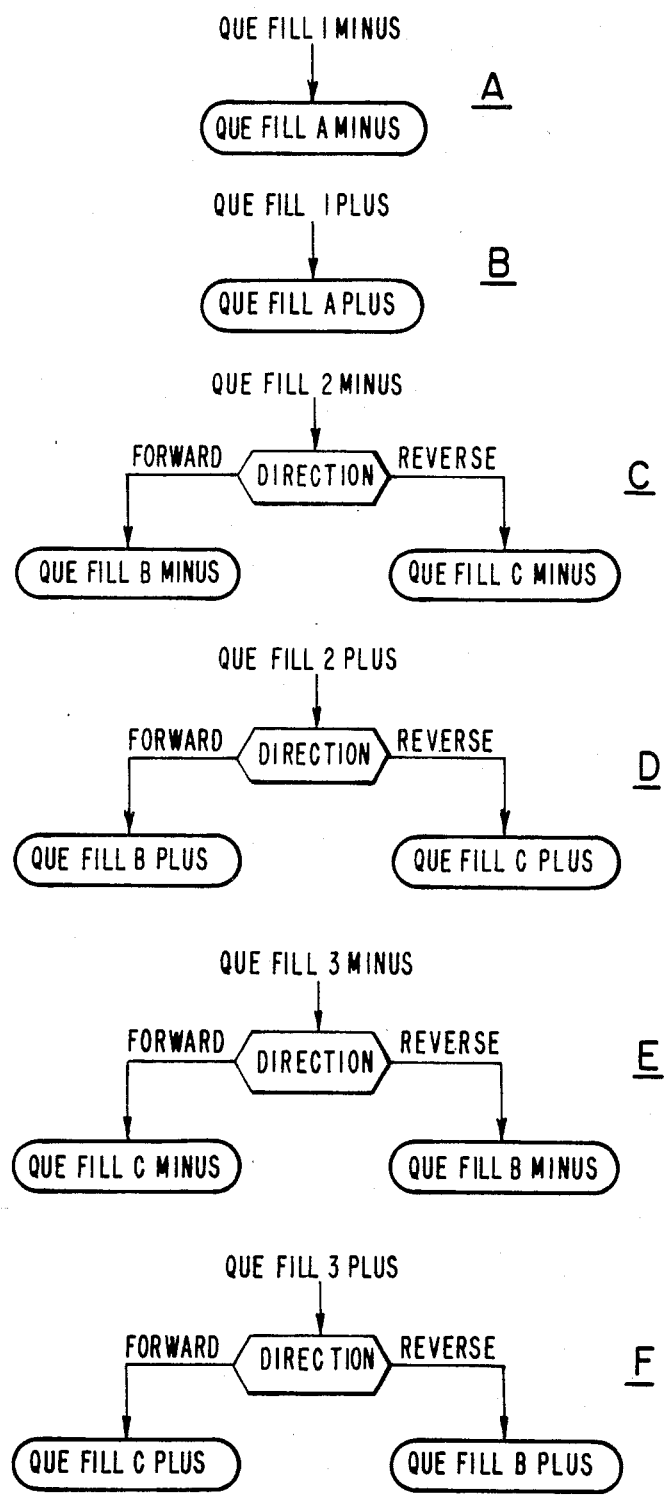
FIGS. 52A through 52F show respective flow charts for the direction routines for filling the timer queues of the 1 minus timer, the 1 plus timer, the 2 minus timer, the 2 plus timer, the 3 minus timer and the 3 plus timer.

In FIG. 51 there is shown the PWM compute frequency routine. At block 1400 the inverter frequency is set equal to the requested inverter frequency, with the requested inverter frequency being determined by the motor controller 62 shown in FIGS. 4 and 5. At block 1402 the new frequency flag is reset to acknowledge that the new frequency has been processed. In block 1404 the new PWM carrier ratio is calculated as the triplicate integer of the fundamental frequency of the inverter; to do that, the inverter frequency is multiplied by 3, and that is divided into the 350 Hz, which is the minimum allowable switching frequency, and to the integer portion of it is added one, and then the whole is multiplied by 3, and that will give the new PWM carrier ratio, which is a triplicate integer of the fundamental inverter frequency and is also greater than 350 Hz. If the frequency is below 60 hz, the minimum allowed ratio is 12. If the frequency is between 60 and 80 hz, the minimum allowed ratio is 9. If the frequency is greater than 80 hz, the minimum allowed ratio is 6. In block 1406 a check is made to see if the new PWM carrier ratio is less than a minimum allowed ratio. If it is less than this minimum, at block 1408 the new PWM carrier ratio is clamped to the minimum allowed ratio. Normally, PWM will not be in operation above 35 hz. However, during the special recovery control feature, PWM may be used at frequencies up to 100 hz. PWM carrier ratios of below 12 are not desirable, thus the reason for the minimum clamp. However, this minimum requirement must be relaxed as the frequency increases due to limitations of the inverter 11, hence the minimum ratio based on inverter frequency. At block 1410 a check is made to see if the PWM carrier ratio equals zero; the only time it equals zero is when first starting with PWM synthesis. If so, a branch is made to NEW RATIO OK at bubble 1411. It is not desired to keep switching carrier ratios, since that induces phase changes into the waveforms created. With higher carrier ratios, it is all right to switch anytime desired but with low carrier ratios, it is necessary to switch at a particular point of the waveform to minimize these phase changes. If the PWM carrier ratio is not equal to zero, then at block 1412 a check is made to see if the new PWM carrier ratio is the same as the old carrier ratio. If they are the same, a branch is made to OLD RATIO KEPT at bubble 1413, and the carrier ratio is not changed. If not, at block 1414 a check is made to see if the PWM carrier ratio is greater than 24. If yes, then a branch is made to the routine NEW RATIO POSSIBLE at bubble 1415. For a low carrier ratio, an effort is made not to switch very often or to switch at the appropriate place of the waveform, which appropriate place is when phase A is going from minus to plus, when phase B is going minus to plus or when phase C is going from minus to plus. The check at block 1414 is made to see if the carrier ratio is greater than 24, to see if the hysteresis timer might prevent changing ratios too fast. About every 0.2 second the hysteresis rate timer will time out to permit a carrier ratio change. If this timer has not timed out a block 1416, a branch is made to a routine called NEW RATIO NOT POSSIBLE at bubble 1417 to keep the old ratio. If it has timed out, then at block 1416 a branch is made to the routine NEW RATIO POSSIBLE at bubble 1415. At block 1418, a check is made to see if the new ratio is greater than 33. If yes, this is a huge ratio and change is permitted anytime. If not, in block 1420 a check is made to see if Phase No. 1, Phase No. 2, or Phase No. 3 is at the zero degree crossing where it goes from minus to plus. If so, then it is okay to go to a new ratio. If not, then a new ratio is not possible; that is where the no decision for block 1416 will go also. At block 1422 there is set the new frequency flag, even though it was reset at block 1402; it is set again because a new carrier ratio is calculated that would be desired, but the requirements are not satisified by either the hysteresis timer being timed out or the zero degree phase crossing at one of phases 1, 2, or 3. It has been decided to keep with the old ratio, so at block 1424 the triangle frequency is set equal to the PWM carrier ratio times the inverter frequency. If a new ratio is proper at one of blocks 1410, 1418, or 1420, and it is okay to change ratios, then at block 1426 the hysteresis timer is reset to approximately 0.2 second so that if the hysteresis timer is the one that is preventing the switch of carrier ratios too frequently, it is now reset back to 0.2 second, and requires a wait of another 0.2 seconds to change again. At block 1428 the PWM carrier ratio is set equal to the new PWM carrier ratio, and at block 1430 the triangle frequency is set equal to the PWM carrier ratio, which is the new PWM carrier ratio, times the inverter frequency. At block 1432 a variable called delta time, which is half of a triangle period as shown in FIG. 12, is set equal to one divided by twice the triangle frequency. In block 1434 the new delta theta shown in FIG. 12 is set equal to twice delta time times the inverter frequency times 360°. In block 1436 delta theta is set equal to the new delta theta plus the last new delta theta with that quantity divided by 2. In block 1438, D angle D time, which is an angular offset per time period, is set equal to new delta theta divided by delta time times two. In block 1440 the value of the triangle slope is set equal to the triangle voltage times the triangle frequency times 4, where the triangle the voltage is 600 volts.

The queue fill routines shown in FIGS. 52A to 52F are provided to move calculated counts into the queues. Wherever in any of the other routines a time is moved to a queue one of these six routines is called and actually places the time into the appropriate queue. For example, block 820 of FIG. 43 would result in the subroutine Que fill 1 minus shown in FIG. 52A being called. The Que fill 1 minus routine would jump to Que fill A minus shown in FIG. 53, calculated 1 minus time from block 820 of FIG. 43 into the A minus queue. FIGS. 52C through 52F also have a direction criteria. If the vehicle direction is forward the 2 minus and 2 plus times will be placed into the B minus and B plus queues respectively; and the 3 minus and 3 plus times will be queues respectively. If the vehicle direction is reverse, the 2 minus and 2 plus times will be placed into the C minus and C plus queues respectively; and the 3 minus and 3 plus times will be placed into the B minus and B plus queues respectively. This switching of the queues for forward and reverse will switch phases B and C to the motor which in turn will result in the motor turning in different directions.

Figure 53:
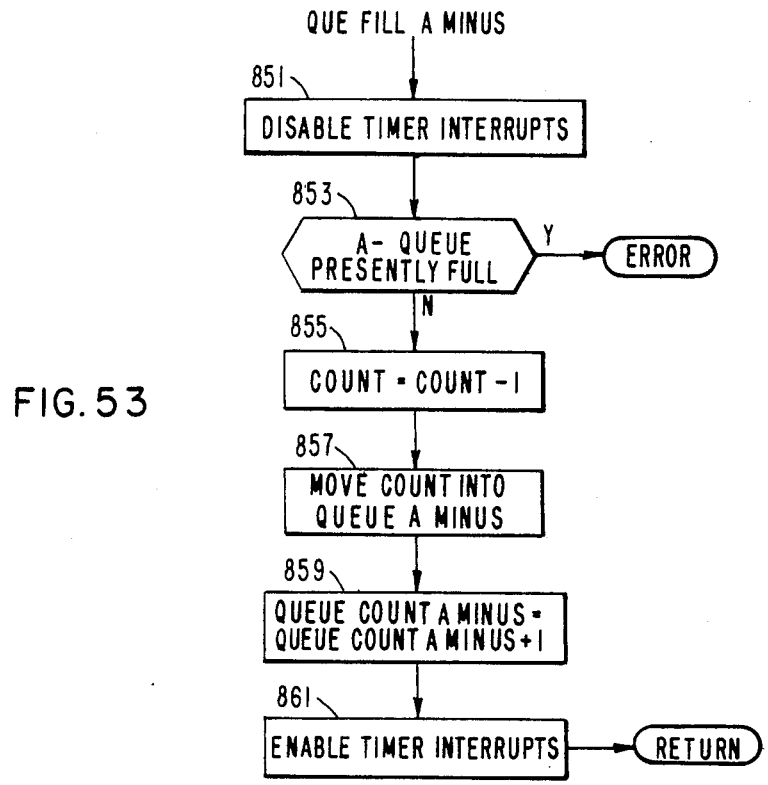
FIG. 53 shows an illustrative flow chart for one of the timer Queue fill routines.

The Queue Fill A Minus routine is shown in FIG. 53. At block 851 the timer interrupts are disabled, because a timer interrupt is not desired in the middle of putting something in the timer queue. In block 853 a check is made to see if the A minus queue is presently full; and if it is full, something went wrong, so an error is indicated. Normally the program would branch down to the block 855 where in relation to the count that is put into the queue, 1 is subtracted from the count to adjust for the hardware insertion of 1 count during the transition from plus to minus or minus to plus time control. In block 857 the count is moved into the queue for the A minus timer. In block 859 the number of counts in the A minus queue is incremented by one. And then at block 861 the timer interrupts are enabled.

It should be noted that similar routines are provided for the Queue Fill for each of the A plus, B minus, B plus, C minus, and C plus queue fill operations.

Figure 54:
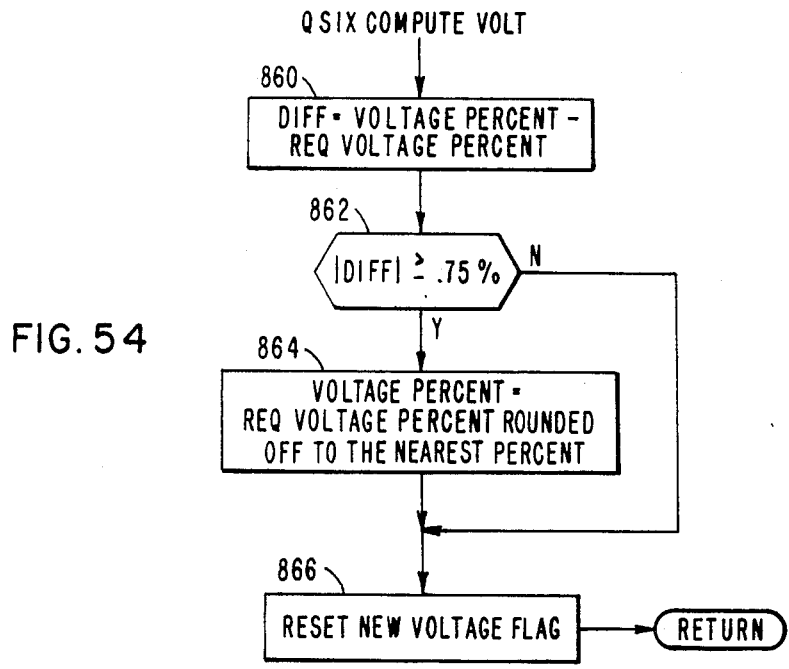
FIG. 54 shows a flow chart for the Quasi six-step mode compute voltage routine.
Figure 55A:
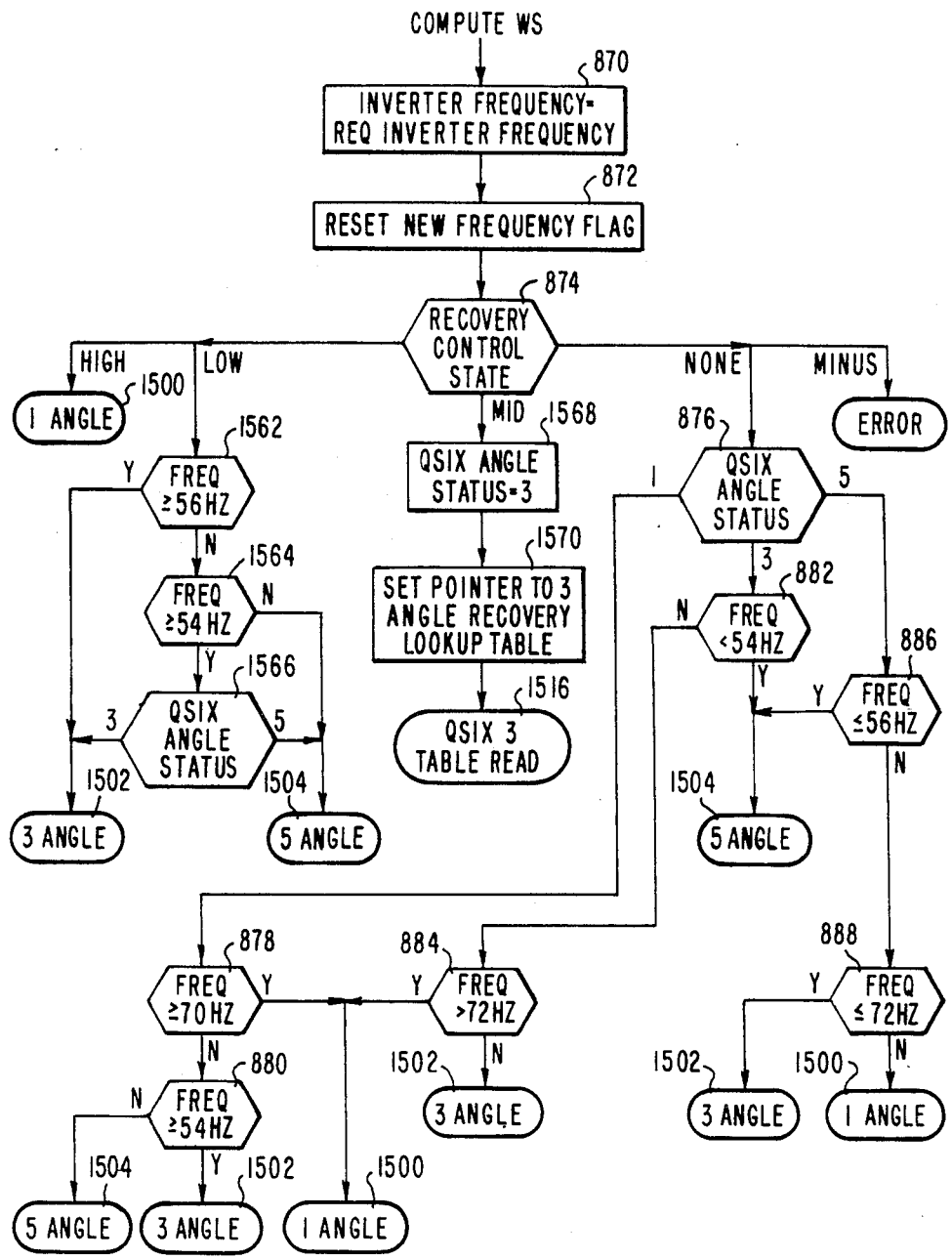
Figure 55B:
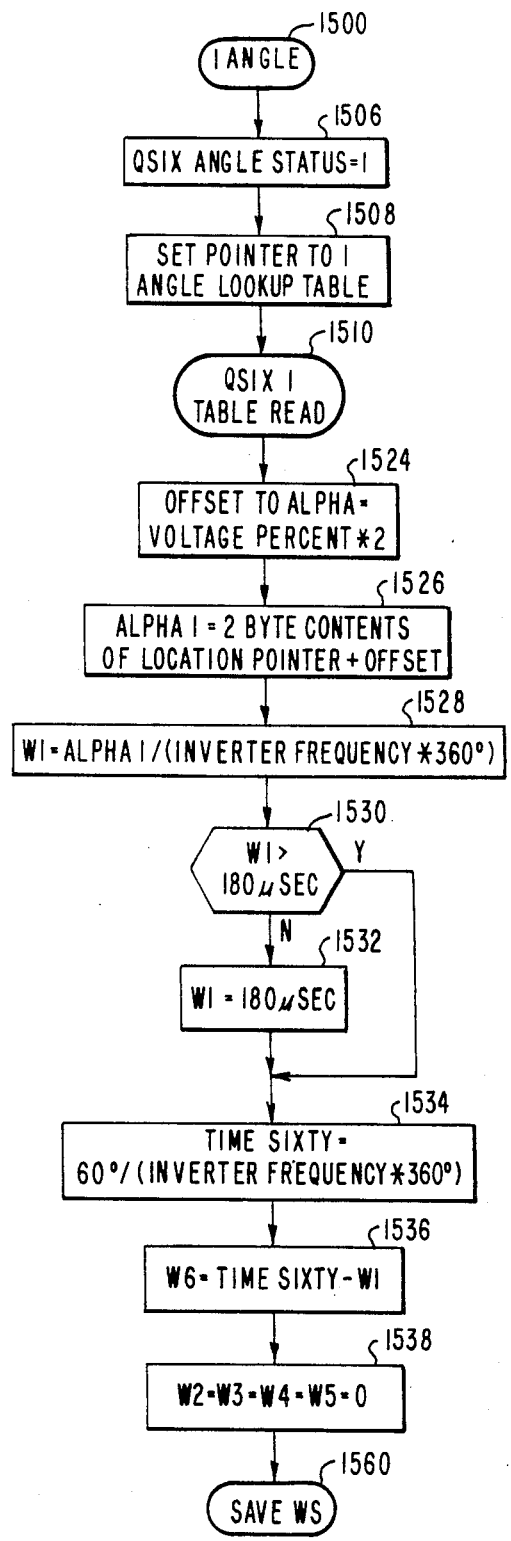
Figure 55C:
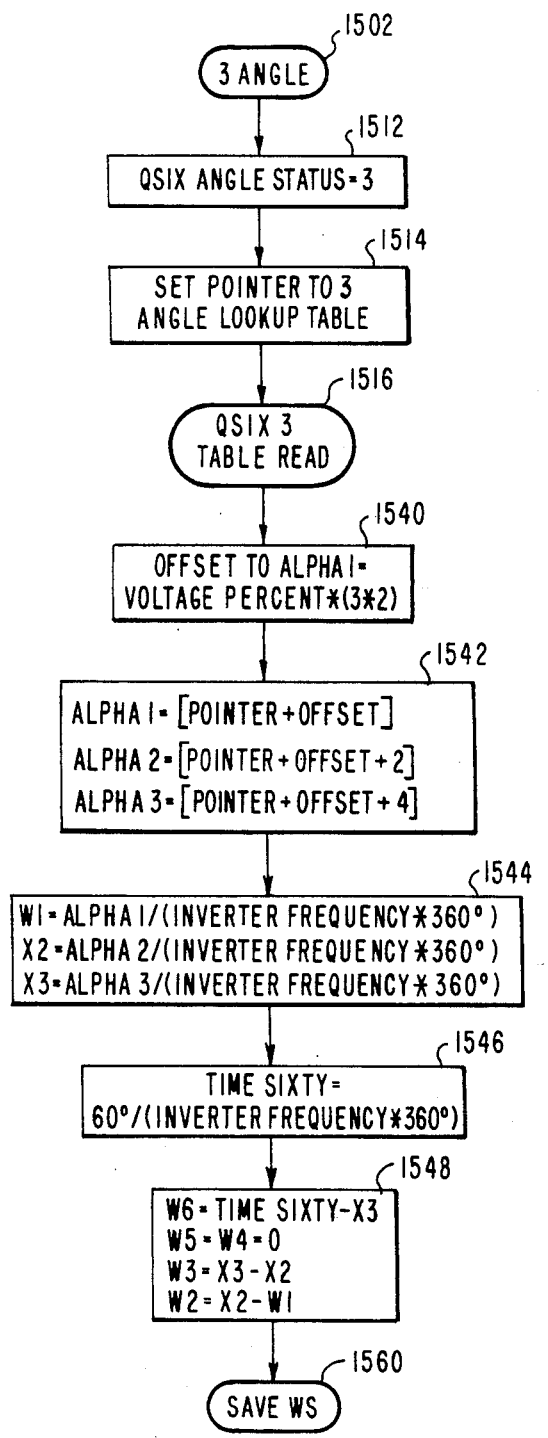
Figure 55D:
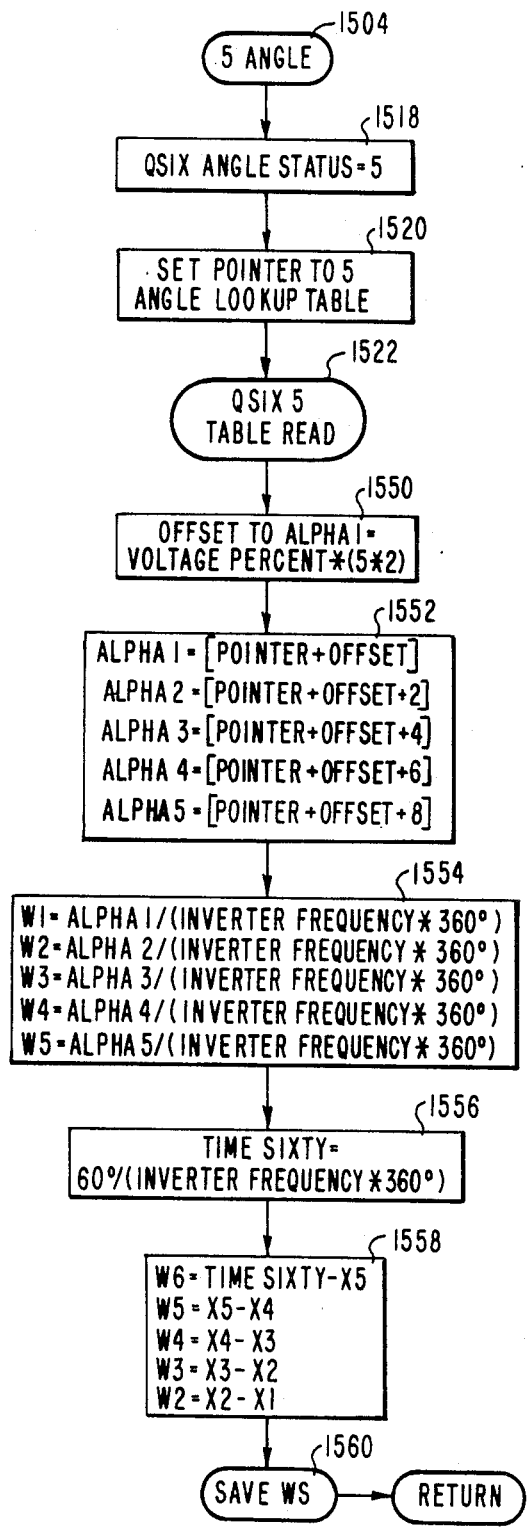

In FIG. 54 the new quasi six-step voltage related variables are calculated. At block 860 a variable called DIFF is set equal to the difference between the voltage percent, which is the last one calculated in quasi six-step as rounded off to the nearest integer to be between 1% and 99%, and the requested voltage percent, which can be a fractional number. At block 862, if the absolute value of DIFF is greater than or equal to 0.75%, then a change is made in the voltage percent. If not, the same voltage percent is used. This is to provide some hysteresis to keep from frequently changing the quasi six-step patterns. If the difference is greater than or equal to 0.75%, then at block 864 the voltage percent is set equal to the requested voltage percent rounded off to the nearest percent. At block 866 the new voltage flag is reset to acknowledge the new voltage percent.

In FIG. 55 the compute W's routine is shown. At block 870 the inverter frequency is set equal to the requested inverter frequency. At block 872 the new frequency flag is reset, and at block 874 the recovery control state is checked. In If it is in the high recovery, a branch is made to one angle quasi six-step at bubble 1500, since that should be used. If the operation is in the low recovery state, with a frequency below 70 Hz, at block 1562 a check is made to see if the frequency is greater than or equal to 56 Hz. If it is greater than 56 Hz a branch is made to bubble 1502 to use three angle quasi six-step. If not, at block 1564 a check is made to see if the frequency is greater than or equal to 54 Hz. If it is not greater than or equal to 54 Hz, a branch is made to bubble 1504 for five angle quasi six-step. If yes, then at block 1566, with the frequency between 54 and 56 Hz, whatever was used the last time will be selected and this provides the hysteresis band of 2 Hz. The Q6 angle status check at block 1566 keeps track of how many angles of quasi six-step the operation is presently in and if it is set to three, the operation will remain in three angles, and if it is set to five, the operation will remain in five angles. If the recovery state in block 874 is equal to mid which means the frequency is between 70 and 100 Hz, then at block 1568, the Q6 angle status is set equal to three because it is desired to use three angle quasi six-step and at block 1570 the pointer is set to the three angle recovery look-up table. The three angle recovery look-up table is different than the normal three angle quasi six-step look-up table, and has a little bigger angles since this operation is at a higher frequency than is normally done in quasi six-step. This operation is above 70 Hz whereas the normal quasi six-step is below 70 Hz. Since under recovery it is required to do some quasi six-step above 70 Hz, there is provided this special three angle table. At bubble 1516 which is Q six 3 Table read, the rest of the calculations are done. At block 874, if the recovery control state equals none, which indicates the operation is in recovery, at block 876 a check is made to see that the current quasi six-step angle status is, and it could be either 1, 3 or 5. If it is one angle, then at block 878 a check is made to see if the frequency is greater than 70 Hz, if is, the operation will remain in one angle. If not, then at block 880 a check is made to see if the frequency is greater than or equal to 54 Hz, and if it is not, a branch is made to five angle at bubble 1504 and if it is, then a branch is made to three angle at bubble 1502. If the Q six angle status in block 876 is three, at block 882 a check is made to see if the frequency is less than 54 Hz. If it is, then a switch is made to five angle quasi six-step at bubble 1504. If not, at block 884 a check is made see if the frequency is greater than 72 Hz, and if it is, a switch is made to one angle at bubble 1500. If not, a branch is made to three angle at bubble 1502. If the Q six angle status is equal to 5, then at block 886 a check is made to see if the frequency is less than or equal to 56 Hz, and if it is, the operation will remain in five angle at bubble 1504. If not, at block 888 a check is made to see if the frequency is less than or equal to 72 Hz, and if it is, then a switch is made to three angle at bubble 1502. If it is not, then a switch is made to one angle at bubble 1500. In the one angle routine at bubble 1500, block 1506 sets the quasi six-step angle status equal to one, block 1508 sets the pointer to the one angle look-up table and then a jump is performed to bubble 1510 which is the Q six 1 table read. The bubble 1502 points to the three angle routine, and at block 1512 the Q six angle status is set equal to 3, at block 1514 the pointer is set to the three angle look-up table and then a jump is made to bubble 1516 which is the Q six 3 table read. The bubble 1504 points to the five angle routine, and at block 1518 the Q six angle status is set equal to 5, at block 1520 the pointer is set to the five angle look-up table and at block 1522 a jump is made to the Q six 5 table read. The bubble 1510, which is the Q six 1 table read, is going to read the one angle table and determine all of the W times from this one angle. The one angle table basically has two symmetrical notches out of each 180 degree pulse, with one notch at each end of a normal 180 degree six-step pulse. The angle of that notch is selected to provide the desired output voltage percentage from 1% to 99%.

There is a look-up table value for each of the percentages from 1% to 99% which will then result in the desired output voltage percent for use in quasi six-step operation. For three angle quasi six-step, there are two notches on each end of each 180 degree six-step pulse that are removed and those two notches are selected to provide the desired voltage percentage output and also to do some minimizing of harmonics. The five angle quasi six-step has three notches on each 180 degree six-step pulse or each 180 degree period and those three notches are selected to provide the desired voltage percent with some harmonic minimization. FIG. 13 is an example of five angle quasi six-step.

From the Q six 1 table read bubble 1510, a jump is made to block 1524 to set the offset to the alpha for each table entry equal to the voltage percent times two. The reason for the times two is that each entry is two bytes so in block 1526, alpha one is set equal to the two byte contents of the location pointer plus the offset just calculated, and the pointer was set in block 1508 to the one angle look-up table. At block 1528 W1 is calculated as equal to alpha 1 divided by the inverter frequency times 360 degrees. In block 1530, a check is made to see if W1 is greater than 180 microseconds, and if yes, then that is okay and if not, in block 1532, W1 is set equal to 180 microseconds, because the inverter can fire that short of a pulse. The inverter cannot reliably fire below 150 microseconds so W1 is set to 180 microseconds to make sure this is above 150 microseconds. At block 1534 time sixty is set equal to 60 degrees divided by the inverter frequency times 360 degrees. In block 1536 W6 is set equal to time sixty minus W1. In block 1538 W2, W3, W4 and W5 are all set equal to zero and then we jump to the save Ws bubble 1560. From the Q six 3 table read's bubble 1516, a jump is made to block 1540 where the offset to the alpha 1 is calculated as equal to the voltage percent times the quantity 3 times 2. The 3 is determined by the three alpha entries for every voltage percent and the two is provided because there are two bytes per alpha. In block 1542 alpha 1, alpha 2 and alpha 3 are retrieved from the look-up table by setting alpha 1 equal to the pointer set at block 1514 plus the offset which was just calculated at block 1540, with the brackets indicating the contents of that location are retrieved. The alpha 2 and alpha 3 are the next entries in the table, so they are retrieved by adding two to the pointer plus offset for alpha 2 and adding 4 to the pointer plus offset for alpha 3. At block 1544, the W1 time is calculated as equal to alpha 1 divided by the inverter frequency times 360 degrees. The two intermediate values X2 and X3 are calculated, with X2 equal to alpha 2 divided by the inverter frequency times 360 degrees, and with X3 equal to alpha 3 divided by the the inverter frequency times 360 degrees. Then in block 1546, time sixty, which is the time equivalent of 60 degrees is calculated as equal to 60 degrees divided by the inverter frequency times 360 degrees. In block 1548, a calculation of the rest of the Ws is made, with W6 equal to time sixty minus X3, with W4 and W5 set equal to 0 with W3 equal to X3 minus X2 and with W2 equal to X2 minus W1. Since all of the W calculations are done, a jump is made to bubble 1560 which is save Ws. The Q six 5 table read at bubble 1522 comes down to block 1550, where the offset to the alpha one for that voltage percent entry is calculated as equal to the voltage percent times 5 times 2. The 5 indicates there are 5 alphas per voltage percent entry and 2 is provided since each alpha is 2 bytes long. At block 1552 alpha 1, alpha 2, alpha 3, alpha 4 and alpha 5 are retrieved from the look-up table similar to the way it was done for the three angle operation, however, it is necessary to retrieve two more values for alpha 4 and alpha 5. In block 1554, W1 is calculated as equal to alpha 1 divided by the inverter frequency times 360 degrees. Then four intermediate values X2, X3, X4 and X5 are calculated, which are used to calculate the other Ws. At block 1556, time sixty is set equal to 60 degrees divided by the inverter frequency times 360 degrees. At block 1558, a calculation is made for W6 through W2. A jump is made to bubble 1560 to save the Ws, and a return is made from the subroutine.

Figure 56:
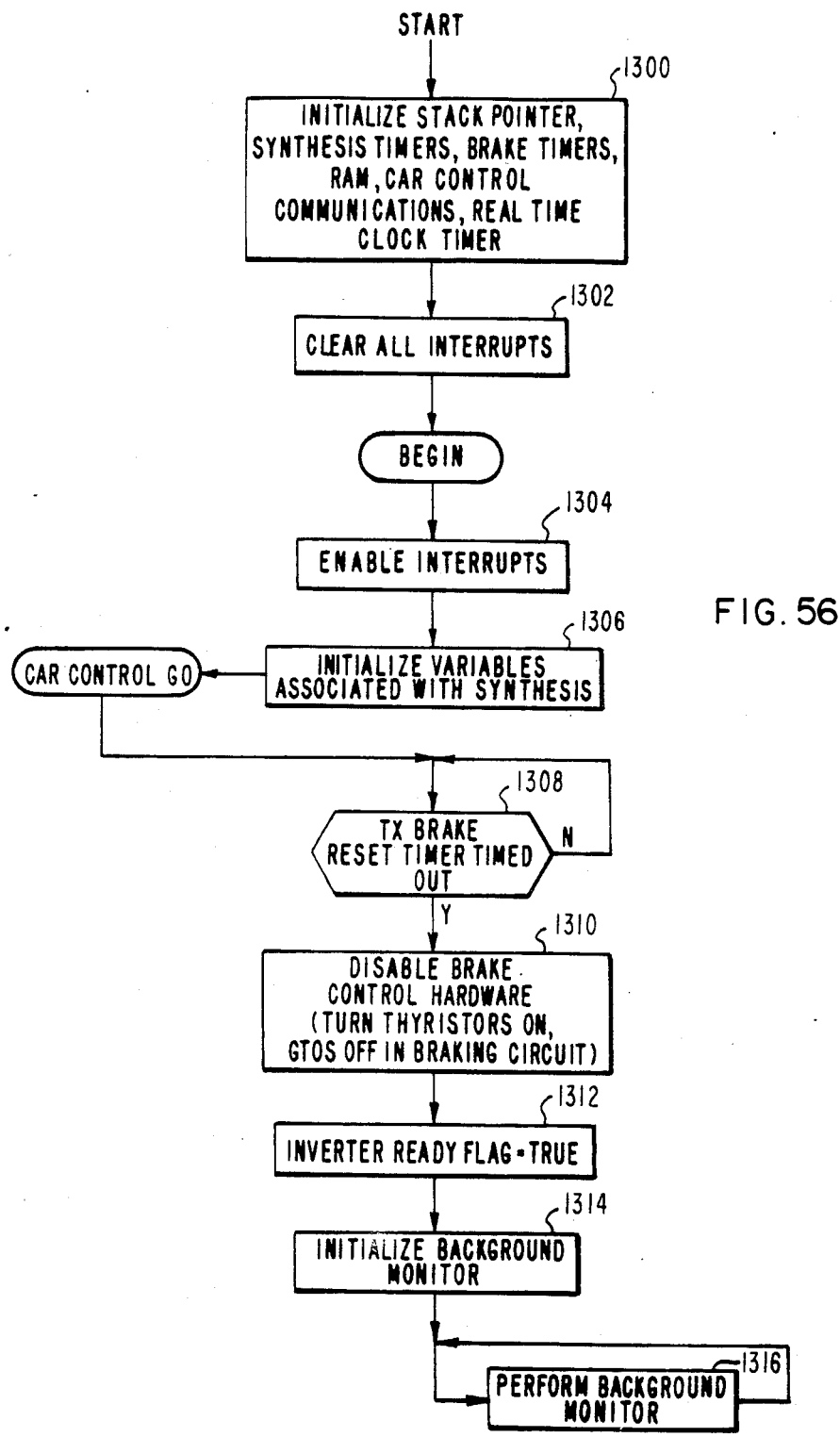
FIG. 56 shows a flow chart for the main start-up loop program and the start-up after a fault or error condition.

In FIG. 56, there is shown the power-up or start routine. When the processor powers up, a jump is made to this location. In block 1300, the stack pointer is initialized for all of the stack functions. The synthesis timers and the brake timers are set in the OFF state. The RAM memory is initialized as well as the car control communications for communication with the car control. A real time clock timer is initialized to the right frequency of 720 Hz. Block 1302 clears all of the interrupts. The program then enables all interrupts at block 1304. The only interrupts that should be present are from the real time clock since the motor operation is not started yet. Block 1306 initializes all variables associated with the synthesis operation. Every time the control pulse synthesis operation starts or restarts, it is necessary to initialize the associated variables.

A check is made at block 1308 to see if the transformer brake reset timer is timed out. When the transformer braking operation is shut down for a fault condition, it is shut down to one state and after a certain while it is changed to another state, and there is a timer provided between those two states to control the change to the final state. If this timer is not timed out, the program waits at block 1308 for the timer to time out. At block 1310, the brake control hardware is disabled as the second state of the brake control shutdown, and this involves turning the thyristors ON and the GTO switches are turned OFF in the braking circuit. At block 1312, the inverter ready flag is set equal to true to indicate the required initialization is completed and to tell the main control loop that the processor is ready to do the synthesis operation. The real time interrupts are looking at this flag, and until this flag is set equal to true the program does not proceed to operate the motor. The background monitor is initialized at block 1314 to operate with a video display to show what is going on. At block 1316 the background monitor is operated to provide desired testing for development and related purposes to display diagnostic type information. The flow chart in FIG. 56 shows the main start-up loop program and also the start-up after a fault condition. While performing the background monitor at block 1316, the microprocessor will receive real time interrupts. During these real time interrupts the microprocessor will execute routines that perform the motor control function shown in FIG. 5. This control function will result in requested inverter frequency, requested inverter voltage percent, and requested braking angle that are used by the synthesis routines previously described.

In FIG. 57 there is shown a flow chart for the shutdown or error procedure routine. This routine is called from the flow charts shown in FIGS. 21, 23, 24, 26, 27, 30, 31, 33, 34, 37, 38, 40, 41, 43, 44, 45, 53 and 55. At block 1320, all interrupts are disabled. In block 1322 all of the inverter GTO timers are disabled and this is going to turn off all of the GTOs. In block 1324, a check is made to see if the thyristors are presently shorting the braking transformer. If they are not, then a couple of intermediate steps are required, since it is desired to bring back in the thyristors to start shorting the transformer but it is not done all at once. At block 1326, the braking GTOs are turned off while the thyristors are still off. The objective is to eventually turn the thyristors on and turn the braking GTOs off. At block 1328, the TX brake reset timer is started, which is a 0.05 second timer to provide a delay. Once this timer times out, there is another routine in FIG. 56 in the start-up that will turn on the thyristors and turn off the braking GTOs, to provide a normal condition for starting up in power. Block 1330 initializes the synthesis timers and the brake timers. When it is desired to start again, the timers are ready. At block 1332, the inverter is indicated as not running and is not ready to run because it is necessary to initialize the values which is done in the restart routine. Block 1334 initializes the recovery timer, which is a 0.2 second timer and this provides, after the inverter is shutdown during an emergency situation, a wait of 0.2 seconds or a certain amount of time for the currents to die out. Block 1336 sets the inverter frequency equal to zero and the inverter frequency magnitude equal to zero. The inverter frequency is a signed number and the magnitude is the absolute value of it. Block 1338 sets the control state equal to emergency off. Block 1340 checks to see if the shutdown is a coast shutdown or a software stop shutdown. If it is either one of those, then block 1342 sets the control state equal to normal off and block 1344 enables the interrupts. If not, one of the shutdowns is checked at block 1340, then the control state is kept at emergency off, and block 1346 records the shutdown. Then a branch is made to the restart routine shown in FIG. 58.

Figure 58:
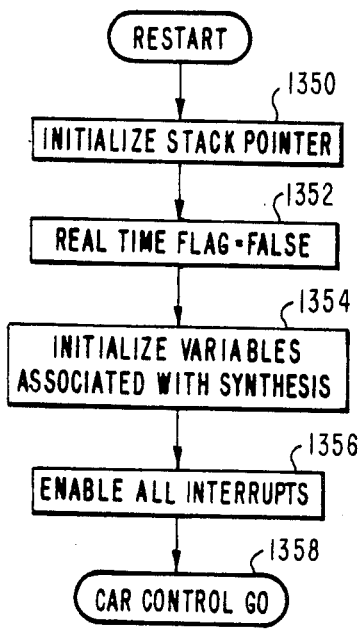
FIG. 58 shows a flow chart for the restart routine called by FIG. 57.

In FIG. 58 there is shown a flow chart for the restart routine called by the shutdown routine shown in FIG. 59. In the restart routine at block 1350 the stack pointer is initialized. At block 1352 the real time flag is set equal to false in the event there was an interrupt while doing the real time routines. At block 1354 the variables associated with the synthesis operation are initialized. At block 1356 all interrupts are enabled. At label 1358, the program goes to block 1308 of the start routine shown in FIG. 56.

The following components were used to make an actual working embodiment of the transit vehicle propulsion AC induction motor control apparatus and method of the present invention.

Microprocessor 182—Motorola MC 68000
Timers 190, 208, 210, and 228—Intel 8254 interval timer
Latch 196 and 198—74LS373
Flip-Flop 194 and 224—74LS74
Encoder 184—74LS148

We claim:

1. In control apparatus for an induction motor responsive to a wide range of input voltages, said motor having at least one phase and operative with an inverter having an upper switch device and a lower switch device for each phase of the motor, said inverter being coupled with a power source having a voltage and said inverter being responsive to an effort request signal, the combination of first means for predetermining in a running time relation to each motor phase the successive first conduction times for the associated upper switch device and the successive second conduction times for the associated lower switch device to supply a desired voltage having a desired frequency for energizing each phase of said motor, second means including for each phase of the motor a first timer responsive to the first conduction times for that phase and providing a first output signal to control the conduction of the upper switch device of that phase and including a second timer responsive to the second conduction times for that phase and providing a second output signal to control the conduction of the lower switch device of that phase, with said first timer being responsive to each second output signal of that phase and said second timer being responsive to each first output signal of the phase, and third means providing a clock pulse at the same rate to each of the first and second timers for synchronizing the operation of said first and second timers, without interrupting the running time of said first means.

2. The motor control apparatus of claim 1, with the first timer of each phase starting to provide a first output signal in response to the end of each second output signal of that phase and with the second timer of each phase starting to provide a second output signal in response to the end of each first output signal of that phase.

3. The motor control apparatus of claim 1,
with the first timer providing first output signals having respective time durations in accordance with each of the successive first conduction times and with the second timer providing second output signals having respective time durations in accordance with each of the successive second conduction times.

4. The motor control apparatus of claim 1; including fourth means responsive to the rotational frequency of the motor, and
with the first means including a programmed microprocessor for calculating the first and second conduction times in accordance with the voltage of the power source, the rotational frequency of the motor and the effort request signal.

5. The motor control apparatus of claim 1, including fourth means responsive to the operation of the motor, and
with the first means being responsive to the operation of each of the first and second timers for calculating the first and second conduction times in accordance with the voltage of the power source, the operation of the motor and the effort request signal.

6. The motor control apparatus of claim 1,
with the first means providing a predetermined separation between the respective first control signals for the different phases of a multiple phase motor and providing the same separation between the respective second control signals for the different phases of said motor.

7. The motor control apparatus of claim 1,
with the first means providing open loop control of the desired voltage supplied to energize each phase of the motor.

8. The control apparatus of claim 1, operative with said motor rotating in a first direction at a known speed when it is desired that said motor rotates in a second direction,
with the first means initially supplying said desired voltage having a waveform rotating in the first direction at a speed less than the speed of the motor until the motor speed in the first direction is substantially zero and subsequently supplying said desired voltage having a waveform rotating in the second direction.

9. In control apparatus for an induction motor for powering a transit vehicle, with said motor having at least one phase being responsive to a wide range of input voltages and being operative with a dc power source including a high voltage terminal and a low voltage terminal, with said control apparatus being responsive to a desired motor operation signal, the combination of:

first means provided for each motor phase and having an upper switch device coupled with the high voltage terminal and a lower switch device coupled with the low voltage terminal, second means responsive to the desired motor operation signal for generating for each motor phase successive first time periods for the upper switch device to be conductive and successive second time periods for the lower switch device to be conductive, and third means coupled with the first means and including for each motor phase first clock pulse counter means responsive to each of said first time periods to control the upper switch device and including second clock pulse counter means responsive to each of said second time periods to control the lower switch device for energizing the latter said phase of the motor, without interrupting the generating time of said second means, with an output voltage having a desired magnitude and a desired frequency, with said first clock pulse counter means of each phase being responsive to the second clock pulse counter means of that phase and said second clock pulse counter means of that phase being responsive to said first clock pulse counter means of that phase.

10. The control apparatus of claim 9, with the first and second clock pulse counter means of each phase being interconnected to alternately conduct for respective first and second time periods to provide said output voltage for said phase in accordance with those time periods.

11. The method of control for a transit vehicle motor having at least one phase and coupled with a dc power source having a high voltage terminal and a low voltage terminal and in response to an effort request signal, including the steps of providing a first switch for each phase coupled between the high voltage terminal and the motor, providing a second switch for each phase coupled between the low voltage terminal and the motor, determining in running time the successive first conduction times for said first switch and the successive second conduction times for said second switch to supply a voltage to said motor, said voltage having a desired magnitude and a desired frequency in accordance with said effort request signal, timing each first conduction time to control the operation of said first switch, and timing each second conduction time to control the operation of said second switch, with the timing of the first conduction times for said first switch being responsive to the timing of the second conduction times for said second switch and the timing of said second conduction times being responsive to the timing of said first conduction times, without interrupting the running time of the determining step.

12. The motor control method of claim 11, including the step of synchronizing the timing of said first conduction times with the timing of said second conduction times with a common clock signal.

13. The motor control method of claims 11, with the start of the timing of each first conduction time being in response to the end of the timing of an associated second conduction time and the start of the timing of each second conduction time being in response to the ene of the timing of an associated first conduction time.

14. The motor control method of claim 11, with each determination of the first and second conduction times being in response to the voltage of the power source, the rotational frequency of the motor and the effort request signal.

15. The motor control method of claim 11, with the determination of each succeeding first and second conduction times being in response to the timing of each previous first and second conduction times.

16. In control apparatus for an induction motor responsive to a wide range of input voltages, said motor having at least one phase and operative with an inverter having an upper switch device and a lower switch device for each phase of the motor, said inverter being coupled with a power source having a voltage and said inverter being responsive to an effort request signal, the combination of first means for predetermining in a running time relation to each motor phase the successive first conduction times for the associated upper switch device and the successive second conduction times for the associated lower switch device to supply a desired voltage having a desired frequency for energizing phase of said motor, second means including for each phase of the motor a first timer responsive to the first conduction times for that phase and providing a first output signal to control the conduction of the upper switch device of that phase and including a second timer responsive to the second conduction times for that phase and providing a second output signal to control the conduction of the lower switch device of that phase, with said first timer being responsive to each second output signal of that phase and said second timeer being responsive to each first output signal of the phase, third means providing a clock pulse at the same rate to each of the first and second timers for synchronizing the operation of said first and second timers, without interrupting the running time of said first means, and means for successively engaging a plurality of harmonically structured modes for said first means which are derived from synchronous pulse width modulation and variable square wave voltage notching techniques that are closely matched in order to smoothly transition the motor from start-up to the operating speed over the entire range of operation with substantially uniformity.

17. The motor control method of claim 11, including the step of successively engaging a plurality of logically structured synthesis modes that are synchronously matched in order to smoothly transition the motor from start up to the desired operating speed.

* * * * *